(12) United States Patent
Arena et al.

(10) Patent No.: US 10,378,744 B2
(45) Date of Patent: Aug. 13, 2019

(54) PORTABLE LIGHT HAVING A FORWARD FACING LIGHT AND A REARWARD FACING LIGHT

(71) Applicant: STREAMLIGHT, INC., Eagleville, PA (US)

(72) Inventors: Francis D. Arena, Horsham, PA (US); Thomas J. Kelley, Phoenixville, PA (US); William D. Worman, Phoenixville, PA (US)

(73) Assignee: Streamlight, Inc., Eagleville, PA (US)

( * ) Notice: Subject to any disclaimer, the term of this patent is extended or adjusted under 35 U.S.C. 154(b) by 180 days.

(21) Appl. No.: 15/460,707

(22) Filed: Mar. 16, 2017

(65) Prior Publication Data

US 2017/0284646 A1    Oct. 5, 2017

Related U.S. Application Data

(63) Continuation-in-part of application No. 29/560,271, filed on Apr. 5, 2016.

(Continued)

(51) Int. Cl.
*F21V 23/04* (2006.01)
*F21L 4/02* (2006.01)
(Continued)

(52) U.S. Cl.
CPC ............ *F21V 23/0414* (2013.01); *F21L 4/02* (2013.01); *F21L 4/027* (2013.01); *F21L 4/045* (2013.01);
(Continued)

(58) Field of Classification Search
CPC .... F21V 23/0414; F21V 23/06; F21V 7/0075; F21V 7/06; F21V 17/02; F21V 21/0885;
(Continued)

(56) References Cited

U.S. PATENT DOCUMENTS 2,581,129 A * 1/1952 Muldoon .................. F21L 4/00
                                                    174/69
5,558,430 A * 9/1996 Booty, Jr. ................ F21L 4/02
                                                    362/184

(Continued)

OTHER PUBLICATIONS

International Searching Authority, "Notification of Transmittal of the International Search Report and the Written Opinion for International Application No. PCT/US17/23171", dated Aug. 2, 2017, 18 pages.

(Continued)

*Primary Examiner* — David V Bruce
(74) *Attorney, Agent, or Firm* — Clement A. Berard, Esq.; Dann, Dorfman, Herrell & Skillman, PC

(57) ABSTRACT

A portable light may comprise: a light housing including a first housing and a light head that is pivotable relative to the first housing; one or more light sources including an illumination light source in the light head; an electrical switch for selectively energizing the one or more light sources; and a detector of the pivoted position of the light head relative to the first housing for energizing and/or de-energizing one or more of the light sources. Other features of the light may include: a rear facing light source that may have one or more light sources, or an elongated clip, or a pivotable elongated clip, or one or more accessories mountable to a clip, or a combination thereof.

29 Claims, 38 Drawing Sheets

Related U.S. Application Data

(60) Provisional application No. 62/400,284, filed on Sep. 27, 2016, provisional application No. 62/323,035, filed on Apr. 15, 2016.

(51) Int. Cl.

| | | |
|---|---|---|
| *F21V 23/06* | (2006.01) | |
| *F21L 4/04* | (2006.01) | |
| *F21Y 115/10* | (2016.01) | |
| *F21V 5/04* | (2006.01) | |
| *F21V 7/06* | (2006.01) | |
| *F21V 13/04* | (2006.01) | |
| *F21V 17/02* | (2006.01) | |
| *F21V 21/088* | (2006.01) | |
| *F21V 8/00* | (2006.01) | |
| *F21V 7/00* | (2006.01) | |
| *F21Y 113/13* | (2016.01) | |

(52) U.S. Cl.
CPC .............. *F21V 23/06* (2013.01); *F21V 5/045* (2013.01); *F21V 7/0075* (2013.01); *F21V 7/06* (2013.01); *F21V 13/045* (2013.01); *F21V 17/02* (2013.01); *F21V 21/0885* (2013.01); *F21Y 2113/13* (2016.08); *F21Y 2115/10* (2016.08); *G02B 6/0096* (2013.01)

(58) Field of Classification Search
CPC ........ F21V 5/045; F21V 13/045; F21L 4/045; F21L 4/027; F21L 4/02; G02B 6/0096; F21Y 2113/13; F21Y 2115/10
See application file for complete search history.

(56) References Cited

U.S. PATENT DOCUMENTS

| | | | |
|---|---|---|---|
| D378,434 S | 3/1997 | Petterson | |
| 5,871,272 A | 2/1999 | Sharrah et al. | |
| D407,514 S | 3/1999 | Yuen | |
| 7,059,744 B2 | 6/2006 | Sharrah et al. | |
| 7,172,310 B2 | 2/2007 | Hsu | |
| 7,188,978 B2 | 3/2007 | Sharrah et al. | |
| D548,385 S | 8/2007 | Sharrah et al. | |
| D566,314 S | 4/2008 | Jen | |
| 7,401,941 B2 | 7/2008 | Teng | |
| 7,481,551 B2 | 1/2009 | Sharrah et al. | |
| 7,614,760 B2 | 11/2009 | Sharrah et al. | |
| D605,795 S | 12/2009 | Baker et al. | |
| D611,629 S | 3/2010 | Sharrah et al. | |
| D612,970 S | 3/2010 | Sharrah et al. | |
| 7,699,491 B2 | 4/2010 | Sharrah et al. | |
| 7,731,385 B2 | 6/2010 | Spartano et al. | |
| 8,287,157 B2 | 10/2012 | Sharrah et al. | |
| D674,525 S | 1/2013 | Sharrah et al. | |
| 8,371,729 B2 | 2/2013 | Sharrah et al. | |
| D681,858 S | 5/2013 | Sharrah et al. | |
| D685,510 S | 7/2013 | Henry et al. | |
| D707,869 S | 6/2014 | Wu | |
| 8,905,573 B2 | 12/2014 | Sharrah et al. | |
| D728,139 S | 4/2015 | Wang | |
| D737,487 S | 8/2015 | Beckett et al. | |
| D740,986 S | 10/2015 | Hine et al. | |
| D751,742 S | 3/2016 | Windom et al. | |
| D765,295 S | 8/2016 | McLennan | |
| D767,187 S | 9/2016 | Hine | |
| 2005/0082989 A1* | 4/2005 | Jones | F21L 4/00 315/194 |
| 2006/0034074 A1* | 2/2006 | Ko | F21L 4/027 362/184 |
| 2009/0190332 A1 | 7/2009 | Sharrah | |
| 2010/0277899 A1 | 11/2010 | Peak | |
| 2012/0139452 A1 | 6/2012 | Galli et al. | |
| 2012/0182723 A1* | 7/2012 | Sharrah | F21V 29/004 362/157 |
| 2014/0092590 A1 | 4/2014 | Parker et al. | |
| 2015/0276347 A1 | 10/2015 | Sharrah et al. | |
| 2016/0018071 A1 | 1/2016 | Sharrah et al. | |

OTHER PUBLICATIONS

Streamlight, "TLR-VIR Product Fact Sheet", Issued Oct. 3, 2008, Revised Apr. 21, 2014, 1 sheet, Document #255.

Streamlight, "TLR-VIR Operating Instructions", © 2012, Rev B 5/12, 8 pages.

Streamlight, "TLR-VIR Tactical Gun Mount", printed Feb. 29, 2016, 2 pages, http://www.streamlight.com/en-au/product.html?pid=198.

Streamlight, "Vantage Product Fact Sheet", Issued Apr. 4, 2008, Revised Jul. 1, 2014, 1 sheet, Document #249.

Streamlight, "Vantage Operating Instructions", Rev D dated 7/13, 20 pages.

Streamlight, "Vantage Helmet Mount", printed Feb. 29, 2016, 2 pages, http://www.streamlight.com/it-it/product/product.html?pid=194.

Sharrah, Jonathan R., "Light Mountable on a Handgun", U.S. Appl. No. 29/514,738, filed Jan. 15, 2015, 26 pages.

Streamlight, "Fire Vulcan—Rechargeable Lantern Product Specifications and Product Fact Sheet", Issued Oct. 1, 2004, Revised Dec. 23, 2016, Document #140, 3 pages.

Streamlight, "Fire Vulcan LED—Rechargeable Lantern Product Specifications and Product Fact Sheet", Issued Apr. 7, 2008, Revised Dec. 23, 2016, Document #241, 3 pages.

* cited by examiner

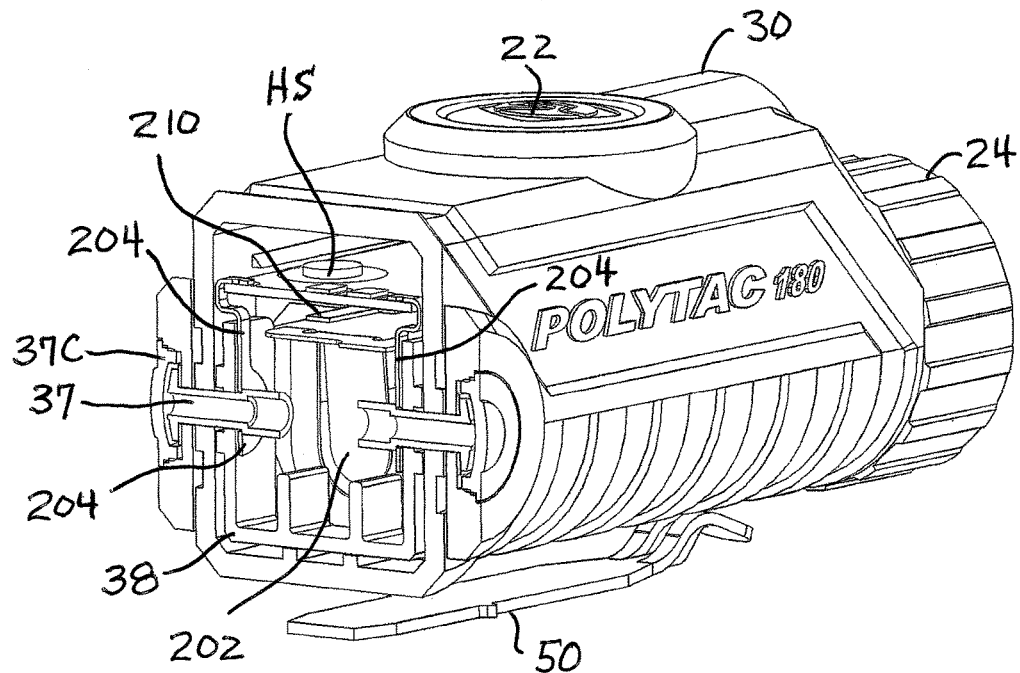
FIG. 5C
FIG. 5D
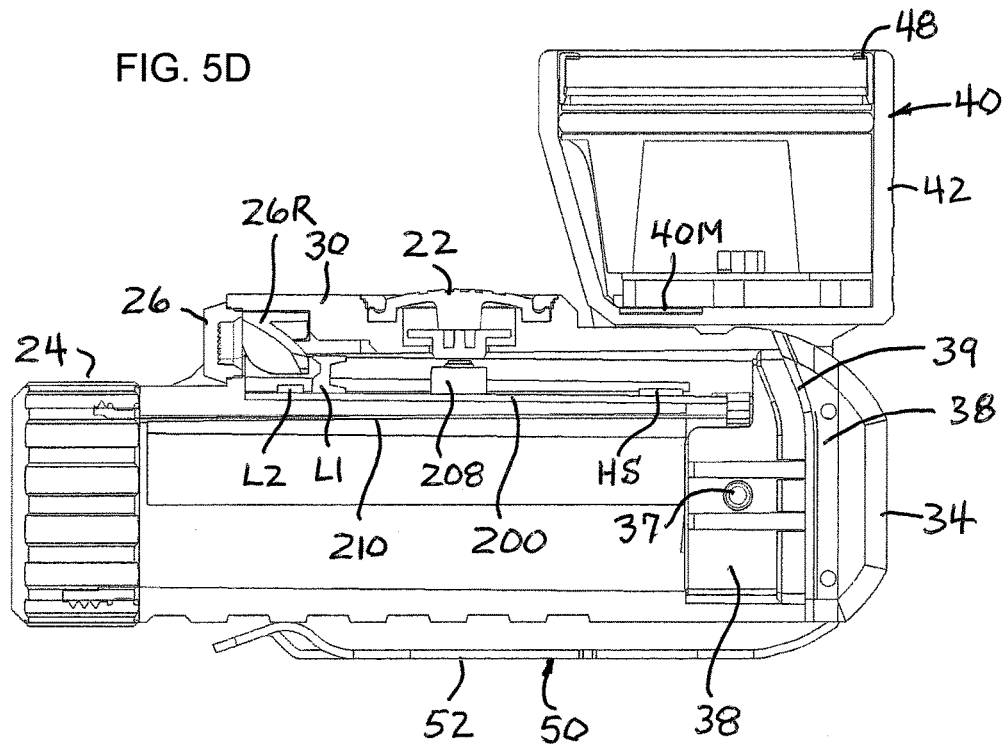

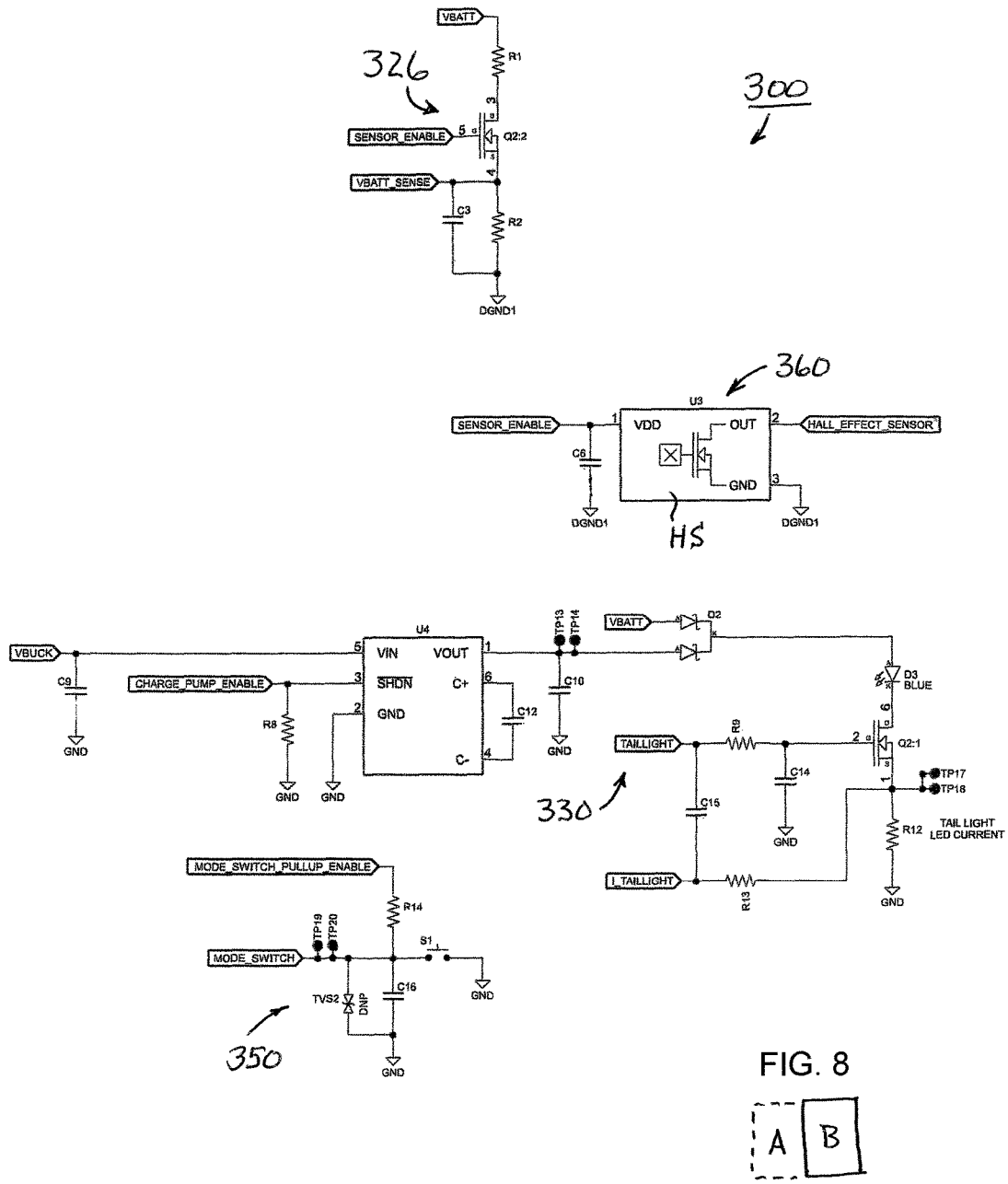
FIG. 8
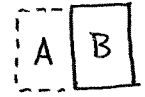

PORTABLE LIGHT HAVING A FORWARD FACING LIGHT AND A REARWARD FACING LIGHT

This Application is a continuation-in-part of U.S. patent application Ser. No. 29/560,271 filed on Apr. 5, 2016, entitled "LIGHT HAVING A PIVOTABLE HEAD, OR SIMILAR ARTICLE," and this Application claims the benefit of the priority of U.S. Provisional Patent Application No. 62/400,284 filed on Sep. 27, 2016, entitled "PORTABLE LIGHT HAVING A FORWARD FACING LIGHT AND A REARWARD FACING LIGHT" and also claims the benefit of the priority of U.S. Provisional Patent Application No. 62/323,035 filed on Apr. 15, 2016, entitled "PORTABLE LIGHT HAVING A FORWARD FACING LIGHT AND A REARWARD FACING LIGHT," each of which is hereby incorporated herein by reference in its entirety.

The present application relates to a portable light and, in particular, to a portable light having a pivotable head. The portable light may have a detector of the head position, forward and rearward facing lights, or may have a clip, or may have an accessory attachable to a clip, or may have a combination thereof.

Portable lights typically provide a forwardly directed light, e.g., for illumination. Where portable lights are employed not just for lighting an area forward of a user, but are also employed for locating a user, a rearwardly directed light may be provided as in indicator of the location of the light. One common such usage is for personnel such as firefighters and military and industrial personnel who may be deployed into areas where visibility is limited, e.g., by smoke, fog, rain, snow or other airborne material that reduces visibility, and where hazardous environments may exist.

One excellent example of such light is the VANTAGE® helmet mountable tactical light which is available from Streamlight, Inc. of Eagleville, Pa. The VANTAGE® light provides a forwardly directed white illumination beam and a single rearwardly directed bright blue or green LED (light emitting diode) locator light beam, and has a permanently attached bracket with a thumb screw by which the light may be attached to the brim of a helmet, hard hat or other headgear, as is common, so that the illumination and blue safety beams are properly directed. The bracket is rotatable about one axis that is transverse to the forward-to-rearward axis of the light which provides one degree of freedom to direct the light, e.g., the forwardly directed illumination beam, in a desired direction.

Applicant believes there may be a need for a light that responds to pivoting of parts of the light for selectively energizing and/or de-energizing one or more light sources of the light.

Applicant also believes there may be a need for a light that provides for more than one degree of freedom in directing the light, and/or alternatively for a light that is not limited by a permanently attached helmet mounting bracket or other accessory.

Accordingly, a portable light may comprise: a light housing including a first housing and a light head that is pivotable relative to the first housing; one or more light sources including an illumination light source in the light head; an electrical switch for selectively energizing the one or more light sources; and a detector of the pivoted position of the light head relative to the first housing for energizing and/or de-energizing the one or more light sources.

In another aspect, a portable light may comprise: a light housing including a first housing and a light head that is pivotable relative to the first housing; an illumination light source in the light head for directing light outwardly from the light housing; a second light source including: a first light producing element for producing a first light; and a second light producing element for producing a second light; an electrical switch for selectively energizing any combination of the illumination light source, the first light producing element, and the second light producing element to produce light; and a detector of the pivoted position of the light head relative to the first housing for energizing and/or de-energizing the first light producing element and/or the second light producing element.

Further, a portable light may comprise: a light housing; an illumination light source selectively energizable for directing light outwardly from the light housing; a second light source selectively energizable for directing light outwardly from the light housing, the second light source including: a first light producing element configured for selectively producing a first light; a second light producing element configured for selectively producing a second light; and an optical element configured for receiving the first light and the second light for directing the first light and the second light from the light housing; and an electrical switch for selectively energizing any combination of the illumination light source, the first light producing element and the second light producing element to produce light.

In another aspect, a portable light may comprise: a light housing including a first housing and a light head that is pivotable relative to the first housing; an elongated clip extending adjacent to and rotatable about the first housing; an illumination light source in the light head and selectively energizable for directing light outwardly from the light housing; a second light source selectively energizable for directing light outwardly from the light housing; an electrical switch for selectively energizing the illumination light source and/or the second light source to produce light; and an actuator for actuating the electrical switch and located on an exterior surface of the first housing substantially diametrically opposite to a center position of the elongated clip.

According to yet another aspect, a portable light source may comprise: a first light producing element selectively producing a first light; a second light producing element selectively producing a second light; and an optical element configured for receiving the first light and the second light for directing the first light and the second light in a direction substantially parallel to an optical axis defined by the optical element.

In a still further aspect, a portable light may comprise: a light housing; an illumination light source in the light housing for directing light outwardly; an electrical switch for selectively energizing the illumination light source; an elongated clip extending adjacent to and rotatable about the light housing; an accessory configured to be attached to the elongated clip adjacent the light housing, whereby the elongated clip and accessory are rotatable about the light housing.

In yet another aspect, a portable light may comprise: a light housing having one or more ridges and/or grooves thereon; an illumination light source in the light housing for directing light outwardly; an electrical switch for selectively energizing the illumination light source; an elongated clip extending adjacent to and rotatable about the light housing; an accessory configured to be attached to the elongated clip adjacent the light housing, wherein the accessory has one or more ridges and/or grooves thereon that are complementary to and configured to engage the ridges and/or grooves of the light housing, whereby the elongated clip and accessory are rotatable about the light housing.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 5A to 5E are various cross-sectional views of the example light of FIGS. 1A to 1D taken in different planes, respectively;

Figure 1A:
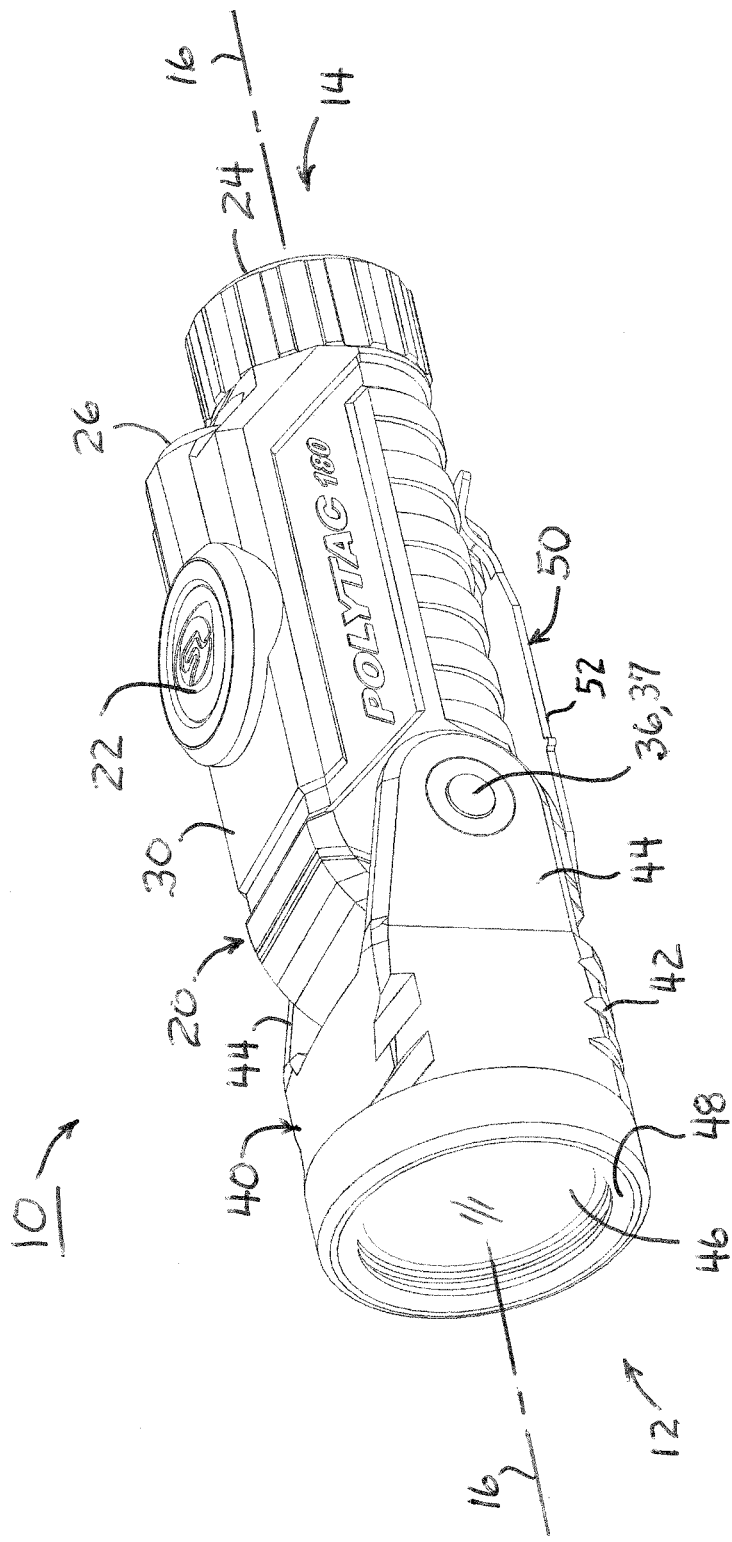
FIGS. 1A and 1B are two respective perspective views of an example embodiment of a portable light according to the present arrangement.

In the Drawing, where an element or feature is shown in more than one drawing figure, the same alphanumeric designation may be used to designate such element or feature in each figure, and where a closely related or modified element is shown in a figure, the same alphanumerical designation may be primed. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1B:
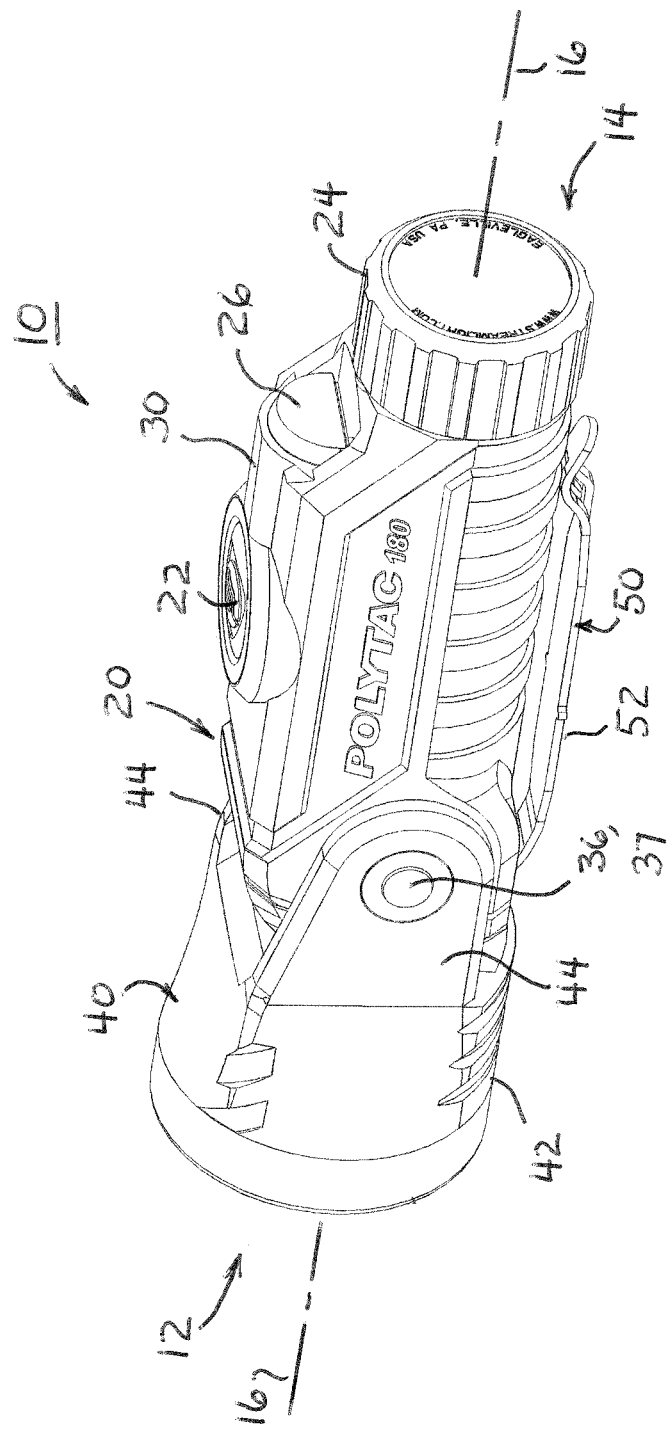
Figure 1C:
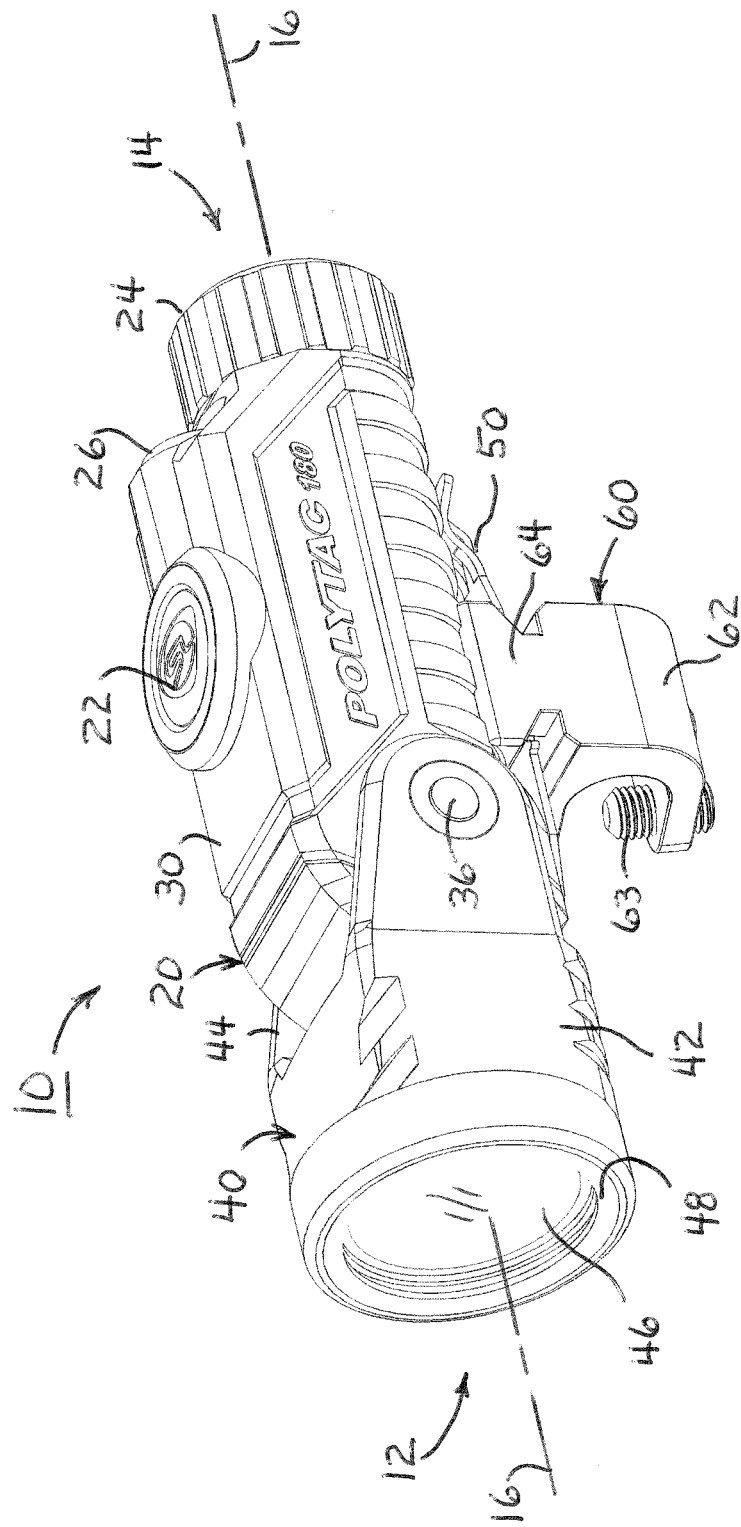
FIGS. 1C and 1D are two perspective views of the example embodiment of a portable light according to the present arrangement with a mounting bracket.
Figure 1D:
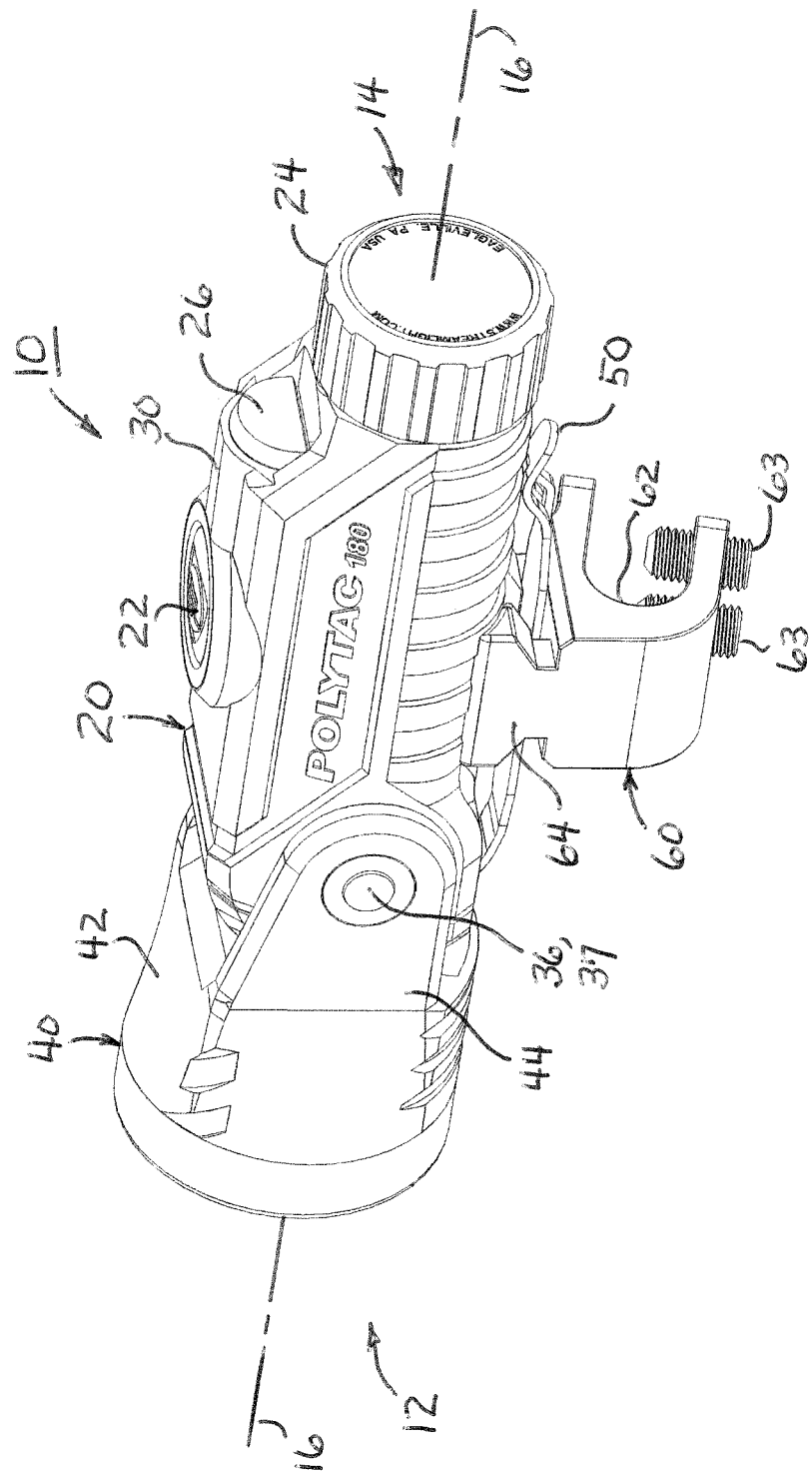
Figure 2A:
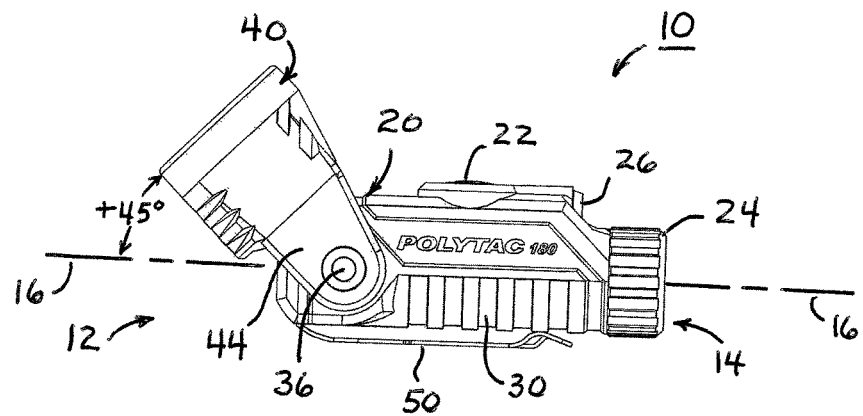
FIGS. 2A to 2D include various views of the example light of FIGS. 1A to 1D showing the pivotable light head thereof moved to various alternate positions.
Figure 2B:
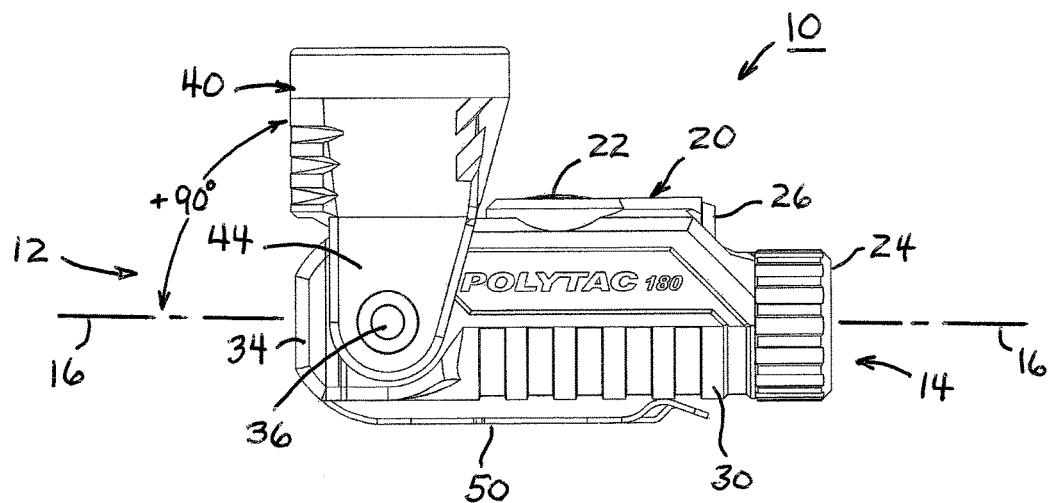
Figure 2C:
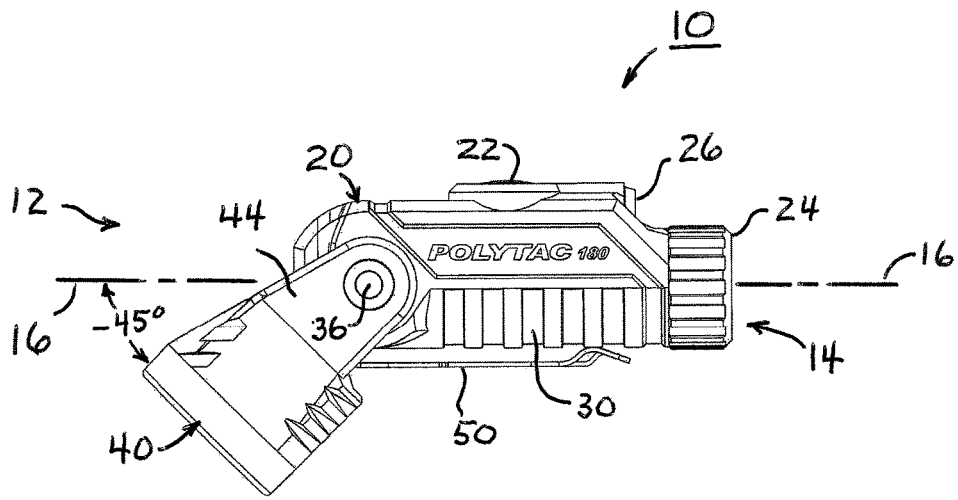
Figure 2D:
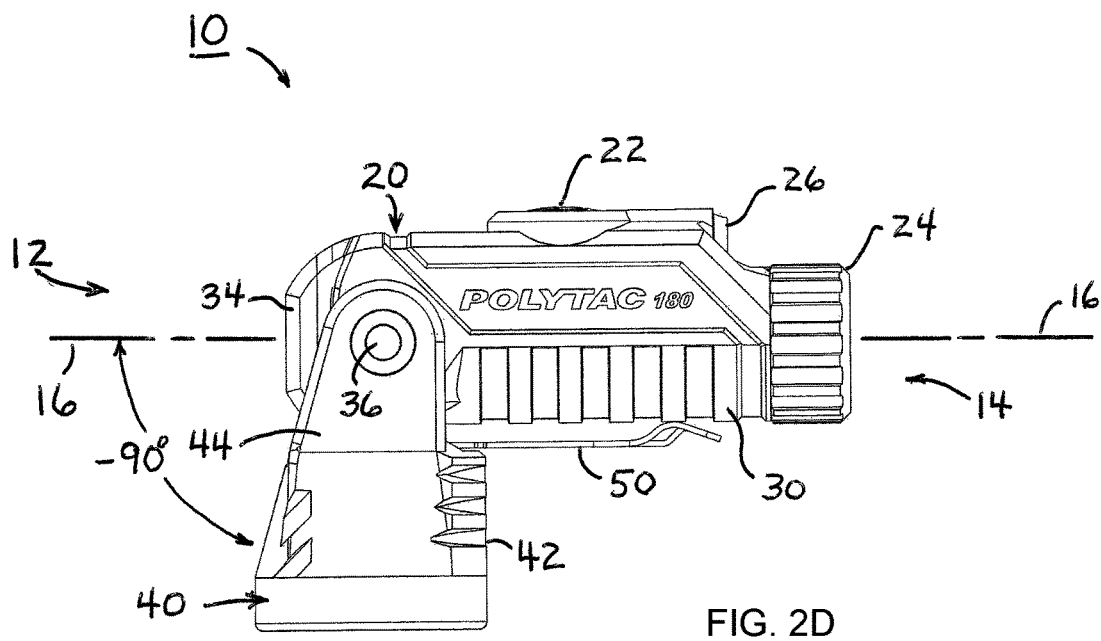
Figure 3A:
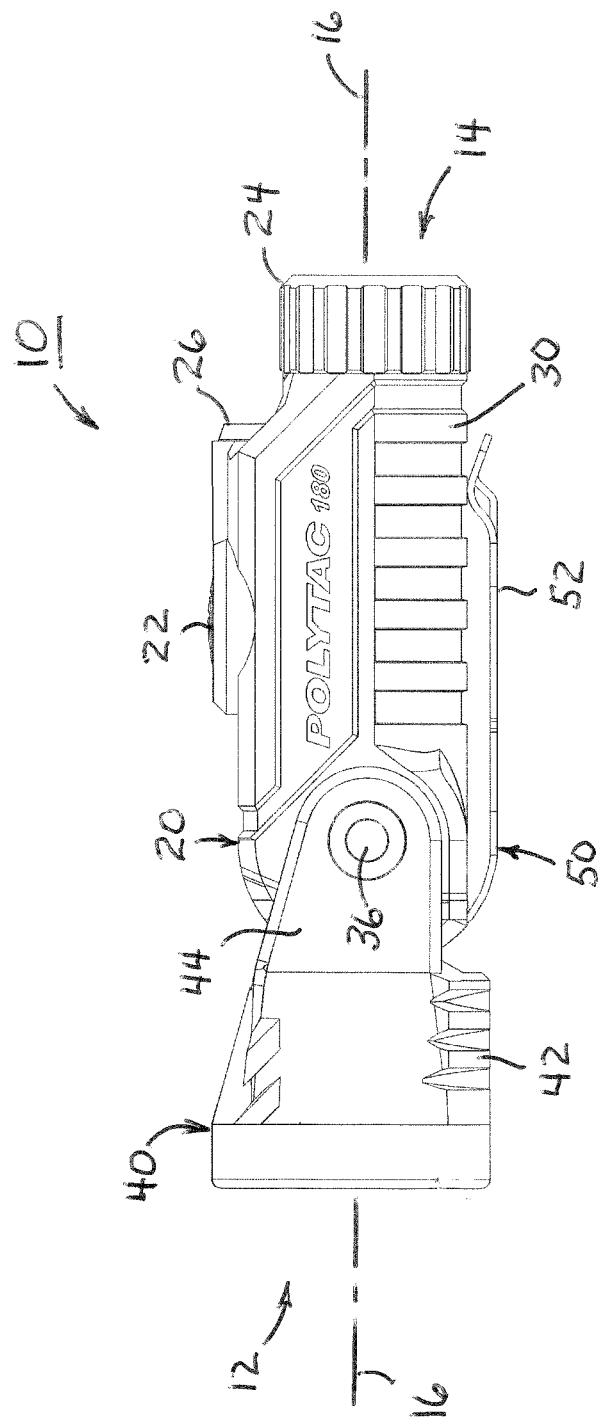
FIGS. 3A to 3E are views of one side, the top, underside, front and rear ends, respectively, of the example light of FIGS. 1A to 1D.
Figure 3C:
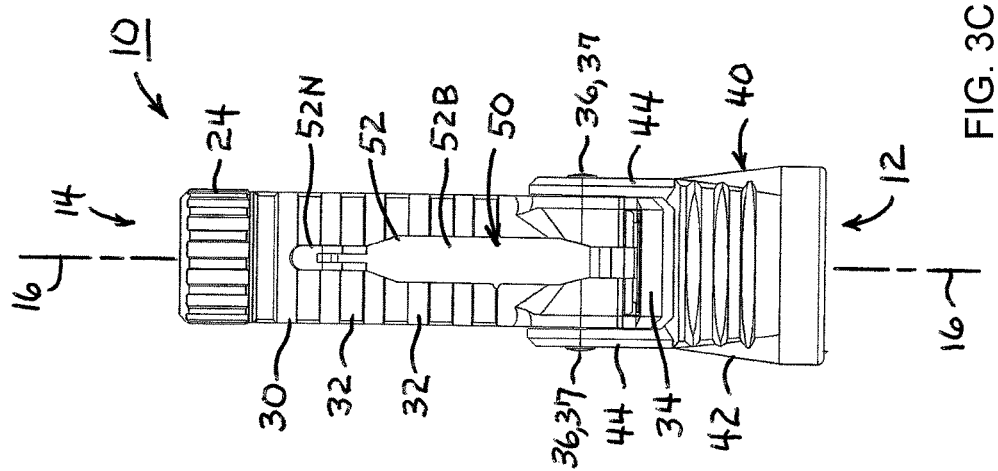
Figure 3B:
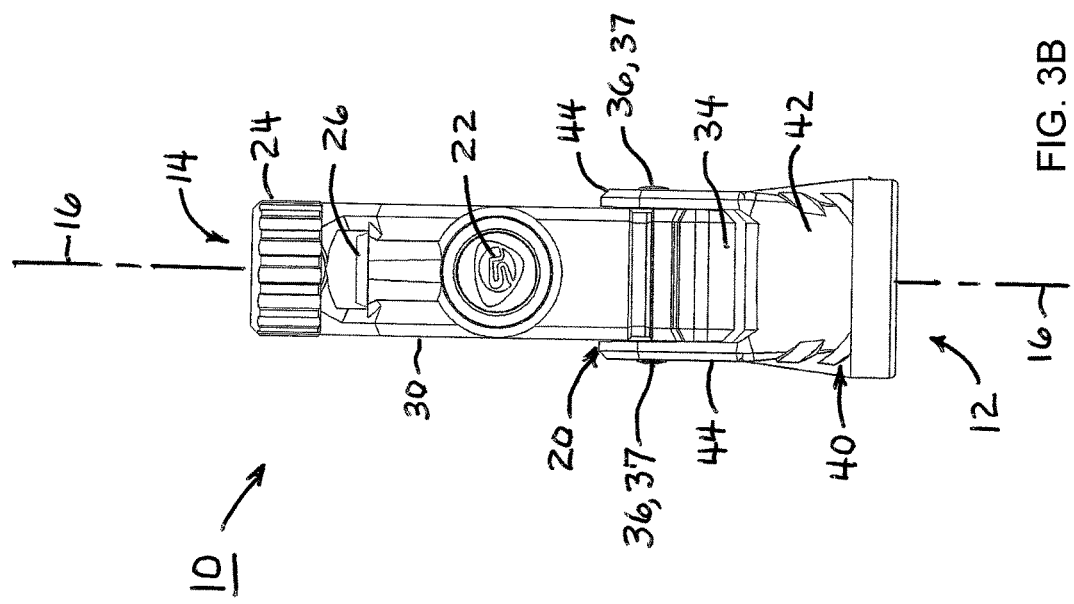
Figure 3D:
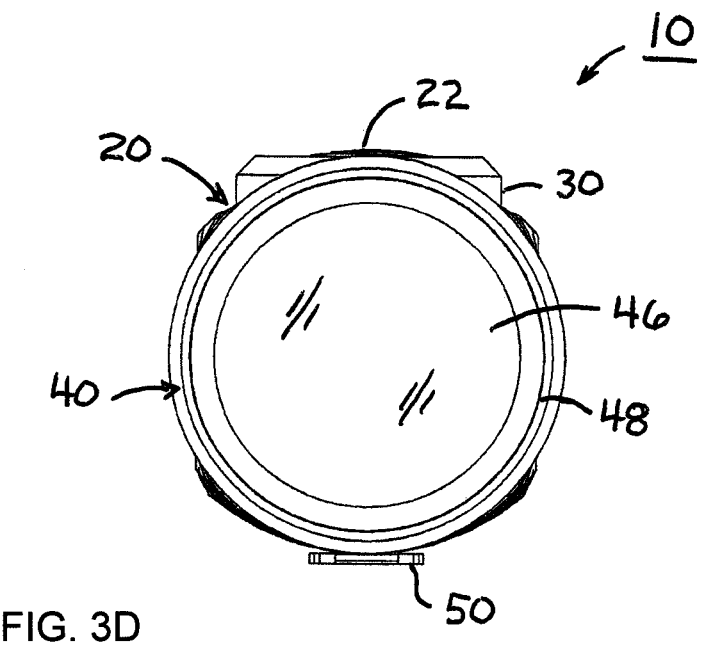
Figure 3E:
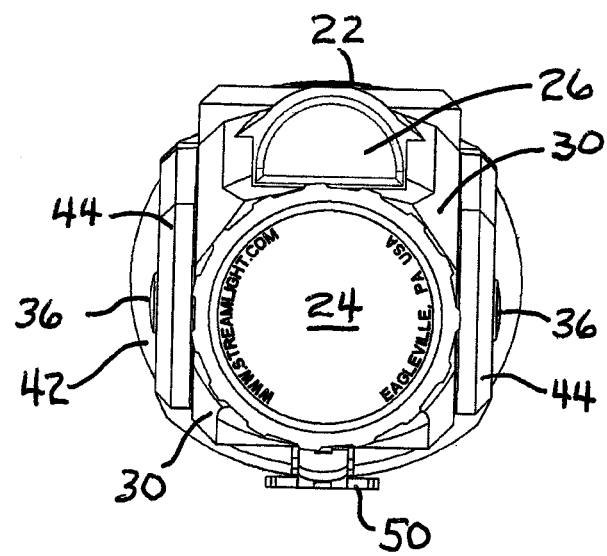

FIGS. 1A and 1B are two respective perspective views of an example embodiment of a portable light 10 according to the present arrangement, FIGS. 1C and 1D are two perspective views of the example embodiment of a portable light 10 according to the present arrangement with a mounting bracket 60; FIGS. 2A to 2D include various views of the example light 10 of FIGS. 1A to 1D showing the pivotable light head 40 thereof moved to various alternate positions; and FIGS. 3A to 3E are views of one side, the top, underside, front and rear ends, respectively, of the example light 10 of FIGS. 1A to 1D.

Portable light 10 includes a light body 20 and has a forward end 12 and a rearward or tail end 14 between which is defined a longitudinal axis 16. Light body 20 includes a housing 30 and a light head 40 that is pivotably attached to housing 30 by a hinge or pivot joint 36 including one or more hinge or pivot pins 37. Housing 30 preferably has an internal cavity for containing a source of electrical power, e.g., a battery, to which access may be gained by removing tail cap 24. Light body 20 also includes an actuator 22 for selectively controlling the light source or light sources of light 10, has a rearwardly facing lens 26, and has a removable tail cap 24 closing the rearward end 14 thereof.

Pressing actuator 22 on light body 20 actuates an electrical switch internal to light 10, e.g., internal to housing 30, for controllably energizing a first light source included in light head 40 for providing light in a forward direction generally parallel to axis 16 when light head 40 is directed in that direction and for controllably energizing a second light source behind rearwardly facing lens 26 for providing light in a rearward direction generally parallel to axis 16.

Light head 40 includes a head housing 42 including two support arms 44 that extend rearwardly therefrom for providing connection to hinge or pivot joint 36 so that light head 40 is pivotable relative to light housing 30. Light head 40 may be pivoted, e.g., at least about 90° upward and downward relative to light housing 30 and longitudinal axis 16. Example alternate positions thereof at about +45°, +90°, −45° and −90° of pivoting are illustrated, however, light head 40 may be moved to and left in any desired alternate position between about +90° and −90° of pivoting.

A lens 46 is provided at the forward end 12 of light head 40 for passing light produced by a light source therein. Lens 46 is retained on head housing 42 by a lens ring 48 which may be threaded so as to be removable or may be permanently attached, e.g., by press fitting, adhesive, ultrasonic welding or another suitable means. Light produced by the light source of light head 40 that emanates through lens 46 is generally an illumination beam, e.g., a relatively narrow or spot beam as is common in portable lights.

A lens 26 is provided near the rearward end 14 of light 10 for passing light produced by a light source in housing 30 in a generally rearward direction, e.g., substantially parallel to longitudinal axis 16. In some applications, light emanating rearwardly from lens 26 provides a safety beam or beacon by which the light 10, and thus the user and/or wearer of light 10, may be located. One common safety light situation involves firefighters who generally have a blue safety beacon which is somewhat easier to identify in a fire and smoke environment where fire produces significant light in the red-orange-yellow end of the spectrum. The light emanating via lens 26 preferably is a relatively wide or flood beam so that it is visible over a relatively wide range of direction, and may be of any desired color or colors.

A clip 50, e.g., an elongated clip 50, is provided so that light 10 may be attached, e.g., clipped, to an object such as a pocket, belt, vest, tool carrier, structure, or other object. Clip 50 has an elongated clip arm 52 that extends longitudinally along the exterior of light body 20, e.g., housing 30, with clip end 52N being closely adjacent thereto. Clip 50 is preferably formed of a resilient or springy material so that clip arm 52 may be moved away from light body 20 and when released will tend to press whatever object may be between clip arm 52 and light body 20 against light body 20, thereby to provide for a relatively secure attachment of light 10 to that object.

Preferably, clip 50 is configured to rotate about light body 20 and longitudinal axis 16 at least over a limited range of rotation, e.g., up to about 45° of rotation, e.g., about +22.5° either side of its center position which is preferably directly opposite to actuator 22 and about 90° from the axis of hinge or pivot 36. In one example embodiment, clip 50 is rotatable about +15° about housing 30 and to that end is mounted to a post at the forward end of housing 30 and is retained thereon by an end cap 34. Thus, as clip 50 is moved (rotated) relative to housing 30, the remote end 52N of clip arm 52 moves over an arcuate circular path adjacent to the exterior surface of housing 30.

A significant advantage is seen to result from providing two degrees of freedom for positioning light head 40 relative to housing 30: one degree of freedom due to the pivotability of light head 40 relative to housing 30 and a second degree of freedom due to the rotatability of clip 50 relative to housing 30.

For example, if a user were to clip light 10 to a pocket or other feature at the front of his or her person so that light body 20 is generally vertical, then light head 40 may be pivoted upwardly and downwardly so as to direct light in a forward or forward-upward direction, e.g., onto a work site, and further, light 10 may be rotated to the left or to the right using the relative rotatability of light housing 30 and clip 50. Still further, if the light source that provides light through rearwardly facing lens 26 is energized with light 10 so clipped to a person, the light emanating through lens 26 would be directed downwardly to illuminate the surface on which the user is standing, thereby to enhance safety in movement.

A clamp or bracket 60 may be provided for use with light 10 so that light 10 may be attached or mounted to an edge of a hard object, e.g., a fireman's helmet, another helmet, a hard hat, and the like. Mounting bracket 60 preferably includes a shaped clamp member 62, e.g., a C-shaped clamp member 62, having an open side into which the edge of an object may be inserted and may be secured therein, e.g., by tightening one or more clamping screws 63. Clamp member 62 is preferably attached or connected to light 10 at its end remote from clamping screws 63.

Thus, light 10 is supported by the object to which mounting bracket 60 is attached. In a common application, light 10 is attached to the lower edge of a helmet or other head gear in a position generally near to a side of a user's head so that the longitudinal axis 16 is generally near horizontal and points forwardly and rearwardly, whereby the light emanating through lens 46 is directed generally forwardly of the user and the light emanating through lens 26 is directed generally rearwardly of the user.

A preferred embodiment of clamp member 62 has at its end remote from clamping screws 63 a base 64 from which a pair of bracket arms 66 extend outwardly to define a space or passage therebetween. Near the intersection of each bracket arm 66 and base 64, on the inward facing surface of each bracket arm 66, is a respective groove 67. Together the two grooves 67 define a space which is sized and shaped to receive the elongated clip arm 52 of clip 50 so that mounting bracket 60 may be slipped onto and off of clip arm 52, whereby mounting bracket 60 and light 10 may conveniently be attached and separated.

In a typical usage, mounting bracket 60 is likely to be attached to a helmet or other headgear to remain thereon, whilst light 10 would be attached and released therefrom by inserting and removing clip arm 52 of clip 50 from the grooves 67 of bracket 60. It is noted that clip arm 52 has a relatively broader portion 52B that can be securely retained in grooves 67 of bracket 60 and a relatively narrower end 52N that passes through the space between bracket arms 64 so as to permit clip 50 to separate therefrom.

Figure 4A:
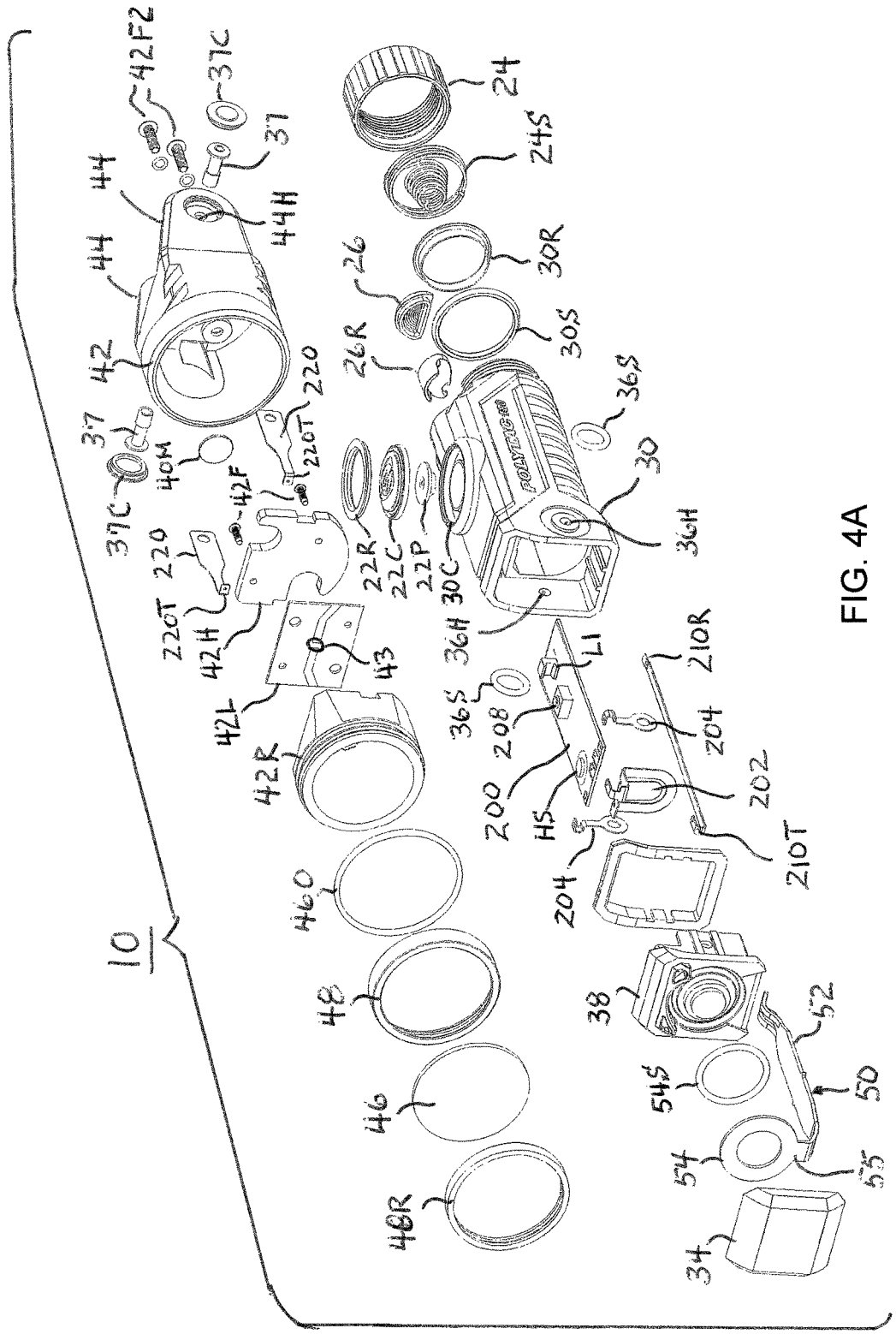
FIGS. 4A and 4B are exploded views of the example light of FIGS. 1A to 1D illustrating the various parts thereof.
Figure 4B:
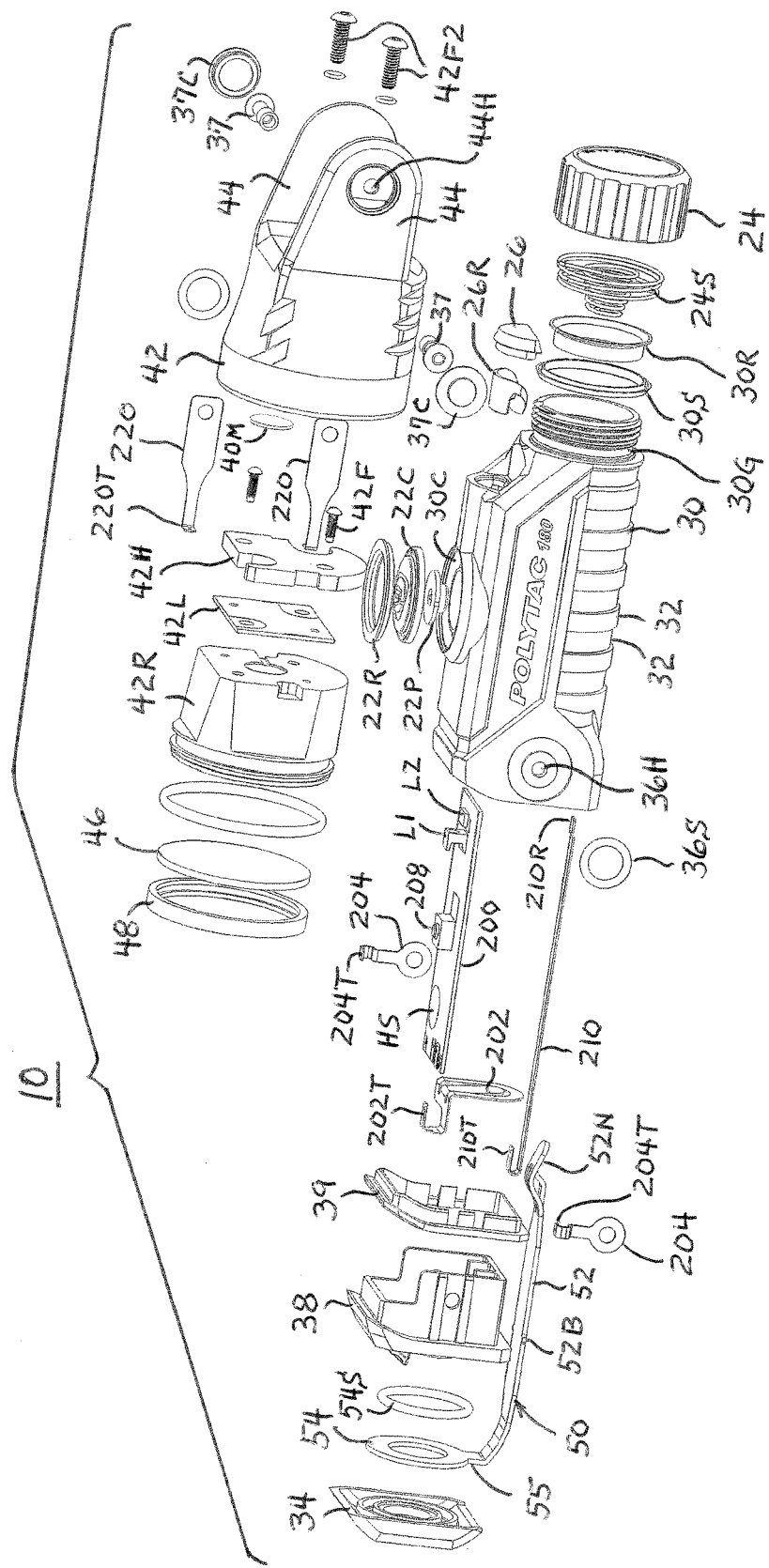
Figure 4C:
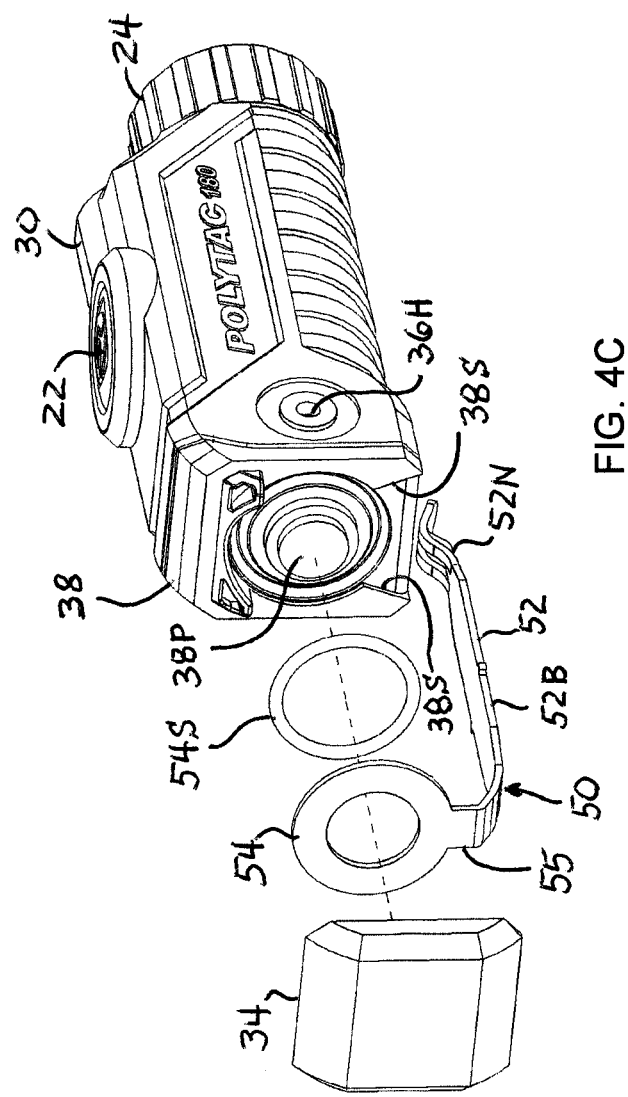
FIGS. 4C to 4F are partially exploded perspective views of parts of the light body and illustrating the attachment of a clip and the rotation thereof about the body thereof.
Figure 4D:
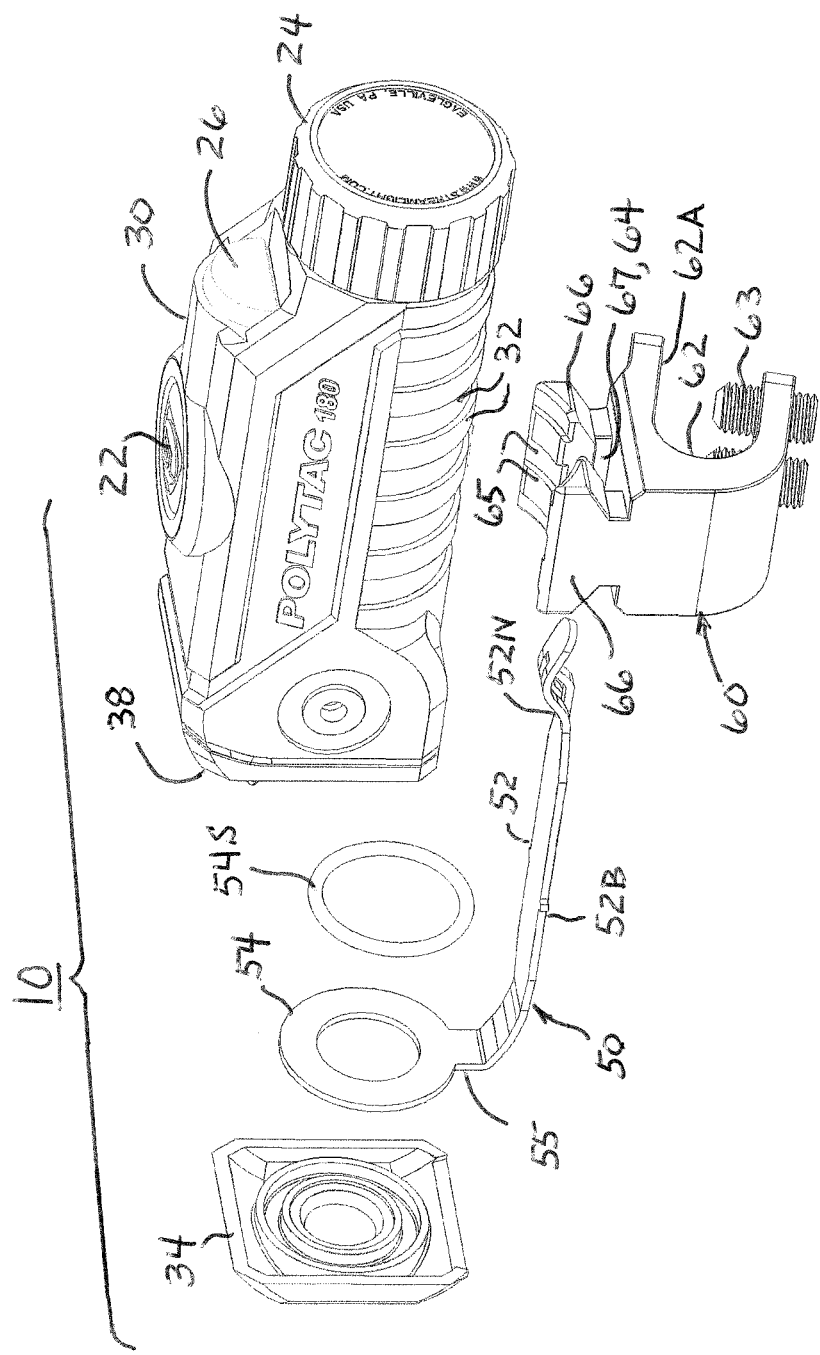
Figure 4E:
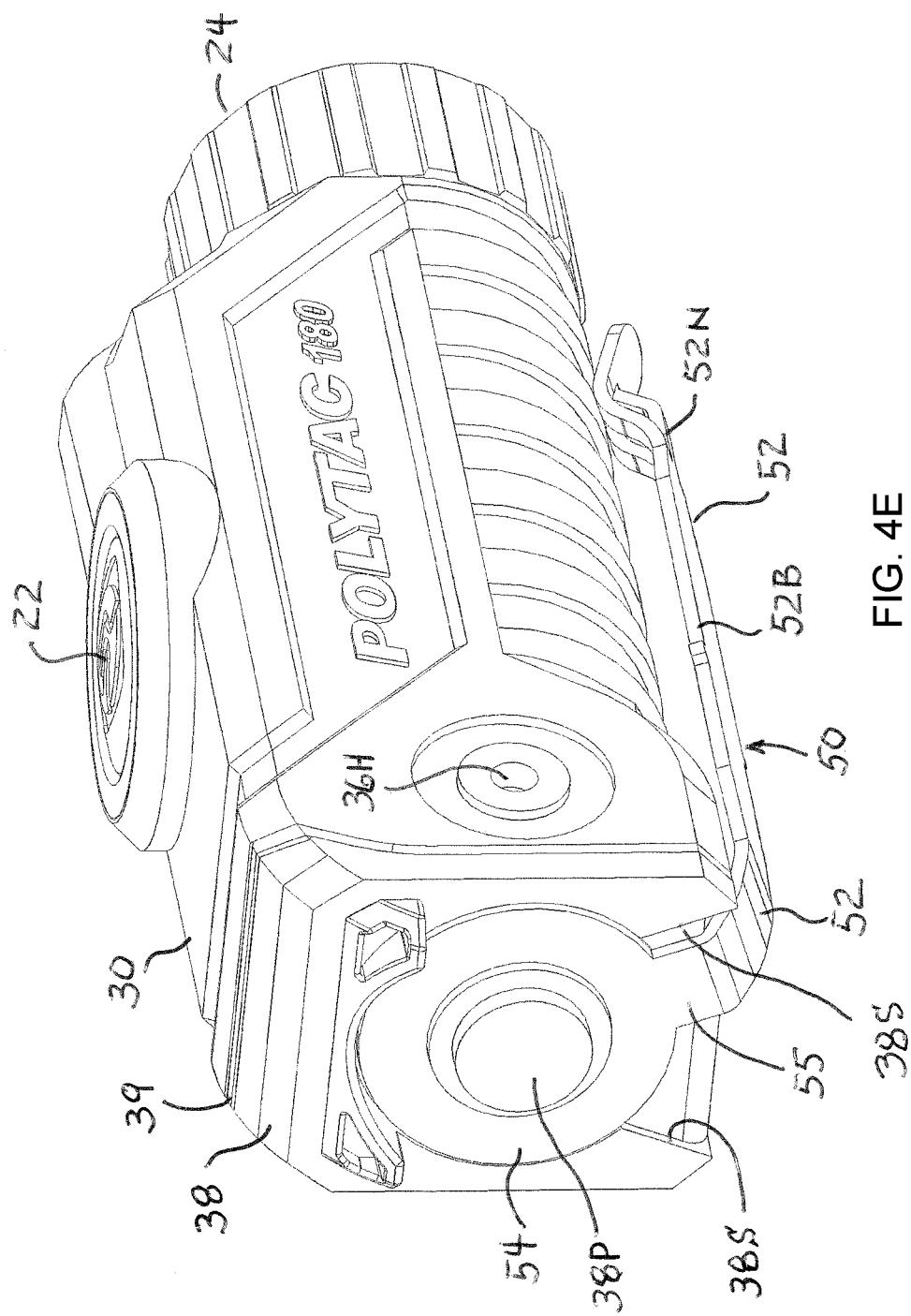
Figure 4F:
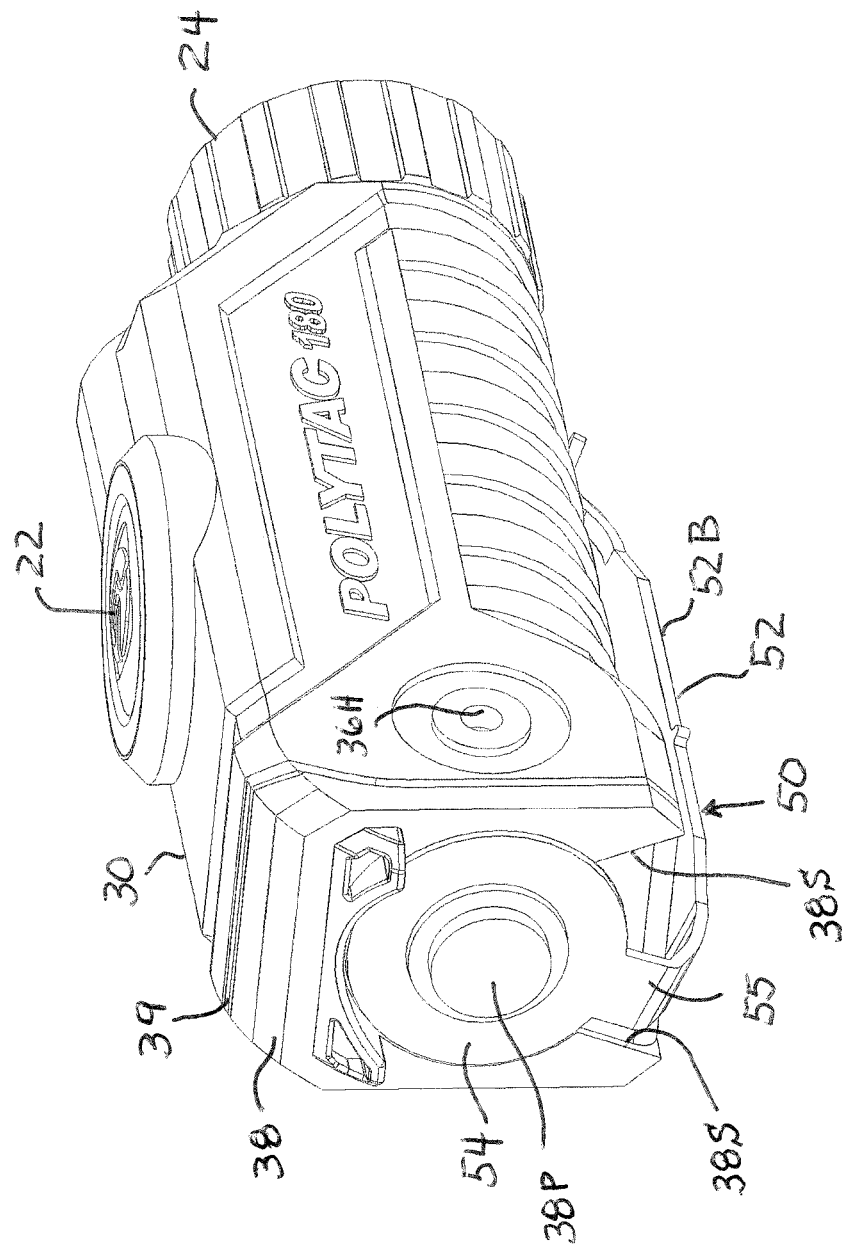
Figure 5A:
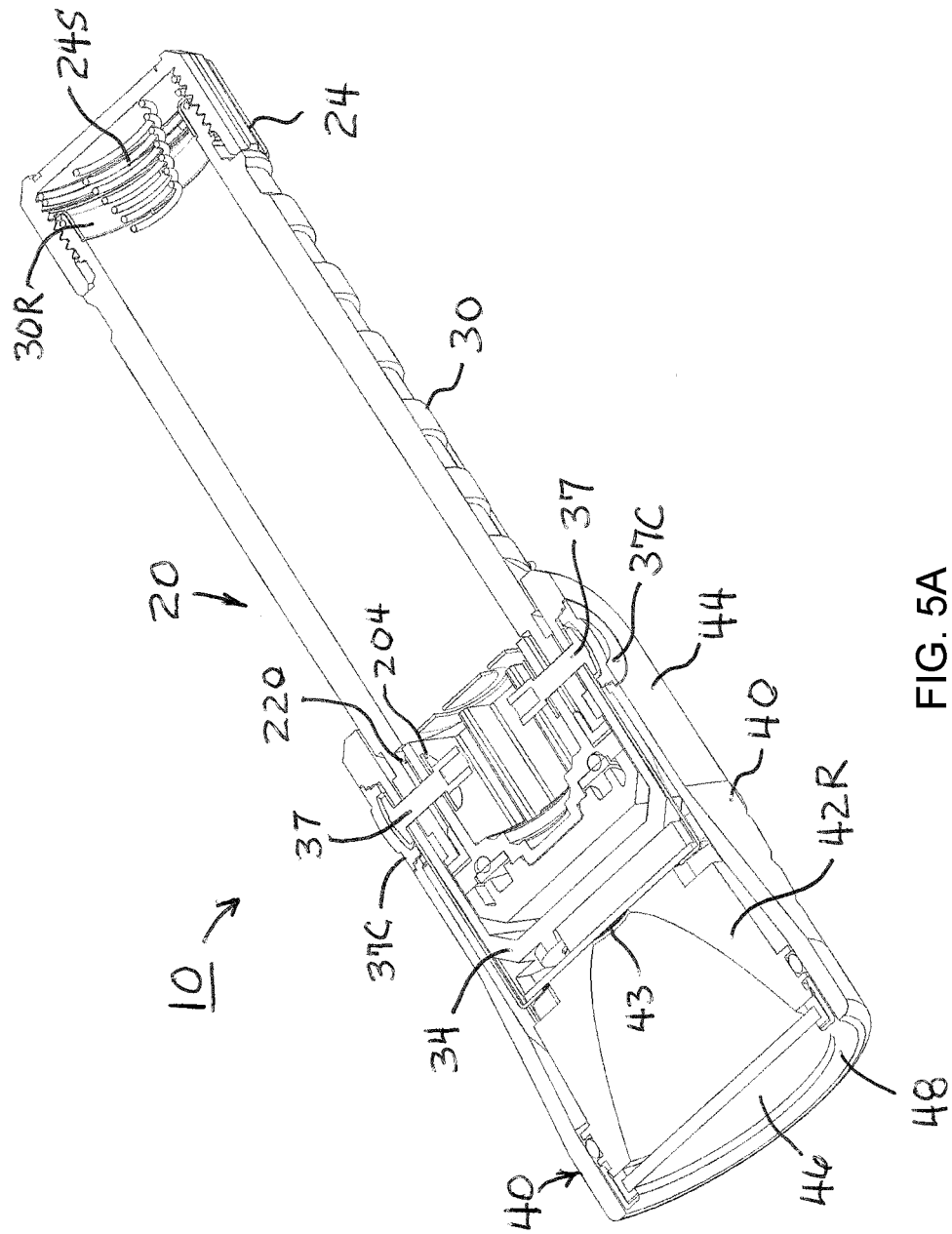
Figure 5B:
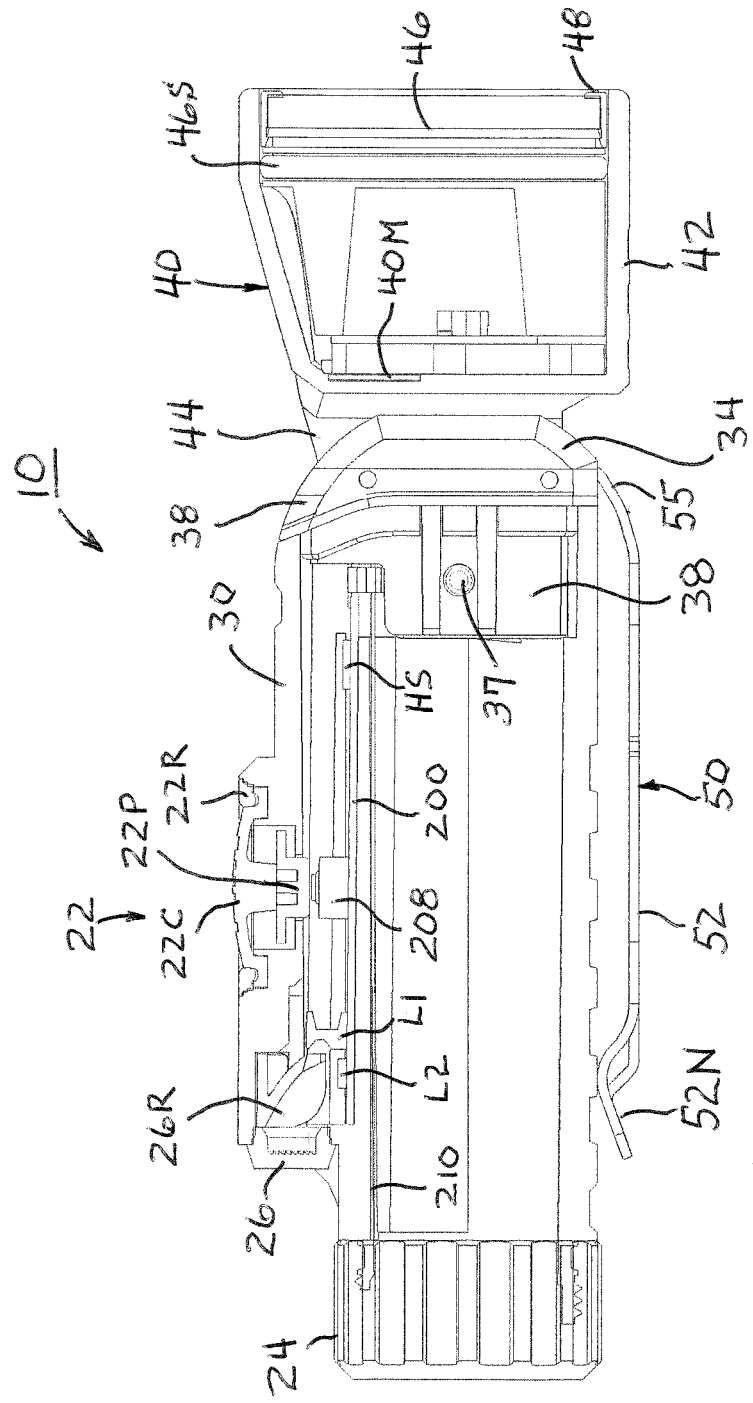
Figure 5E:
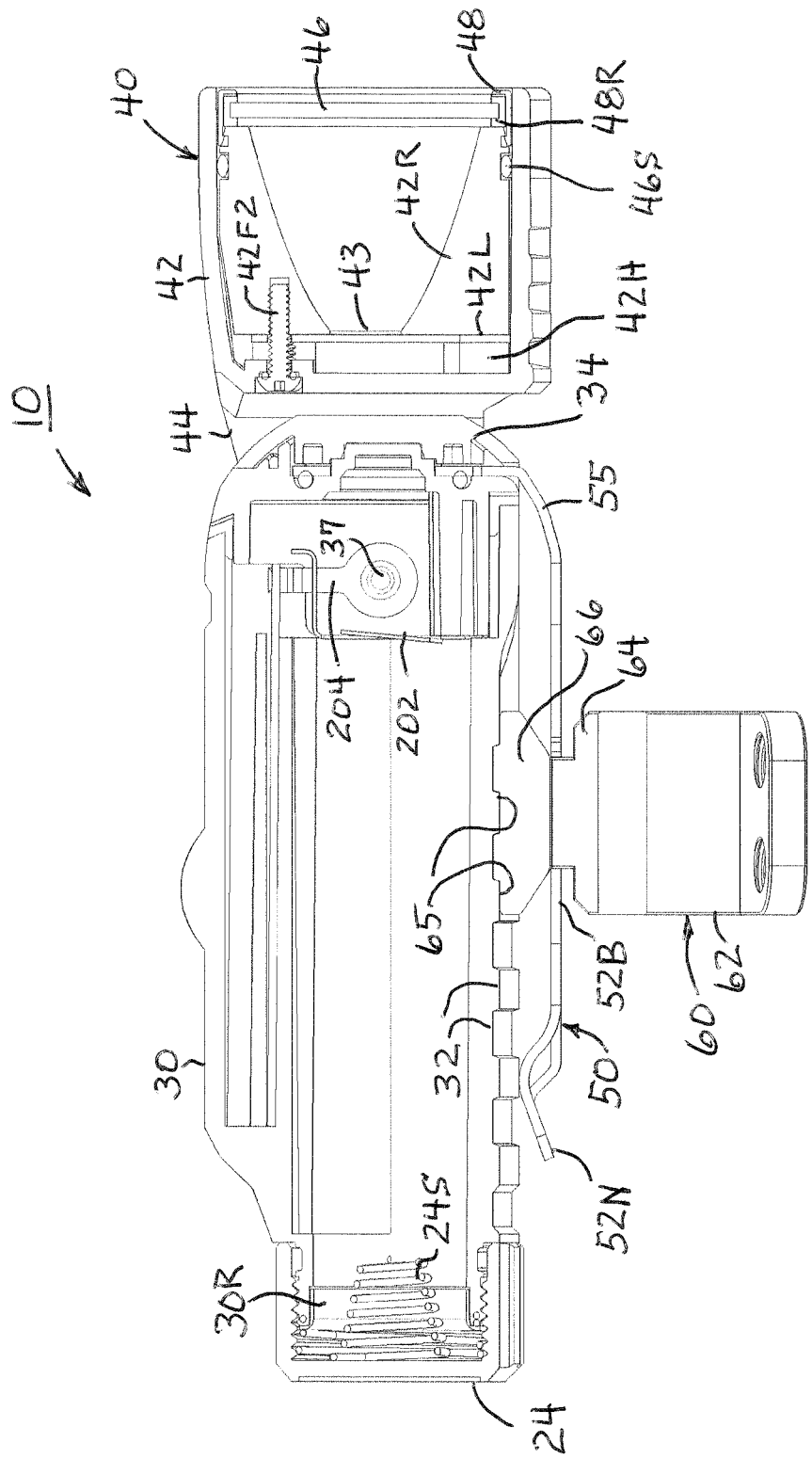

FIGS. 4A and 4B are exploded views of the example light of FIGS. 1A to 1D illustrating the various parts thereof, and FIGS. 4C to 4F are partially exploded perspective views of parts of the light body and illustrating the attachment of a clip and the rotation thereof about the body thereof; and FIGS. 5A to 5E are various cross-sectional views of the example light of FIGS. 1A to 1D taken in different planes, respectively.

Housing 30, which is the main housing for light 10, has an internal cavity for receiving a source of electrical power, e.g., a battery, such as a CR-123 Lithium battery or a type 18650 Lithium-ion battery or an AA alkaline battery, which can be installed and removed through the rearward end thereof when tail cap 24 is removed, e.g., unscrewed. A sealing ring 30S, e.g., an O-ring, is disposed in a circumferential groove 30G around the externally threaded end of housing 30. An annular contact ring 30R is seated at the rearward end of housing 30, e.g., of the threaded end thereof, for making electrical contact with the outer rings of contact spring 24S which is disposed and retained in the internal recess of tail cap 24.

A circular opening within a cylindrical feature 30C on the top of housing 30 receives a switch plunger 22P which is covered by a resilient switch boot or cover 22C which is retained in place by retainer ring 22R which may be fastened by adhesive, ultrasonic welding or another suitable fastener. When switch boot 22C is pressed, it and plunger 22P move toward the interior of housing 30 to press against and actuate an electrical switch 208 mounted on an electrical circuit board 200 in housing 30.

An opening at the forward end of housing 30 provides access for inserting and assembling various parts into the interior of housing 30. Among these are electronic circuit board 200 which resides in a plane substantially parallel to the top of housing 30 so that switch 208 thereon is aligned under switch plunger 22P for being actuated and so that light emitting diodes (LEDs) L1, L2 are located in desired positions relative to an optical element, e.g., reflector 26R, which resides behind lens 26 disposed in a D-shaped rearward facing opening on housing 30. Typically, switch 22, 208 serves to control all of the on/off and operating mode selections for light 10.

Connections between circuit board 200 and a battery in housing 30 are made via electrical conductors 202 and 210 which are attached, e.g., soldered or crimped, to respective contact pads on circuit board 200. Forward battery contact 202 has a C-shaped hook 202T at the top end thereof that is configured to be attached at the forward edge of circuit board 200, e.g., near the center of that edge, whereat it is soldered in place to a contact pad, and has a D-shaped central contact for making electrical connection with the forward terminal of the battery in housing 30, e.g., usually the positive (+) thereof. Elongated conductor 210 has a C-shaped hook 210T at the forward end thereof that is configured to be attached at the forward edge of circuit board 200, e.g., adjacent to, but insulated from, contact 202 near the center of that edge, whereat it is soldered in place. Elongated conductor 210 has a slight offset at the rearward end 210R thereof that fits tightly between contact ring 30R and the interior wall of the threaded end of housing 30, and optionally, may be soldered or welded together. Thereby, electrical connection is provided between circuit board 200 and the rearward terminal of the battery, e.g., usually the negative (−) terminal thereof, via conductor 210, contact ring 30R and contact spring 24S when a battery is in housing 30 and tail cap 24 is threaded thereon.

Housing 30 has opposing aligned holes 36H for receiving fasteners 37, e.g., pivot pins 37, for providing a hinged or pivot joint 36 for pivotably supporting light head 40. A pair of O-rings 36S provide both a seal and a source of friction for retaining light head 40 in a desired pivoted position to which it is pivoted by a user relative to housing 30. Respective trim caps 37C snap into place or are otherwise fastened, e.g., by adhesive or ultrasonic weld, in place to cover the exposed ends of pivot pins 37.

Each of a pair of opposing electrical conductors 204 has a respective C-shaped hook 204T at the top end thereof that is configured to be attached at the side edge of circuit board 200, e.g., near the forward ends of the respective side edges thereof, whereat each is, e.g., soldered in place. Each conductor 204 has a flat portion that extends downward adjacent the interior surface of housing 30 with an annular ring and hole therein that aligns with a respective hole 36H of housing 30. With pivot pin 37 in place, each conductor 204 serves as one end of a slip ring connection with a corresponding annular ring and hole of a respective conductor 220 that extends rearwardly along the inner surface of a support arm 44 of light head housing 42. Each pivot pin 37 provides electrical connection between the respective annular rings of conductors 202 and 220, thereby to provide a pair of slip ring electrical connections through pivot joint 36 whereby electrical power may be provided across those pivot joints 36 to the light source of light head 40.

Interface ring 39 fits into the opening in the forward end of housing 30 and receives forward end 38, both of which are retained to housing 30 by adhesive, ultrasonic weld or another suitable fastener, thereby retaining circuit board 200 and the parts 202, 204, 210 thereof in place in housing 30. Housing end 38 has a post 38P centrally located thereon for receiving an annular mounting ring 54 of clip 50. An O-ring 54S disposed in a groove surrounding post 38P bears against annular mounting ring 54 so as to provide frictional restraining force for retaining clip 50 in a desired rotational position to which it is moved by a user. A grease or other lubricant may be applied to O-ring 54S so as to allow easier movement while maintaining frictional retention in position. End cap 34 is fastened to housing forward end 38, e.g., by adhesive, ultrasonic weld or another suitable fastener, so that clip 50 is rotationally movable on housing 30 and is permanently retained thereon. Thus, clip 50 is movable (rotatable) about the longitudinal axis 16 of light 10 with its elongated clip arm 52 adjacent to the exterior surface of housing 30.

In a preferred embodiment, the rotational movement of clip 50 is limited by shoulders 38S of forward housing end 38 which restrict the rotational movement of short section 55 of clip 50 which joins annular mounting ring 54 to elongated clip arm 52. Limited rotational movement of clip 50 can be provided over about 90° of rotation, however, in a typical embodiment rotation may be limited to about 45° of rotation, or even to about 30° of rotation, as may be desired. It is noted that the angle limitation is defined by the angular positions of shoulders 38S and it is also preferred that the permitted angle of rotation be substantially centered at about 180° of rotation from the top side of housing 30 and light 10.

Preferably, but optionally, rotational movement of clip 50 about housing 30 is relatively symmetric in both directions about a central position which is diametrically opposite to (e.g., about 180° radially around from) switch actuator 22, whereby when light 10 is attached to a person or an object, it may be actuated, e.g., turned on and off, and placed into any available programmable operating state, by pressing on actuator 22 which preferably is a pushbutton actuator that responds to being pressed radially toward housing 30.

Light head 40 comprises a head housing 42 which has a circular opening at the forward end thereof into which reflector 42R fits. Reflector 42R has a circular forward end to which lens ring 48 is a snap fit, but alternatively may have, e.g., external threads thereon onto which lens ring 48 threadingly attaches. Annular lens retainer and seal 48R has a circumferential groove on its internal surface into which lens 46 fits, e.g., lens 46 and retainer 48R being retained inside lens ring 48 by an inward circular flange at the forward end thereof. O-ring 46S provides a seal between reflector 42R and head housing 42.

Reflector 42R has a curved interior reflective surface having a shape configured for forming light produced by a light source, 43, e.g., an LED light source 43, generally centrally disposed at the base or rearward end thereof. LED 43 is substantially centrally located on LED circuit board 42L which has printed wiring conductors thereon for electrically connecting the respective terminals of LED 43 to electrical conductors 220. Each electrical conductor 220 has a bent tab 220T at the forward end thereof that electrically connects to a conductor of LED circuit board 42L, e.g., by being soldered thereto, and has a hole near the rearward end thereof that aligns with the hole 44H for providing the slip ring contact between the exterior of light housing 30 and the extended arms 44 of light head 40 for making electrical connection to pivot pin 37.

LED circuit board 42L may have broad conductors on one or both sides, may have solder-filled through holes and/or other thermally conductive features so as to increase thermal conductivity between the forward facing surface thereof on which LED 43 is mounted and the rearward facing surface thereof. Abutting the rearward facing surface of circuit board 42L is a heat spreader 42H having a relatively high thermal conductivity for further aiding in removing heat generated by LED 43. Further, reflector 42R may also be of a material having relatively high thermal conductivity for further aiding in removing heat generated by LED 43. Fasteners 42F engage holes in the rearward end of reflector 42R to attach LED circuit board 42L and heat spreader 42H to the rear surface thereof, which is preferably generally flat, and, preferably closely abutting each other. The interfaces between LED circuit board 42L, heat spreader 42H and the rear surface of reflector 42R may include material, e.g., a thermal grease, silicone or other material, for enhancing thermal conductivity therebetween.

Reflector 42R with circuit board 42L and heat spreader 42H attached to the rearward end thereof, and with lens ring 48 and lens 46 attached to the forward end thereof, is inserted into the interior cavity of head housing 42 with the holes of conductors 220 aligned with the respective holes 44H of arms 44, and is retained therein by additional fasteners 42F2, which pass through holes in circuit board 42L and heat spreader 42H, engage holes in the rearward surface of reflector 42R to pull reflector 42R into housing 42 and retain it therein. Optionally, an O-ring may be provided for each fastener 42F2 as a seal.

Further detail of the slip ring electrical connections of pivot joint 36 may be seen in the cross-sectional views wherein a respective pivot pin 37, e.g., a metal pin 37, that is formed at its shank end that is internal to housing 30 to retain pivot pin 37 in pivot joint 36 while providing electrical connection between conductor 202 which connects to electrical circuit board 200 and conductor 220 which connects to LED circuit board 42L. Also visible therein are details of the positioning of contact ring 30R on the rearward end of housing 30 and in making connection to contact spring 24S of tail cap 24.

In particular, the side cross-sectional views illustrate the internal arrangement within housing 30 of circuit board 200, of switch 208 thereon and its position relative to flexible cover 22C and plunger 22P of actuator 22, and of LEDs L1 and L2 thereon relative to an optical element, e.g., a reflector 26R and lens 26. Preferably, switch 208 and its actuator are in a position adjacent to and centered under plunger 22P and cover 22C. Also visible are the respective positions of Hall-effect sensor or detector HS on circuit board 200 and of magnet 40M on the rearward wall of light head 40 as well as their relative positions when light head 40 is pivoted to a forward directed rotational position and when light head 40 is pivoted to a pivoted upward by about 90° when Hall-effect sensor HS and magnet 40M come into relatively close alignment, the function of which is described below. The arrangement of mounting bracket 60 mounted on clip 50 is also visible in certain of the Figures and is described below.

Figure 6A:
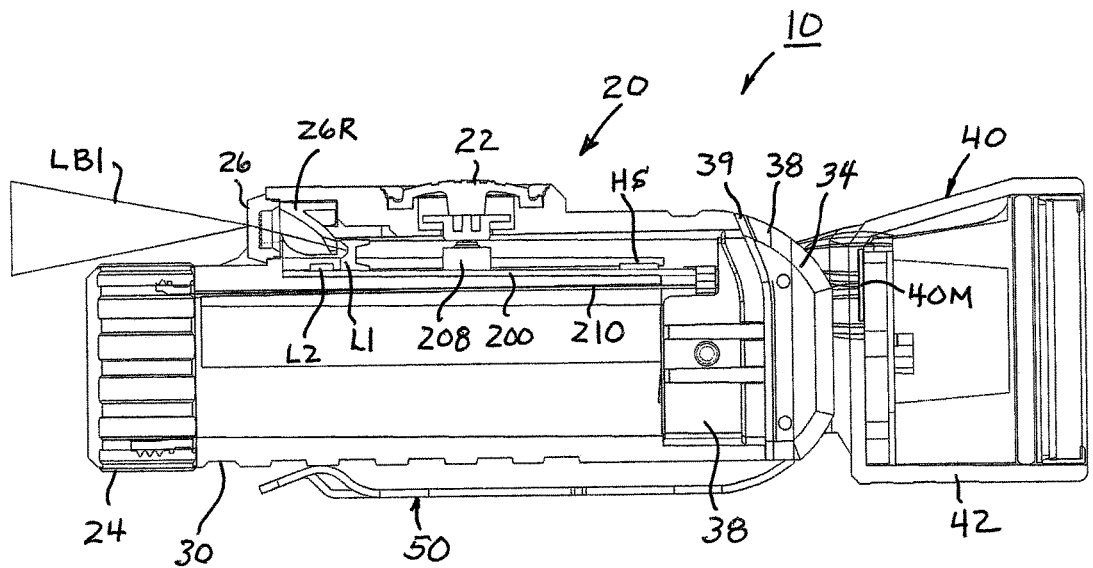
FIGS. 6A and 6C are cross-sectional views of the example light of FIGS. 1A-1D illustrating an example embodiment of a safety light feature thereof.
Figure 6C:
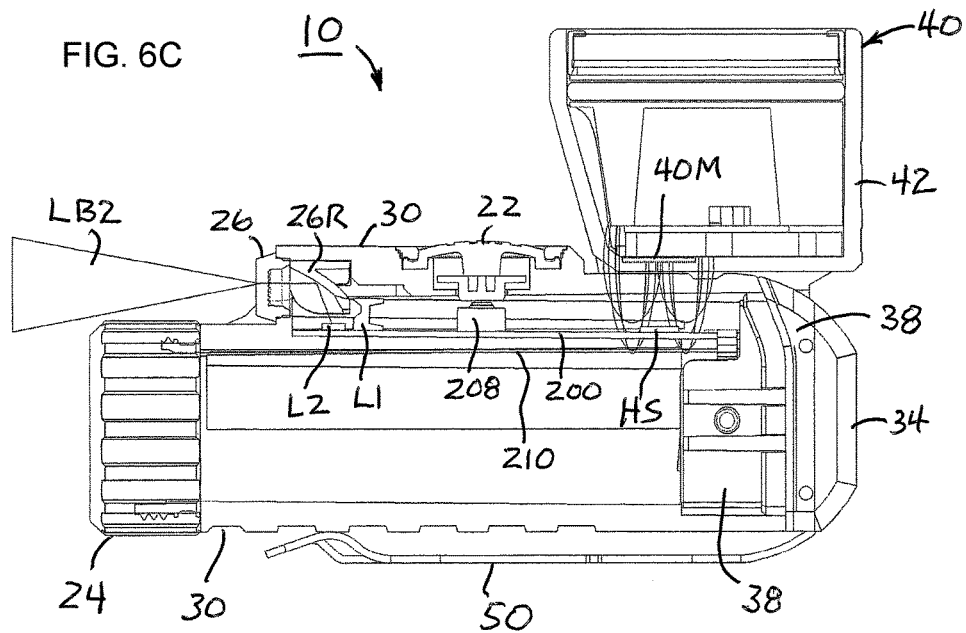
Figure 6B:
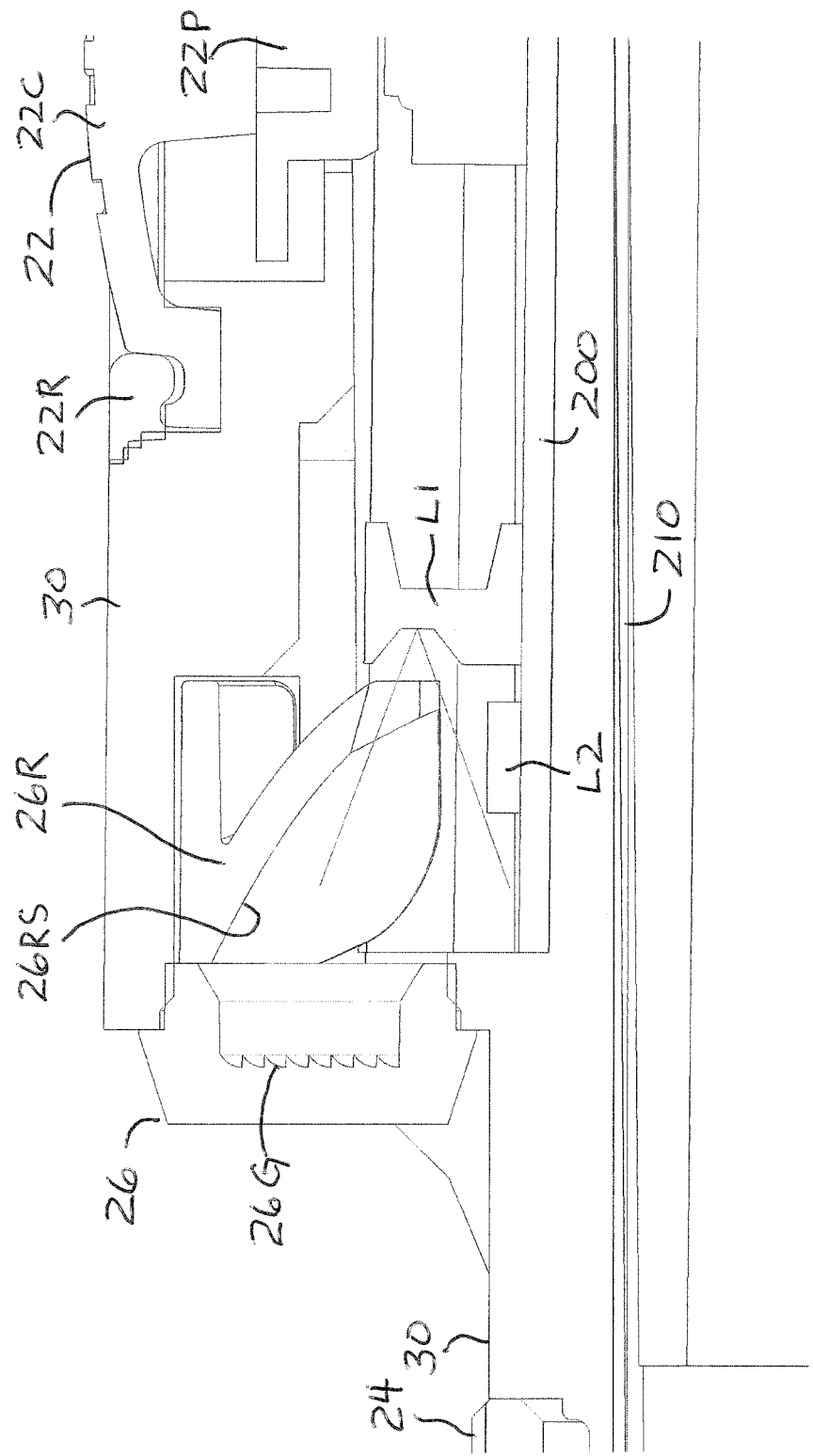
FIGS. 6B and 6D are enlarged details thereof, respectively.
Figure 6D:
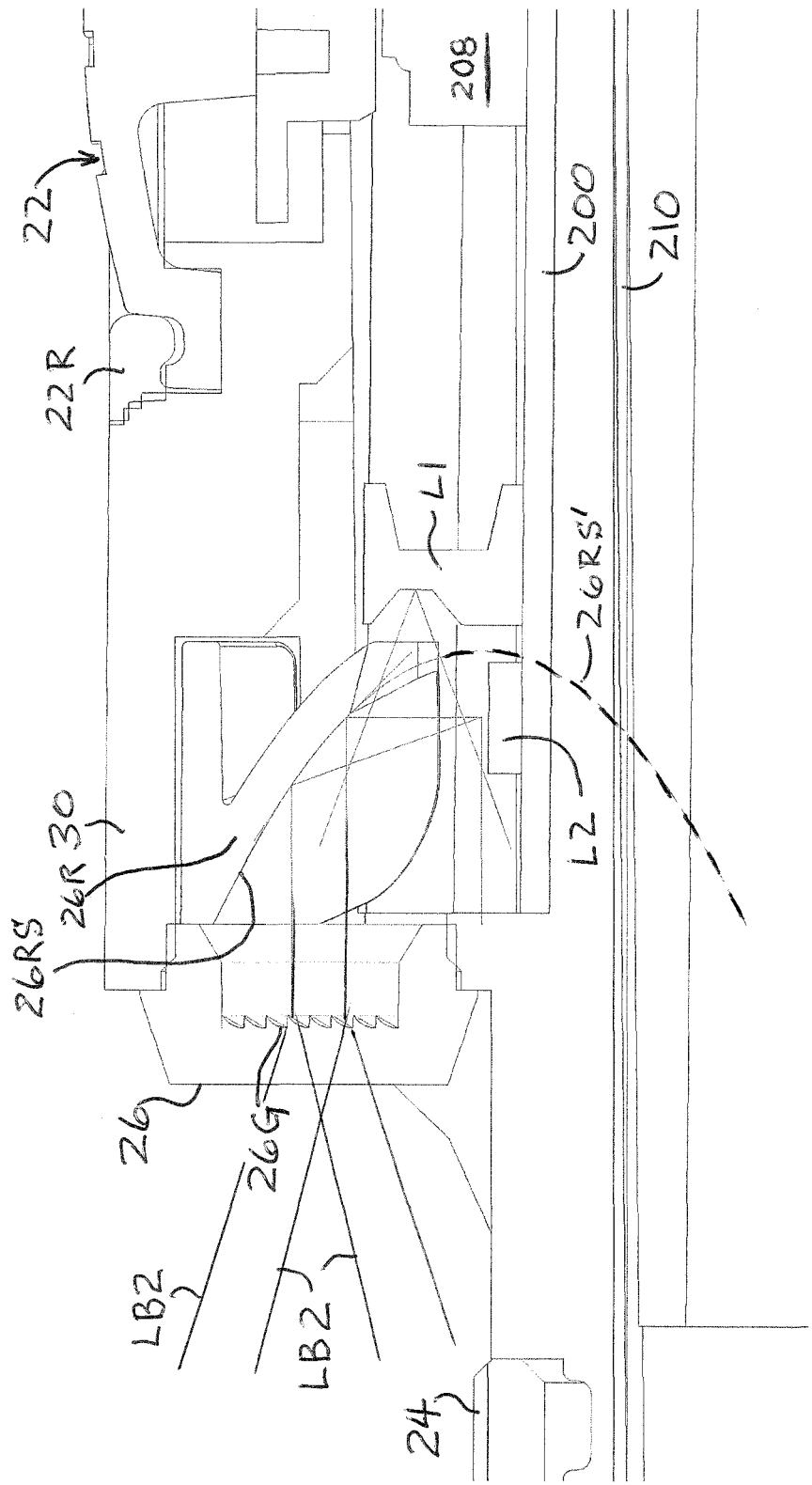

FIGS. 6A and 6C are cross-sectional views of the example light of FIGS. 1A-1D illustrating an example embodiment of a safety light feature thereof, and FIGS. 6B and 6D are enlarged details thereof, respectively. Light produced by LED 43 of light head 40 is directed forwardly of light head 40 generally along longitudinal axis 16 and up to about +90° relative thereto as light head 40 is pivoted about hinge or pivot joint 36, and is preferably a relatively high brightness relatively narrow beam, e.g., a spot beam, for providing illuminating light directed forwardly and in directions to which light head 40 may be pivoted. In addition, a second source of light L1, L2 is provided for directing light rearwardly through an optical element, e.g., lens 26, and in a generally rearward direction, e.g., as defined by longitudinal axis 16.

Such rearwardly directed light is often provided so as to be a safety light or safety beacon so that persons behind the user of light 10 can locate such user by seeing the safety beacon. Common uses of such safety beacon are for firefighters and other first responder personnel where smoke, mist, fog and/or darkness may render such user difficult to find. For a firefighter user the safety beacon is often a blue light because blue is distinguishable from the light produced by fire which is largely in the yellow and red end of the visible spectrum. For other users, other colors of safety beacon light may be provided, e.g., red light where it is desired that night vision not be impaired thereby, or even infrared (IR) light where it is desired that only following personnel who have night vision equipment can see the safety beacon, e.g., as for tactical military personnel.

To that end, light 10 includes a light source that produces two different colors and/or intensities of light and an optical element to direct that light rearwardly. In one example embodiment, light 10 has a light source L1 mounted to circuit board 200 in a way that the light LB1 produced thereby is directed rearwardly towards lens 26 through which the light of the safety beacon exits light 10 in a generally rearward direction. Light source L1 is preferably an LED L1 that is packaged such that when it is mounted to a circuit board 200, its light LB1 is directed in a direction generally parallel to the surface on which it is mounted. That light in large measure passes through the space defined interior to generally parabolic half-reflector 26R without relying on the reflective surface 26RS thereof for beam forming to impinge upon lens 26, although any light from LED L1 that impinges on reflective surface 26RS will tend to be directed towards lens 26.

The lens portion of lens 26 is D-shaped, e.g., is substantially semicircular, and has a series of concentric partially annular grooves 26G, e.g., on its inner surface that serve to spread the beam of light produced by LED L1 into a relatively well defined, but wide, light beam LB1 so that the safety beacon will be focused to be visible over a relatively wide range of angles rearward of light 10. Thus safety beacon LB1 preferably is, e.g., essentially a relatively flood-like beam rather than a tight spot beam (as also will be light beam LB2).

The annular grooves 26G of lens 26 serve to broaden light beams LB1 and LB2 from LEDs L1 and L2, respectively, and preferably are arcuate laterally so as to form, or at least approximate a part of a Fresnel lens. The partial annular grooves 26G are preferably sawtooth shaped in cross-section in that one side or arcuate surface, e.g., the upward facing sides or arcuate surfaces, of the grooves are relatively steep, e.g., are substantially perpendicular to the plane of lens 26 while the other sides or annular surfaces, e.g., the downward facing sides or annular surfaces, are sloped at an angle, e.g., at various angles over a range of angles at about 40-50°, and may be slightly concave, so as to spread the light passing through lens 26 to form a desired beam LB1, LB2.

Reflector 26R may be referred to as a "half reflector" in view of it having an approximately semicircular opening, e.g., a D-shaped opening, at its wide end and having a reflective surface 26RS substantially defining a half parabola or other curved less than circular shape. This arrangement is considered to be more space efficient when utilized with a suitable light source and to capture more of the intense light emitted by the LED. Reflector 26R also has a semi-cylindrical projection to its rear, e.g., forwardly when installed in housing 30, which fits into a complementary recess in housing 30 for supporting reflector 26R in a desired position and orientation relative to lens 26, circuit board 200 and LEDs L1 and L2 thereon.

The second light source preferably also includes a second LED L2 that is, e.g., mounted to the surface of circuit board 200, in a location whereat it is substantially at or near the focus of the parabola 26RS' of which reflective surface 26RS defines a part. LED L2 produces light that is directed generally away from circuit board 200 to mainly impinge on reflective surface 26RS of reflector 26R. Reflective surface 26RS' is configured for receiving light emanating from light source LED L2 and forming that light into a beam that is directed rearwardly towards and through lens 26, e.g., as a path illuminating flood beam when light 10 is held in hand or is attached to the front of a person.

Preferably the reflective surface 26RS of reflector 26L defines a portion of a parabola that has its focus or focal point outside of the space within reflector 26R so that a light source, e.g., LED L2, mounted to a circuit board 200 adjacent to reflector 26R will emit light substantially from a location that is at or proximate to the focal point of the parabolic reflective surface 26RS. The parabola is more completely illustrated by surface 26RS and dashed line 26RS' wherein surface 26RS is the portion of that parabola 26RS' that forms the reflective surface of reflector 26R. Reflector 26R has an opening near its base through which light produced by LED L1 passes going toward lens 26.

Lens 26 may be retained on housing 30 by any suitable fastener, e.g., by friction fit, by adhesive, by ultrasonic weld and the like. Similarly, reflector 26R may be retained in its recess in housing 30 by any suitable fastener, e.g., by friction fit, by adhesive, by ultrasonic weld and the like.

In one example embodiment, safety beacon light source LED L1 produces blue light and operates at least when light head 40 produces illuminating light, although the light source 43 of light head 40 and the second light sources L1, L2 may be independently controlled, programmed and/or actuated, e.g., by variations of pressing and releasing actuator 22. Light source LED L2 therein produces white light and may be activated when light head 40 is pivoted, preferably in the direction away from clip 50, by a substantial angle and up to about 90° as illustrated in FIG. 6C.

Preferably, pivoting light head 40 can cause light producing elements L1 and/or L2 to activate and/or deactivate at a predetermined angle of pivoting. The predetermined angle, which need not be particularly precise, is responsive to the strength of magnet 40M, the relative positions of magnet 40M and Hall-effect detector HS, and the sensitivity of the detector HS, each of which may be adjusted in obtaining such activation and/or deactivation at about a particular or desired angle. Predetermined angles of pivoting between about 60° and about 90° are presently considered desirable.

With light head 40 so positioned, magnet 40M in light head 40 is opposite (i.e. is sufficiently close to) Hall-effect sensor HS on circuit board 200 in housing 30 so that the magnetic field, e.g., as represented by field lines MFL, of magnet 40M impinge upon Hall-effect sensor HS. When Hall-effect sensor HS detects the presence of that magnetic field exceeding a predetermined threshold it causes a controller on circuit board 200 to respond to energize white light source LED L2 and to de-energize blue light source LED L1. When light head 40 is pivoted away from that rotational position, the strength of the magnetic field at Hall-effect sensor HS decreases until it falls below the detection threshold of Hall-effect sensor HS whereupon the controller de-energizes white light source LED L2 and energizes blue light source LED L1.

The foregoing feature may be better appreciated by viewing FIG. 6C rotated 90° counter-clockwise so that longitudinal axis 16 is vertical such that light head 40 is at the top end of light 10 and tail cap 24 is at the bottom end thereof. A person using light 10 in this position would either grip housing 30 with a hand or use clip 50 to mount light 10 to himself, e.g., to attach light 10 to the person's clothing or to other wearing apparel or equipment. In this orientation the light produced by light head 40 is directed forwardly, e.g., on that person's work or ahead to where he might be moving. In addition, the white flood beam produced by LED L2 and exiting through lens 26 is directed downwardly so as to light the way immediately forward of the person, thereby to reduce the likelihood of tripping or stumbling upon an obstacle or into a hole.

Thus, light 10 includes features that enable it to serve at least two different purposes and situations, e.g., one as a helmet mounted illumination and safety light and a second as a body-mounted or hand-held flashlight. Moreover, changing light 10 from one purpose to the other is facilitated by the light 10 being easily mountable and demountable by engaging and disengaging clip 50 from mounting bracket 60. A further convenience is provided because mounting bracket 60 may remain mounted to a helmet or other object while light 10 is removed and used for another purpose.

Figure 7A:
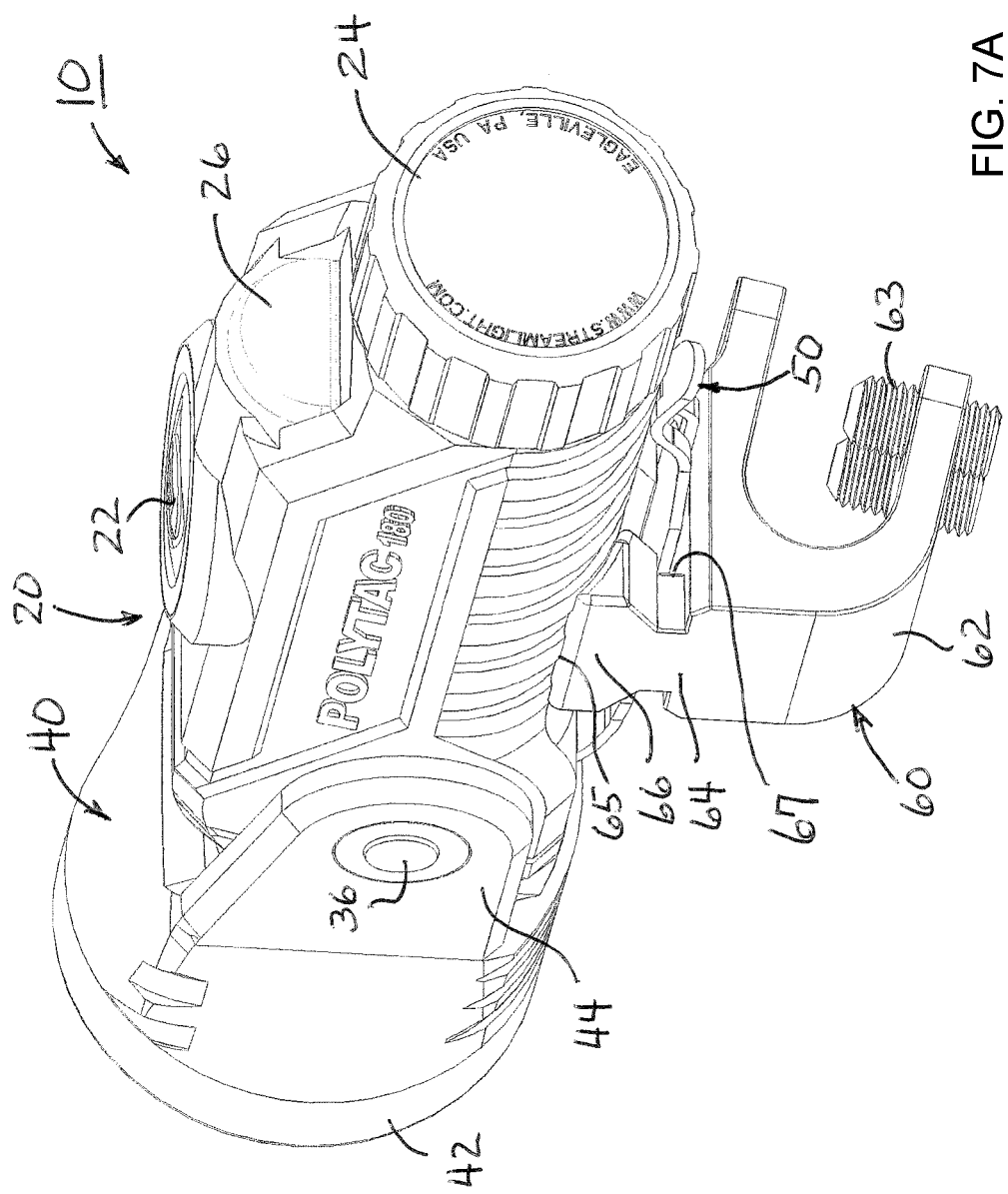
FIGS. 7A to 7B are respective perspective views illustrating an example embodiment of a clamp bracket attached to the clip of the example light of FIGS. 1A to 1D, FIGS. 7C and 7D are enlarged views thereof.
Figure 7B:
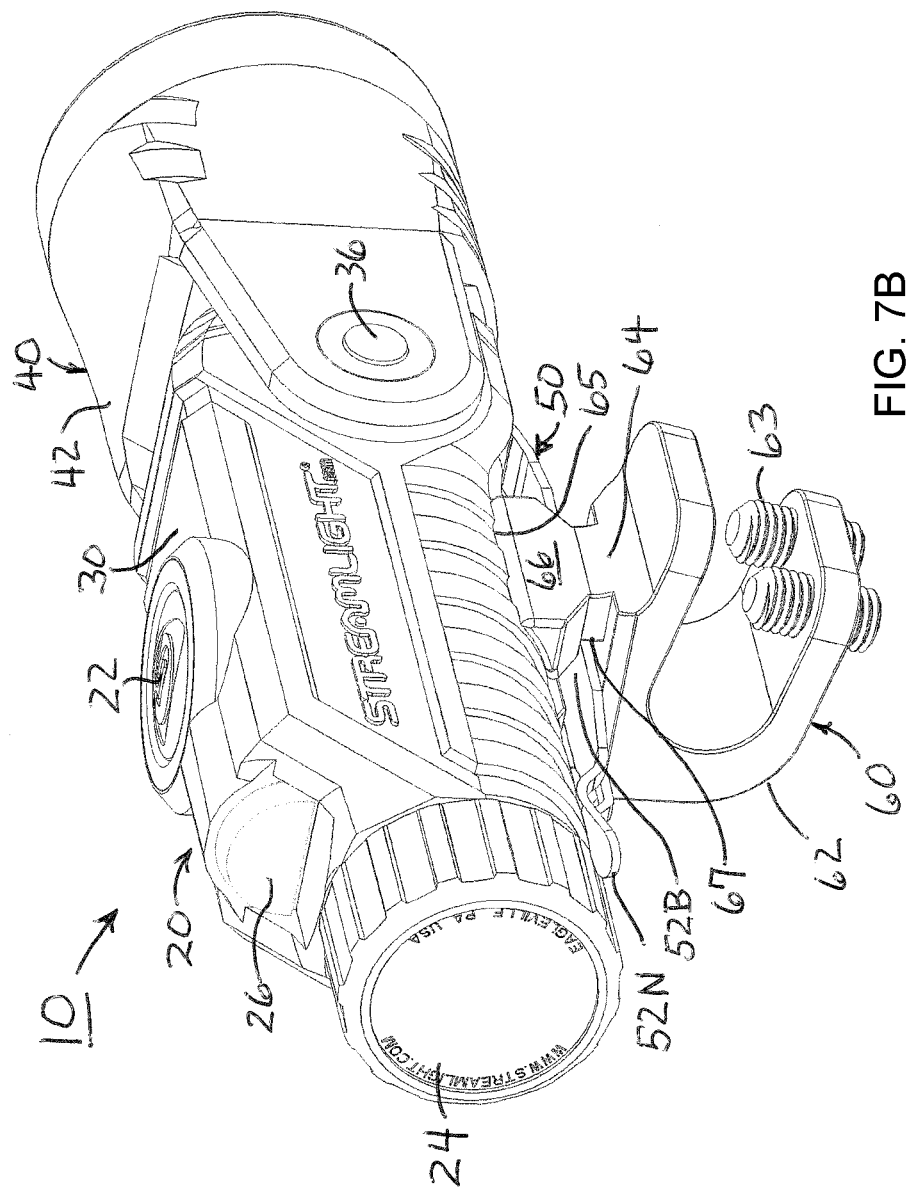
Figure 7C:
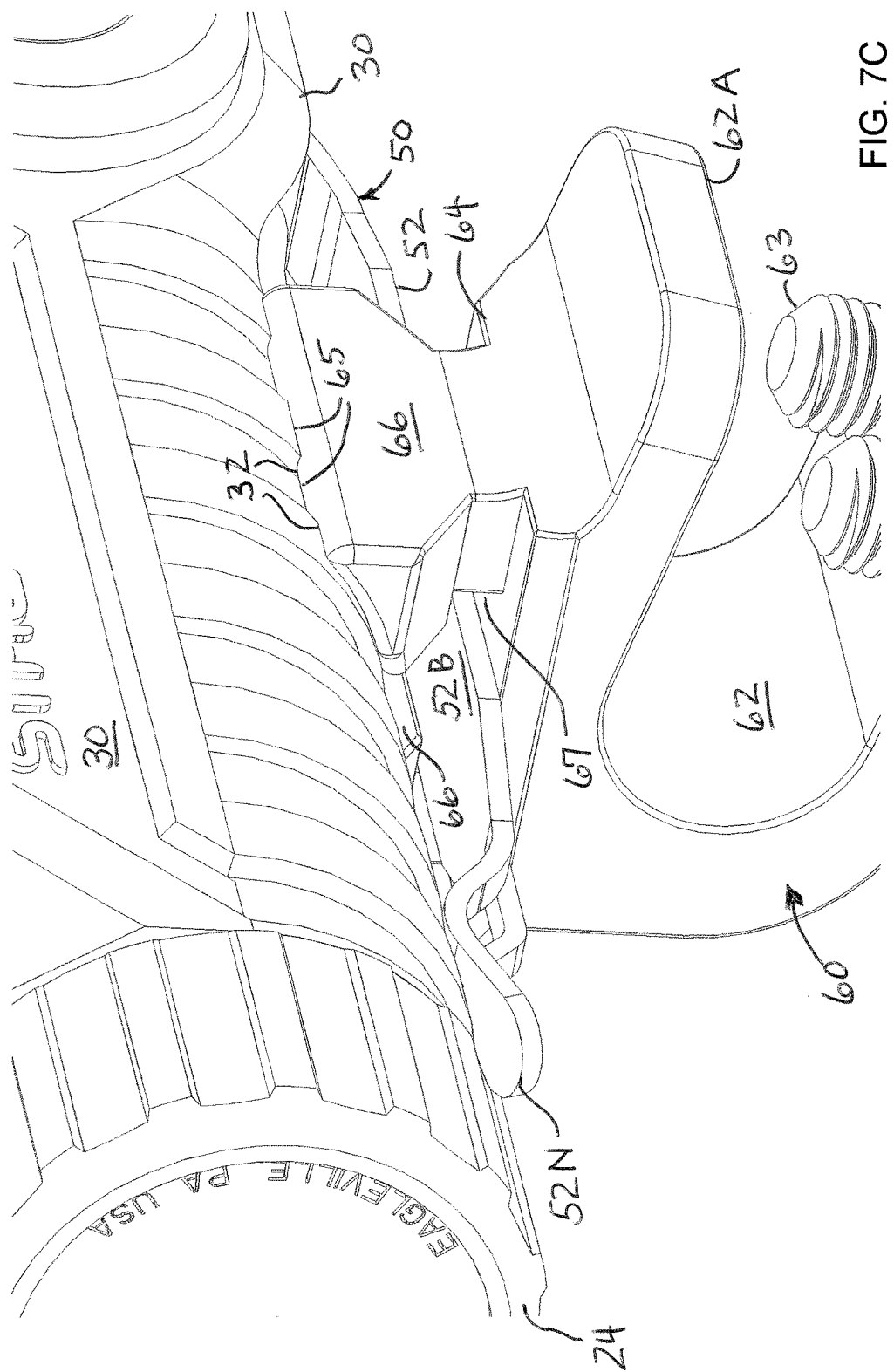
FIGS. 7E and 7F are perspective views of the example clamp bracket attached to the clip.
FIG. 7G is a plan view thereof.
Figure 7D:
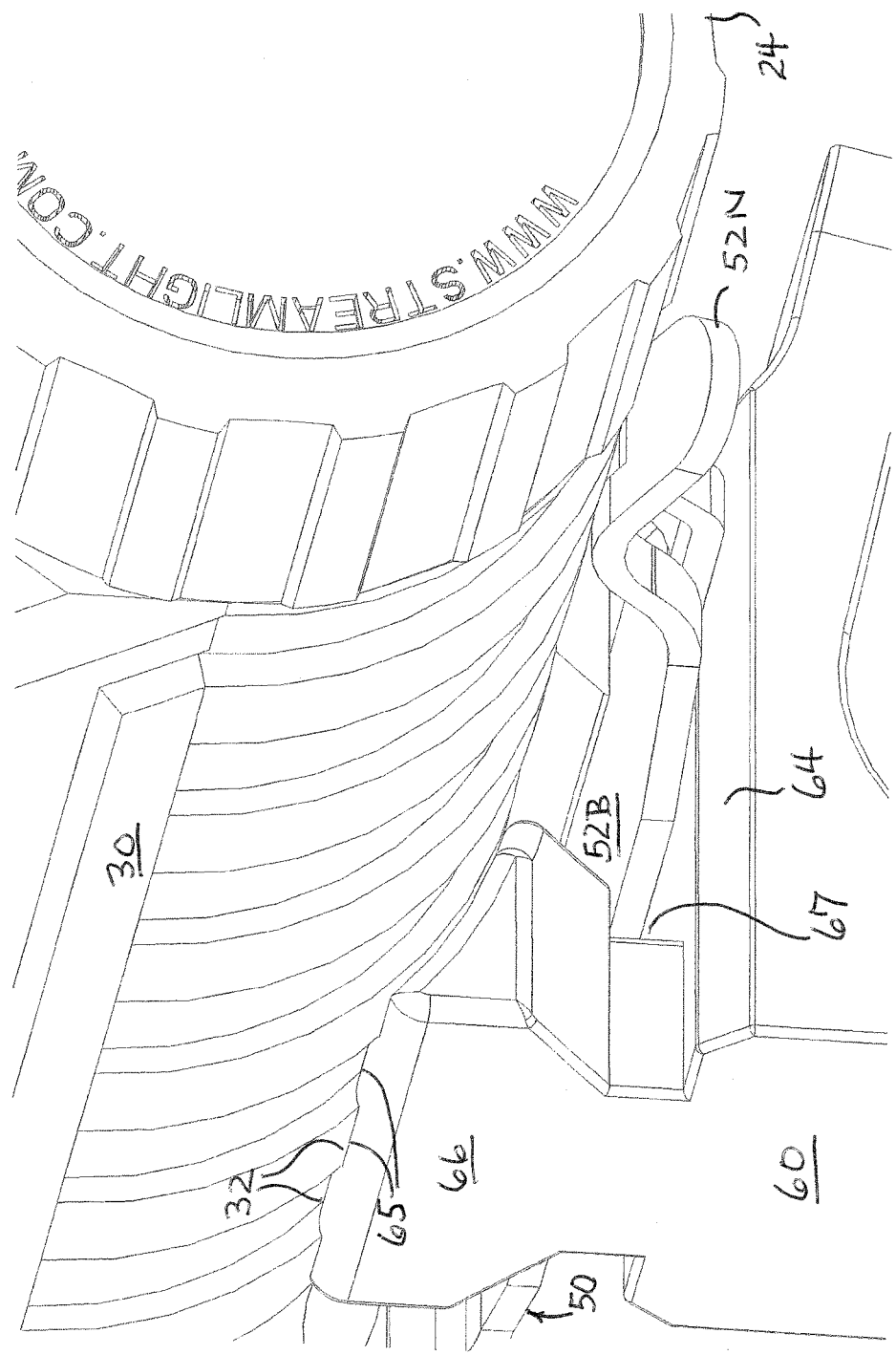
Figure 7E:
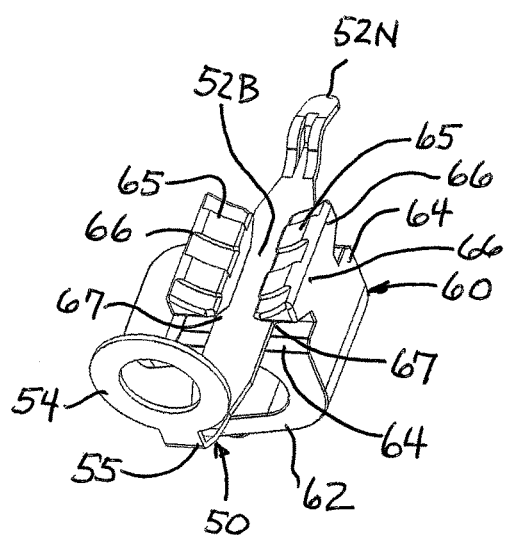
Figure 7G:
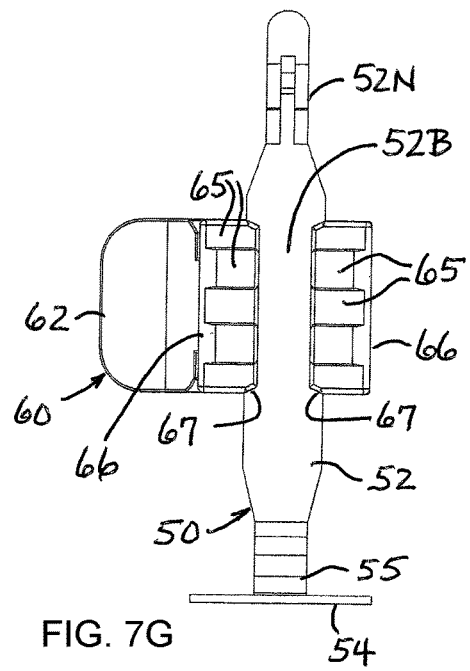
Figure 7F:
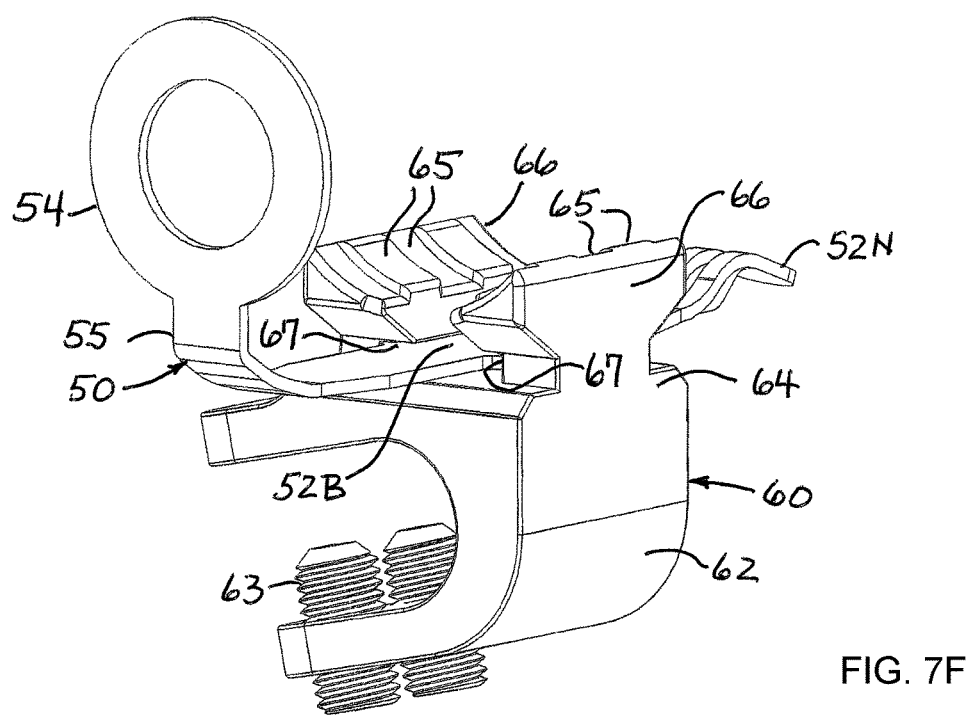

FIGS. 7A to 7B are respective perspective views illustrating an example embodiment of a clamp bracket 60 attached to the example clip 50 of the example light 10 of FIGS. 1A to 1D, FIGS. 7C and 7D are enlarged views thereof, FIGS. 7E and 7F are perspective views of the clamp bracket 60 attached to the clip 50, and FIG. 7G is a plan view thereof. Where a mounting bracket 60 or other accessory is permanently attached to a light it may limit the uses of such light.

Light 10 avoids such limitation by being configured to receive a number of different accessories that are mountable and removable from light 10, e.g., from elongated clip 50 thereof, because the various different accessories utilize a common mounting configuration, thereby to be interchangeable and alternatives one to another. One example of such accessory and the manner in which it and other accessories may be mounted and removed from elongated clip 50 of light 10 is now described, while other examples will be described below.

One example of such accessory is a mounting bracket 60 that can easily be attached to clip 50 and can easily be removed therefrom. Clip 50, which is rotatable about housing 30 and longitudinal axis 16, at least to a limited extent, preferably includes an elongated clip arm 52 that extends substantially parallel to the exterior surface of light housing 30. Elongated clip arm 52 has a relatively narrower part 52N at the distal end thereof and has a relatively broader part 52B in a central region thereof. The distal end 52N of clip arm 50 is formed to bend toward housing 30 so as to provide a more secure clipping action, e.g., onto a belt or a pocket, and also may optionally have an opening thereat to which a lanyard, rubber ring, clip, or other accessory may be attached.

Mounting bracket 60 includes a C-shaped clamp member 62 into which the edge of an object to which it is to be attached, e.g., a firefighter helmet, hard hat or other headgear, a tool container or other work accessory, may be inserted. Such edge is retained in clamp member 62 by tightening a clamp fastener 63, e.g., one or more set screws 63, to clamp the edge between clamp anvil 62A and fastener 63. Mounting bracket 60 defines a base 64 at an end of clamp member 62 remote from clamp fastener 63 and includes a pair of spaced apart bracket arms 66 extend upwardly from base 64. Bracket arms 66 define an opening therebetween and the opposing inner faces of each bracket arm 66 has a groove 67 therein in a longitudinal direction, e.g., a direction generally parallel to base 64.

Opposing grooves 67 are sized and spaced so that the relatively broader part 52B of clip arm 52 of clip 50 will be retained therein, and the opposing inner faces of bracket arms 66 are spaced apart by a distance that is less than the width of the relatively broader part 52B of clip arm 52, but is greater than the width of relatively narrower part 52N of clip arm 52 so that narrower part 52N will pass therebetween. As a result, bracket 60 may be slipped onto and retained by clip arm 52, e.g., the relatively broader part 52B of clip arm 52 and may be easily slipped off of clip arm 52. Thus light 10 may easily be converted from a hand-held or clip-held light into a bracket-held light, and also may easily be converted from a bracket-held light into a hand-held or clip-held light.

While friction between bracket 60 and clip arm 52 and/or light housing 30, is in many applications sufficient to limit longitudinal movement and to retain bracket 60 on clip arm 52, e.g., the base 64 of bracket 60 on clip arm 52, light housing 30 and bracket 60 may have and preferably do have, complementary features that provide a more positive engagement. In one example, the faces of bracket arms 66 that abut housing 30 may be curved to substantially match the curvature of housing 30 so as to increase the friction therebetween.

In addition, the faces of bracket arms 66 that abut housing 30 may be curved and may have one or more ridges and/or grooves 65 that are complementary in size and shape to circumferential ridges and/or grooves 32 of housing 30, so that the respective ridges and/or grooves engage, thereby to positively limit the longitudinal movement of bracket 60 relative to light housing 30. In all the foregoing alternatives, the springy character of clip 50 that tends to urge the narrower end 52N towards housing 30, and preferably to abut housing 30, further assists in retaining bracket 62 on clip 50, and where bracket 60 and housing 30 have complementary grooves and/or ridges 26, 65 that engage, to keep such features engaged.

Because light 10 has a clip 50 that is rotatable about longitudinal axis 16 and housing 30 and also has a light head 40 that is widely pivotable relative to housing 30, a user has two degrees of freedom of movement for directing the light provided from light head 40 when light 10 is mounted to an object, e.g., to a helmet or on his person, clothing or equipment, whereby the light may be directed over an expanded range of directions as compared to lights that have a fixed mount or that provide only one degree of freedom of movement.

Figure 8:
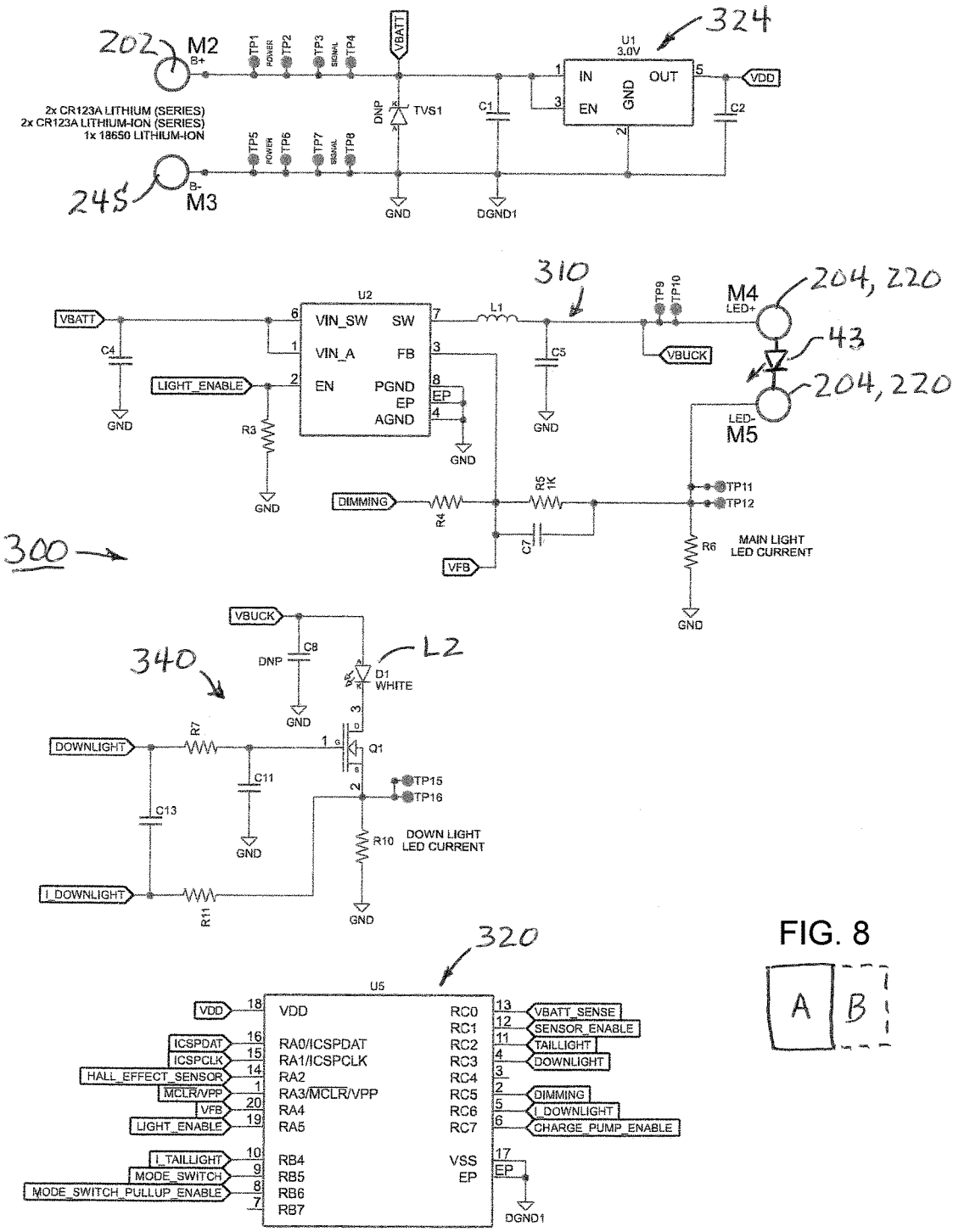
FIG. 8 is a schematic diagram of an example embodiment of an electronic circuit suitable for use in the example light of FIGS. 1A-1D.

FIG. 8 is a schematic diagram of an example embodiment of an electronic circuit 300 suitable for use in the example light 10 of FIGS. 1A-1D et seq. Electronic circuit 300 receives electrical power at connections M2 (B+) and M3 (B−) provided via physical elements 202 and 24S, 210, respectively, wherein the source of electrical power, e.g., is a battery providing a voltage VBATT. Circuit 300 is disposed on circuit board 200, although, e.g., LED 43 is preferably disposed in light head 40 and electrically connected to circuit board 200 and circuit 300 thereon by respective physical conductors 204 and 220.

Operation of light 10 including light sources, e.g., LEDs 43, L1 and L2, is controlled by controller 320, U5, or microprocessor 320, U5, which responds to signals generated by switch circuit 350 upon the closing and opening of the contacts S1 of electrical switch 208. Preferably, the processor 320, U5 or controller 320, U5 exercises control over all of the functions of circuit 300. Main light source LED 43 is connected to connections M4 (LED+) and M5 (LED−) of circuit board 200 by respective conductors 204, 220.

The manner in which processor 320 responds to signals from switch circuit 350 can depend upon the timing thereof, e.g., on the number of switch closures and/or openings within a given time period and/or on the duration of switch closures. Such signaling may be employed to produce different operating modes or states including, e.g., off, continuous on and/or momentary on for each LED or combinations of LEDs 43, L1 and L2, as well as operating modes or states for, e.g., dimming and/or un-dimming, flashing, blinking, strobing, "Hi-Brite" (above normal brightness level), timed on period, and/or other desired modes, for any of LEDs 43, L1 and L2 or for a combination of LEDs 43, L1 and L2. Because using a "Hi-Brite" feature usually increases battery drain and reduces operating time, if provided it may be implemented as a momentary feature that is accessed, e.g., by holding actuator 22 depressed for the period that a higher brightness light output is desired.

For energizing light source LED 43, processor 320 enables current regulating DC converter circuit 310 to reduce the voltage VBATT to a voltage VBUCK at which the current flowing in LED 43 is at a predetermined level. Integrated circuit U1 controls operation of DC converter 310 which is, e.g., a pulse-width modulated buck converter having inductor L1 and capacitor C5 filtering the voltage pulses at a voltage of approximately VBATT produced at its internal switch output pin SW. Feedback sensing of current flowing in the LED 43 is provided by resistor R6 which produces a feedback voltage VFB that is directly proportional to the LED 43 current and is coupled via resistor R5 to a feedback input VFB of processor 320. AN input to effect dimming of LED 43 may be applied via resistor R4.

Different predetermined LED 43 current levels are selectable by causing processor 320 to apply different control signals, e.g., via the connection DIMMING, to a voltage divider including resistors R4, R5 and filtering capacitor C7. The signals applied at connection DIMMING (or to another node in the feedback voltage divider) may be employed to dim and to un-dim the light produced by LED 43, and/or may be used to increase the current flowing through LED 43 to a higher than normal "Hi-Brite" level of light output.

Current regulating circuit 330 receives power at a voltage VBUCK from DC converter 310 and includes a charge-pump type of DC converter U4 configured to provide a voltage, e.g., about +5 VDC, to control the current flowing in LED L1, e.g., a blue safety light LED, to a predetermined level, when enabled and controlled by the signal CHARGE_PUMP_ENABLE, which is usually the case when the battery voltage VBATT is below that needed to power LED L1. When the battery voltage is sufficient, LED L1 is powered by the battery voltage VBATT. The current flowing in LED L1, D3 is controlled by FET control transistor Q2-1 responsive to the signal TAILLIGHT. Resistor R12 provides a voltage feedback signal that is proportional to the current in LED L1 via resistor R13 and connection I_TAILLIGHT and the LED1 current is controlled by signal TAILLIGHT applied to FET control transistor Q2-1.

An OR circuit, e.g., provided by a pair of diodes D2, e.g., Schottky diodes D2, serves to provide operating current for LED L1 from the higher of battery voltage VBATT and charge pump converter U4 output voltage VOUT, e.g., about +5 VDC, where LED L1 is a blue LED which typically requires a higher operating voltage than do other LEDs. Typically the battery voltage is sufficient for a blue LED L1. The voltage VOUT is, e.g., about +5 VDC, and transistor Q2-1 is controlled by signal TAILLIGHT from processor 320, U5, responsive to the current feedback signal I_TAILLIGHT, so as to cause LED L1 to operate at the predetermined current level irrespective of whether power is obtained from VBATT or from VOUT from converter U4, even as the battery voltage VBATT drops as the battery becomes discharged.

Current regulating circuit 340 preferably receives power at a voltage VBUCK from DC converter 310 and is configured to control the current flowing in LED L2, e.g., a white LED, to a predetermined level, when enabled and controlled by signal DOWNLIGHT. Resistor R10 provides a voltage feedback signal that is proportional to the current in LED L2, D1 via connection I_DOWNLIGHT and the LED L2 current is controlled by FET control transistor Q1. In the example embodiment, a DC converter is not needed because the voltage necessary to operate relatively lower power white LED L2 at the desired predetermined current is less than the voltage VBUCK needed to operate, e.g., higher power white LED 43 at its predetermined current level.

Switch circuit 350 provides a command signal to processor 320 via the connection MODE_SWITCH which is at a relatively lower voltage, e.g., GND voltage, when contacts S1 are closed and at a relatively higher voltage, e.g., at a voltage of MODE_SWITCH_PULLUP_ENABLE, when switch contacts Si are open. Contacts Si are closed and opened by pressing and releasing switch actuator 22 of light 10.

Head pivot position detector circuit 360, when enabled by the application of operating voltage at connection SENSOR_ENABLE, includes a Hall-effect sensor HS, Hall-effect detector HS, that produces an output signal at connection HALL_EFFECT_SENSOR when it receives a magnetic field of a predetermined strength, such as is produced by a magnet 40M in light head 40 when light head 40 is pivoted sufficiently relative to light housing 30 to raise the magnetic field strength at Hall-effect detector HS to the predetermined level.

An auxiliary power supply circuit 324 produces an operating voltage VDD for processor 320, U5 and other elements of circuit 300. Battery sensor 326, when enabled by signal SENSOR_ENABLE from processor 320, U5, that turns FET transistor Q2-2 on, connects a voltage divider of resistors R1, R2 to provide a representation of the battery voltage VBATT to processor 320 so that the circuit 300 can be placed into a safe state when the voltage VBATT falls to a predetermined level, but may also be employed to protect a battery from being overly discharged or if rechargeable, being overly charged.

FIGS. 9A through 9J include ten example alternative embodiments relating to examples of a rearwardly directed light source L1, L2 and the optical element of the example safety light feature. The optical element thereof may include a reflector, a lens, a solid optic, and/or another suitable optical arrangement, including combinations thereof. Example embodiment (9A) includes a first LED L1, e.g., a blue or green LED, that emits light at about 90° so as to be substantially parallel to circuit board 200 to enter through an opening at the rear of the optical element including reflector 26R and lens 26, and includes a second LED L2, e.g., a white LED, that emits light away from the surface of circuit board 200 that is directed by reflector 26R and lens 26, as previously described.

Figure 9A:
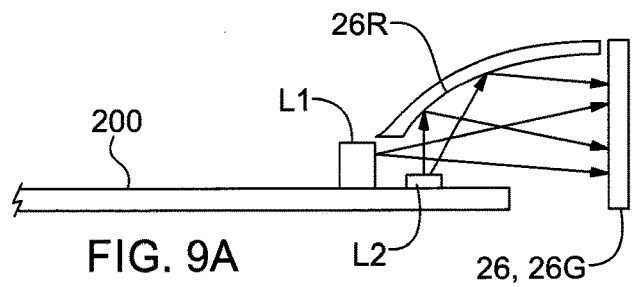
FIGS. 9A through 9J include alternative embodiments relating to examples of a rearwardly directed light source and optical element of the example safety light feature.
Figure 9B:
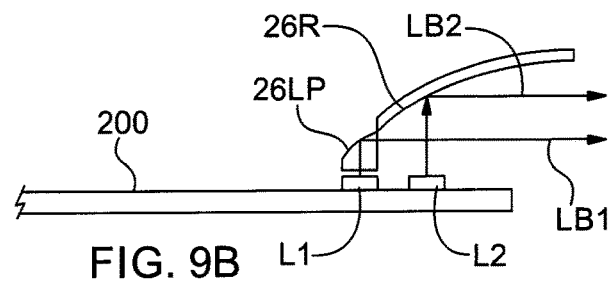

Example embodiment FIG. 9B includes a first LED L1, e.g., a blue or green LED, and a second LED L2, e.g., a white LED, both of which are surface mounted on circuit board 200 to emit light away from the surface of circuit board 200. The light from LED L1 is bent by an optical element including light pipe 26LP so as to provide beam LB1 that is directed through lens 26 and light from LED L2 is directed by an optical element including reflector 26R so as to provide beam LB2 that is directed, as previously described, through lens 26.

Figure 9C:
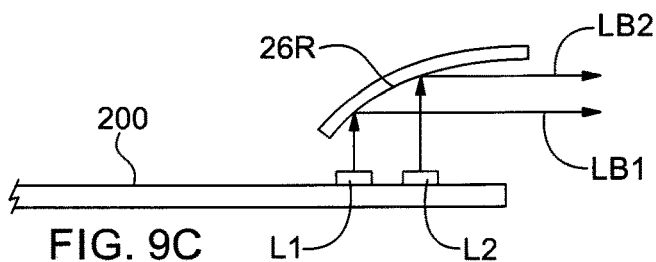

Example embodiment FIG. 9C includes a first LED L1, e.g., a blue or green LED, and a second LED L2, e.g., a white LED, both of which are surface mounted on circuit board 200 to emit light away from the surface of circuit board 200. Light from both LED L1 and LED L2 is directed by an optical element including reflector 26R so as to provide respective light beams LB1 and LB2 that are directed, as previously described, through lens 26. In this arrangement, LED L1 and LED L2 cannot both be located substantially at the focal point of reflector 26R (as can LED L2 in the previous examples) and so the formation of one or both of light beams LB1 and LB2 may not be as desirable as in other example configurations.

Figure 9D:
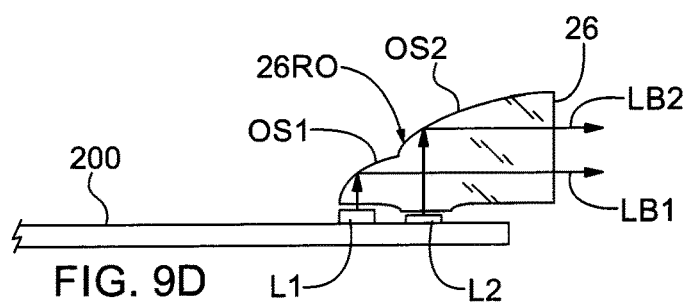
Figure 9E:
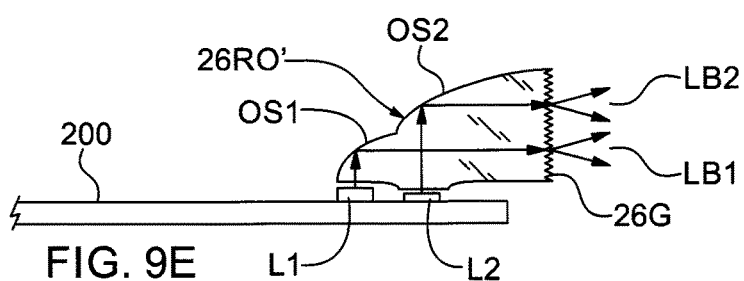

Example embodiments FIGS. 9D and 9E both include a first LED L1, e.g., a blue or green LED, and a second LED L2, e.g., a white LED, both of which are surface mounted on circuit board 200 to emit light away from the surface of circuit board 200. Light from both LED L1 and LED L2 is directed into an optical element including a solid internally reflective optical member 26RO, 26RO' that are the same except that optical member 26RO has a planar output surface 26 through which light beams LB1, LB2 exit optical member 26RO, and optical member 26RO' has a grooved or grated exit surface 26G, e.g., a partial Fresnel lens 26G, through which light beams LB1 and LB2 exit optical member 26RO' and are broadened. The interior and/or exterior surfaces of lens 26 and/or optical member 26RO, 26RO' may be planar, convex, or concave, and may be with or without Fresnel grooves, to reduce thickness.

Optical members 26RO, 26RO' have respective substantially planar optical surfaces that are disposed closely adjacent to LEDs L1, L2 for receiving the light produced thereby. Each optical member 26RO, 26RO' has a first optically reflective surface OS1 for directing light from LED L1 into light beam LB1 to exit optical member 26RO, 26RO' with a desired beam configuration and has a second optically reflective surface OS2 for directing light from LED L2 into light beam LB2 to exit optical member 26RO, 26RO' with a desired beam configuration.

The size and shape of optical members 26RO, 26RO' and of the optical surfaces OS1 and OS2 thereof, are preferably configured such that each of LEDs L1 and L2 are at a desired location relative to the respective focal points of optical surfaces OS1 and OS2 to provide light beams LB1 and LB2 having the desired characteristics, e.g., beam width. It is noted that total internal reflection (TIR) may be obtained within optical elements 26RO, 26RO' due to the refractive indices of the material of optical members 26RO, 26RO' and of the surrounding material, and/or by a reflective coating, e.g., a thin metal coating, on the surfaces thereof.

Figure 9F:
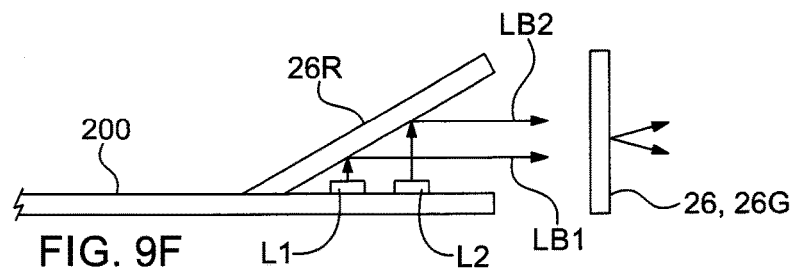

Example embodiment FIG. 9F includes a first LED L1 and a second LED L2, both of which are surface mounted on circuit board 200 to emit light away from the surface thereof. The optical element includes a reflector 26R that is a substantially flat reflecting surface 26R or mirror 26R that directs the respective light beams LB1 and LB2 through an optional lens 26.

Figure 9G:
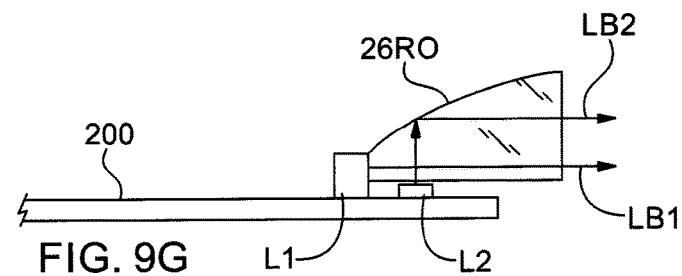

Example embodiment FIG. 9G includes a first LED L1 and a second LED L2, one of which L2 is surface mounted on circuit board 200 to emit light away from the surface thereof and the other of which L1 is configured to provide light at 90° so as to be substantially parallel to the surface of circuit board 200. The optical element includes a solid internally reflective optic 26RO through which the light produced by LEDs L1 and L2 pass to light beams LB1 and LB2, respectively. Optic 26RO is totally internally reflective similarly to the other optics described above, and may have a substantially flat, curved or grooved (Fresnel lens) exit surface through with beams LB1 and LB2 pass.

Figure 9H:
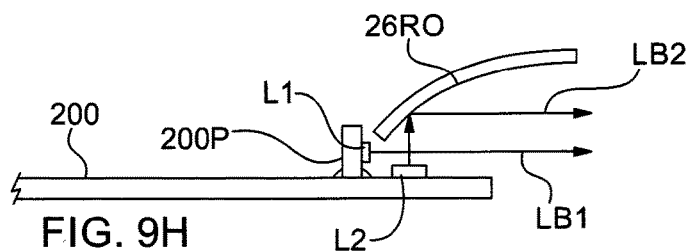

Example embodiment FIG. 9H includes a first LED L1 and a second LED L2, one of which L2 is surface mounted on circuit board 200 to emit light away from the surface thereof and the other of which L1 is mounted to an auxiliary circuit board 200P that is mounted on and perpendicularly to circuit board 200 thereby to provide light at 90° so as to be substantially parallel to the surface of circuit board 200. LED L1 is typically surface mounted on auxiliary circuit board 200P. Optical element 26R may be a reflector, mirror, solid optic or any other suitable optical element.

Figure 9I:
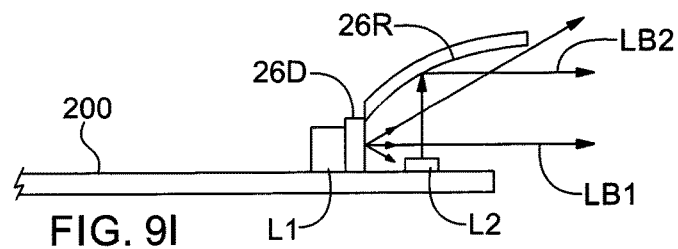

Example embodiment FIG. 9I includes a first LED L1 and a second LED L2, one of which, e.g., LED L2, is surface mounted on circuit board 200 to emit light away from the surface thereof and the other of which, e.g., LED L1, is configured to provide light at 90° so as to be substantially parallel to the surface of circuit board 200. While the orientations of the two LEDs L1, L2 is similar to embodiments (9A), (9G) and (9H), an optical diffuser 26D is provided to diffuse the light produced by LED L1 which in certain situations may be desirable, e.g., to avoid bright spots and/or high-intensity rays in the light beam LB1. A diffuser 26D may be employed with either or both of LEDs L1, L2 and in any of the described or other alternative embodiments. Diffuser 26D may be provided, e.g., by a separate diffuser as illustrated or by a diffusing surface or applied diffusing member, on any of the input surfaces and/or exit surfaces of a solid optic 26RO or of a lens 26G.

Figure 9J:
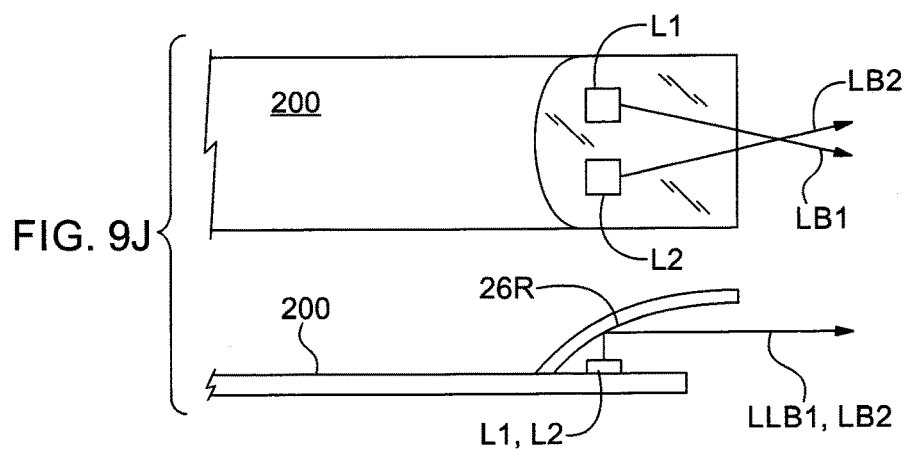

Example embodiment FIG. 9J includes a first LED L1 and a second LED L2, both of which are surface mounted side-by-side on circuit board 200 to emit light away from the surface thereof. A side view and a plan view are illustrated. Note that, as in the other alternative embodiments, it is immaterial which LED is L1 and which is L2, or whether they are side-by-side along any axis of circuit board 200, although the illustrated arrangement may be advantageous due to symmetry relative to the optical element, e.g., reflector 26R. While optical element 26R is illustrated as a reflector 26R, e.g., a curved or parabolic reflector 26R, and of the optical elements described, as well as dual reflectors, dual mirrors, dual solid optics and combinations thereof, may be employed in this arrangement.

It is noted that in any of the arrangements described herein, LED L1 and/or LED L2 may include separate LED devices as illustrated, or may include plural LED devices that are packaged together in a single multi-die package, e.g., a package that can be powered differently so as to produce e.g., white light and blue light or any other color or colors of light or different intensities of light. It is also noted that lens 26 may be provided in different manners or may even be omitted. Moreover, the positions and locations of LEDs L1 and L2 may be interchanged, e.g., a blue LED L1 may be placed in the position illustrated for a white LED L2 and vice versa. An advantageous feature of the described example arrangement is that light of different color and/or of different brightness and/or intensity may be provided from what appears externally as a single source, irrespective of the specific internal arrangement that may be employed to obtain such function, but need not so appear.

Figure 10B:
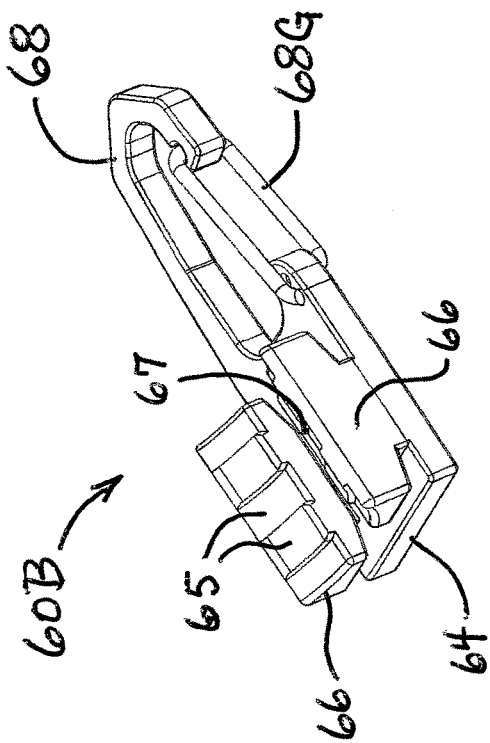
FIGS. 10A-10C illustrate alternative embodiments of various example accessories that are mountable to the clip of portable light 10.
Figure 10A:
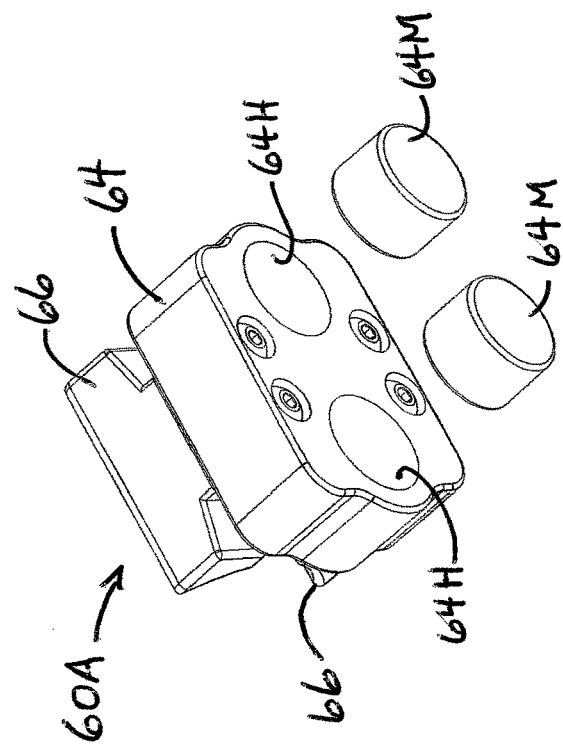
Figure 10D:
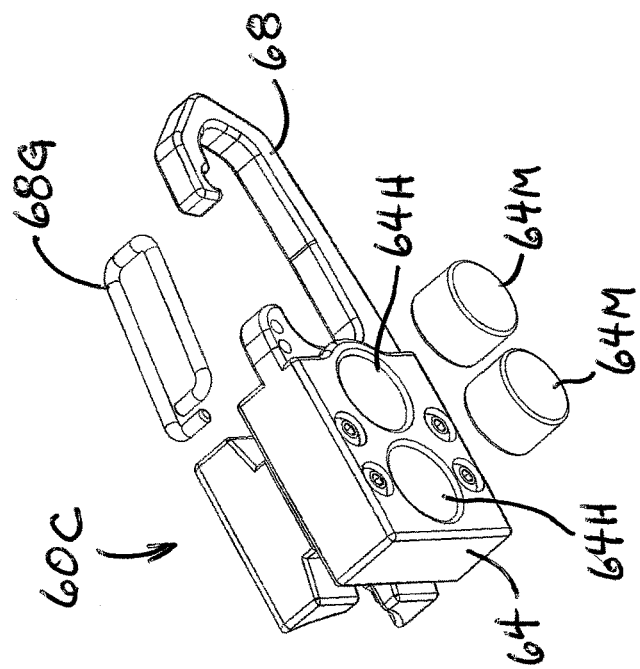
FIG. 10D is an exploded view of the example arrangement of FIG. 10C.
Figure 10C:
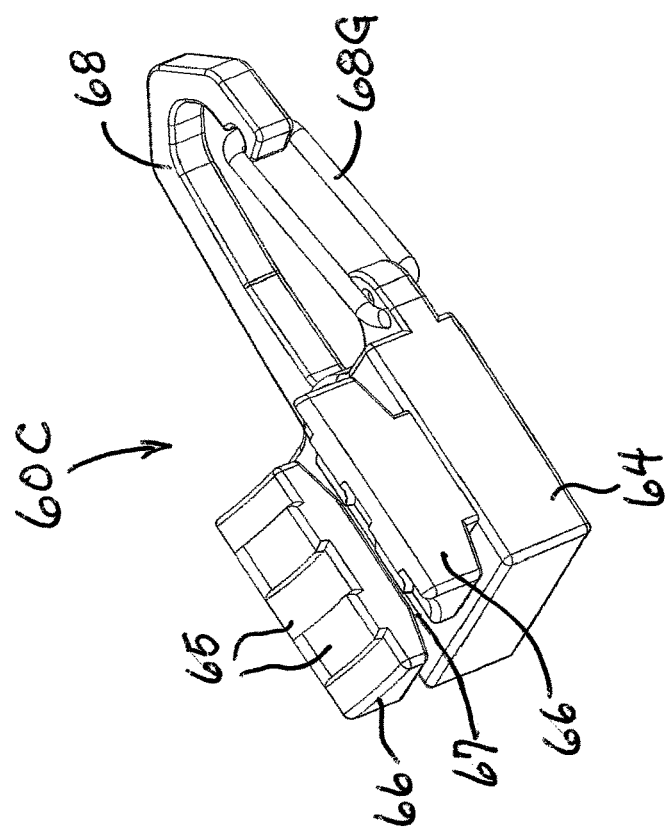

FIGS. 10A-10C illustrate alternative embodiments of various example accessories 60-60C that are mountable to the clip 50 of portable light 10, and FIG. 10D is an exploded view of the example arrangement of FIG. 10C. One example of an accessory 60-60C is the mounting bracket 60 which includes a screw-tightened clamp arrangement including clamp bracket 62, anvil 62A, and set screw 63, on a base 64 for attaching mounting bracket 60 to an edge of a helmet or other object as has been described and illustrated herein above.

Each of the example accessories 60-60C described herein share a substantially similar configuration for attachment to a light 10, e.g., to an elongated arm 52 of a clip 50 thereof, wherein the accessory 60A-60C includes a base 64 and a pair of extending arms 66 that extend from base 64 in the same direction and are substantially similar to the correspondingly numbered elements of accessory 60 above, and similarly define a pair of grooves or slots 67 for receiving and retaining the elongated clip arm 52 of clip 50, as will be the case for each of the accessories 60A-60C now to be described, as well as for other accessories. Preferably, extending arms 66 have grooves and/or ridges 65 thereon that aid in keeping accessory 60-60C on clip 50, e.g., by engaging complementary features of light 10. It is noted that any of mounting accessories 60-60C may be attached to light 10 or another object in either of two orientations, and either orientation can be acceptable in a given situation or to a user.

Example accessory 60A is a magnetic mounting bracket 60A wherein base 64 and extending arms 66 thereof are substantially similar to the correspondingly numbered elements of the mounting bracket accessory 60 above. Base 64 thereof has one or more holes 64H therein for receiving one or more magnets 64M. Magnets 64M may be retained in holes 64H by any suitable means, including but not limited to, friction, a press fit, adhesive, a fastener or other suitable means. Thus, mounting accessory 60A, and any object such as a light 10, may be attached to a steel or other ferromagnetic material by magnets 64M. While extending arms 66 may be attached to base 64 by one or more fasteners as illustrated in the example embodiment of FIG. 10A, it is preferred that base 64 and arms 66 are a single piece, e.g., a molded or machined or other integral part.

Example accessory 60B is a clip-on mounting bracket 60B wherein a loop type hanger ring 68 extends from a base 64 and extending arms 66 are substantially similar to the correspondingly numbered elements of the mounting bracket accessory 60 above. Example accessory 60B includes a clip-on loop type of hanger 68 or mounting ring 68 that extends from a base 64, e.g., in a direction generally parallel to the elongated direction of light housing 30. Mounting ring 68 may be a simple hanger 68 or hook 68 that may be placed over a rod or edge or other feature to support (hang) mounting accessory 60B, and any object such as a light 10 to which it is attached.

Hanger 68 in a preferred example includes a partial ring 68 or hanger 68 that is fixed to base 64, although it may be attached thereto by a ring or a pivotable connection, with opening in partial ring 68 being closed by a moveable gate 68G that is biased to close the opening in partial ring 68 and that may be opened inwardly to allow ring 68 to be attached to an object while being biased to close to retain ring 68 on such object. Gate 68G has at its open end two parallel ends that are spaced apart to fit into respective spaced apart holes in gate 68, e.g., in the shorter stub thereof that extends from base 64 in the illustrated embodiment. The springiness of gate 68G resists the distortion created by the opening of gate 68G and so biases gate 68G to restore itself towards the closed position wherein the movable end thereof is closely adjacent to or abuts the end of hanger 68 that defines the opening closed by gate 68G.

Example accessory 60C is a clip-on and magnetic mounting bracket 60C having a base 64 and extending arms 66 that are substantially similar to the correspondingly numbered elements of the mounting bracket accessory 60 above. Accessory 60C includes one or more magnets similarly to accessory 60A and also includes a loop type hanger ring 68, 68G that extends from base 64 in substantially similar arrangement to that described in relation to accessory 60B.

The base 64, extending arms 66 and hanger ring 68 of accessories 60B and 60C may, and in a preferred example are, formed as a single piece, although other examples wherein such parts are an assembly of parts 64, 66, 68 are contemplated.

Figure 11A:
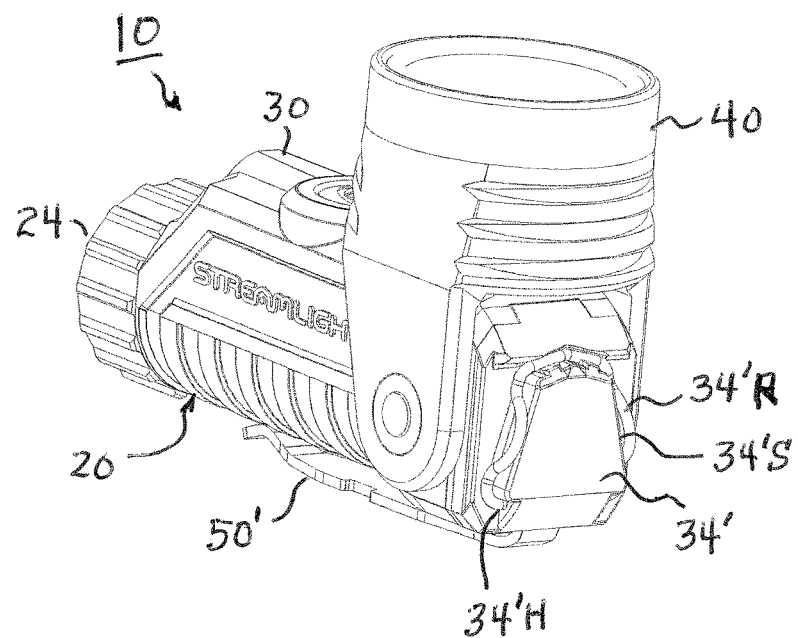
FIGS. 11A and 11B are perspective views of an example light having a deployable and stowable hanger at an end of its light body illustrated in stowed and deployed positions, respectively.
Figure 11B:
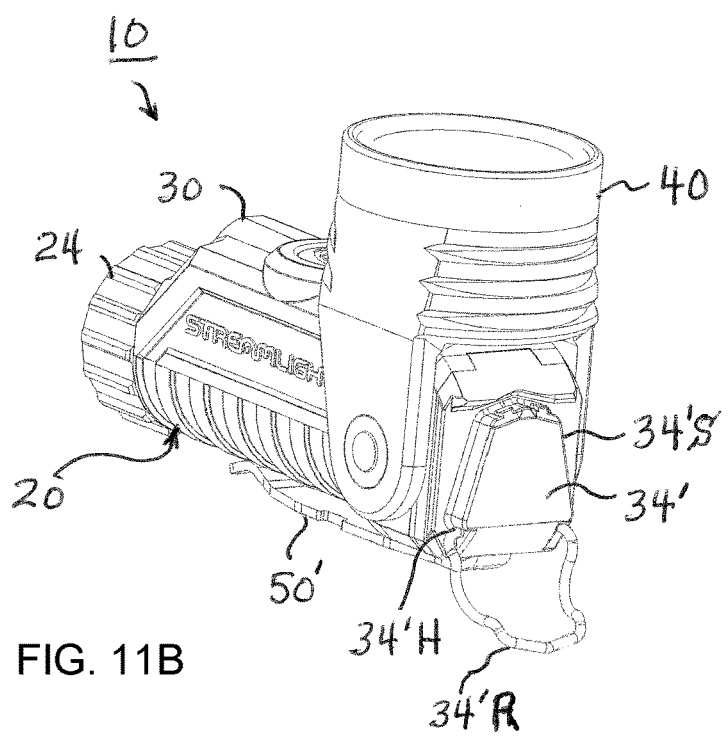

FIGS. 11A and 11B are perspective views of an example light 10 having a deployable and stowable hanger 34'R or ring 34'R at an end of its light housing or body 20, 30 illustrated in stowed and deployed positions, respectively. Light 10 is as previously described, however, it has a different end cap 34' at the forward end of light body 20, 30 to support a deployable hanger 34'R. End cap 34' has a raised central portion 34'S having a shape complementary to the shape of hanger 34'R so that when hanger 34'R is stowed and pressed against central portion 34'S it remains stowed. Two this end central portion 34'S may be slight larger at its forward surface so as to define a groove around its periphery into which hanger 34'R snaps into when stowed.

Hanger 34'R is typically a rigid wire loop or ring having opposing inwardly directed ends that are disposed in opposing coaxially aligned transverse holes 34'H in end cap 34'. In the illustrated example, hanger 34'R is a ring of trapezoidal shape and raised central portion 34'S is likewise of trapezoidal shape. Hanger 34'R when deployed by being rotated away from end cap 34' it is available to hang on an object, e.g., a hook, nail, pin, post and the like. With light head 40 pivoted about 90° as illustrated, or about 90° in the opposite direction, light 10 typically hangs by hanger 34'R with light body 20 hanging in a generally vertical orientation and so light 10 directs light generally horizontally, and the pivoting of light head 40 may be changed to direct the light in a different direction.

End cap 34' is attached to light body 20 in like manner to that for end cap 34 described above. This example embodiment of light 10 has, e.g., a clip 50' which differs from clip 50 described above in certain details that are described below.

Figure 12:
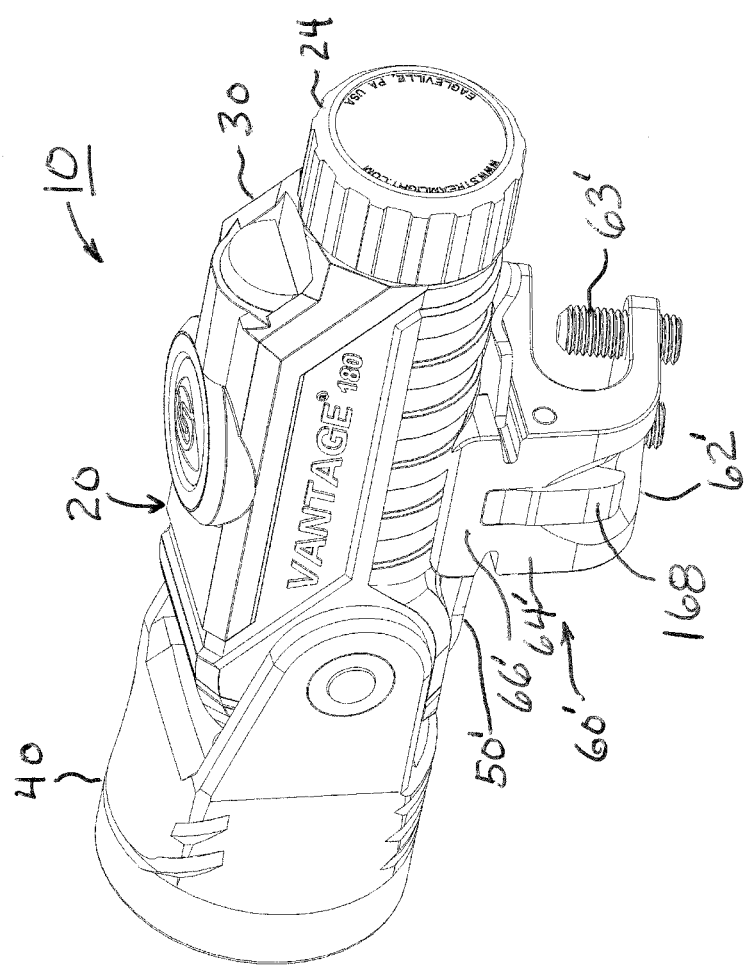
FIG. 12 is a perspective view of an example light having an alternative example embodiment of a bracket attached thereto.
Figure 12A:
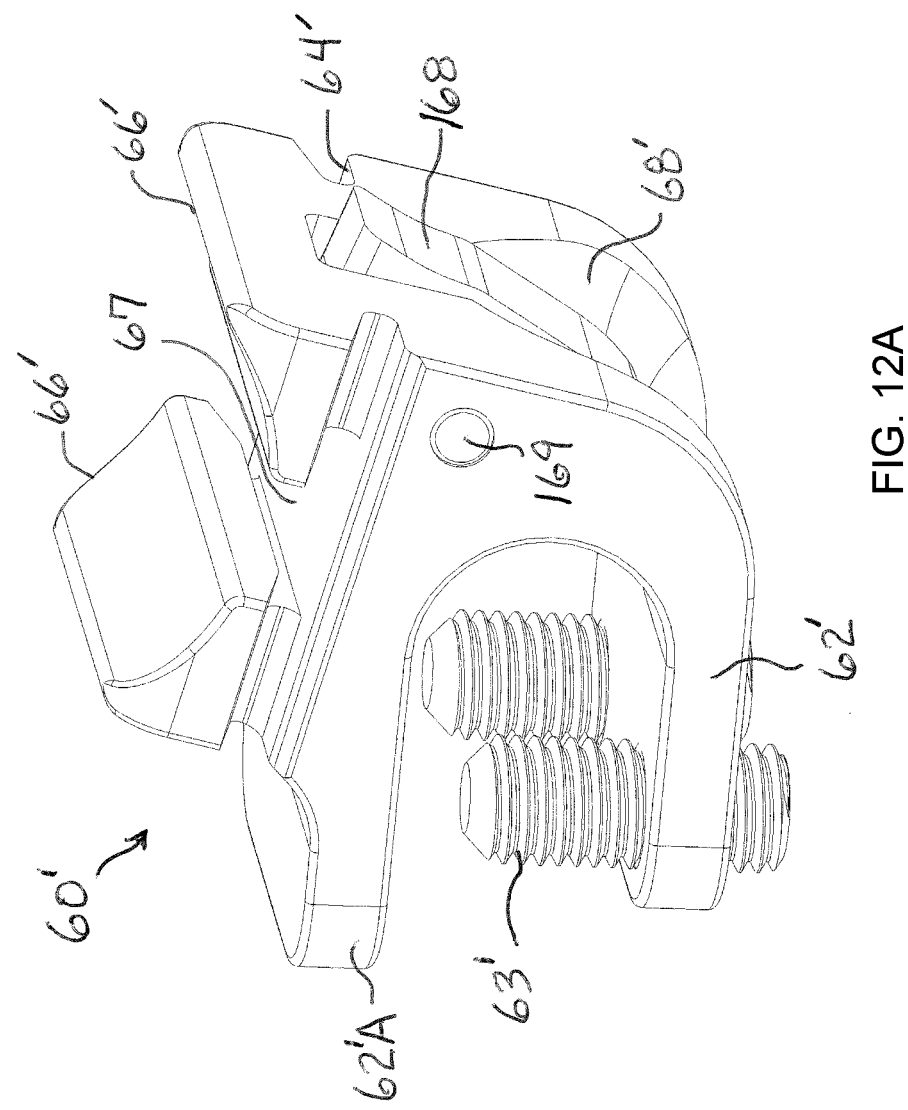
FIG. 12A is a perspective view of the alternative example bracket.
Figure 12B:
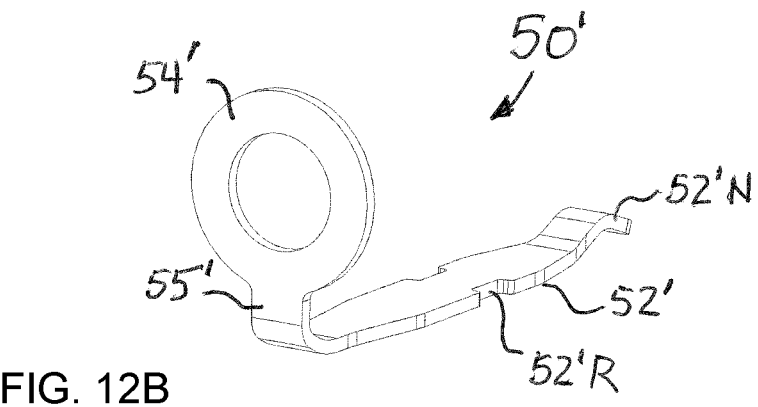
FIGS. 12B and 12C are perspective views of alternative example embodiments of a clip usable with any of the embodiments of the example light described herein.
Figure 12C:
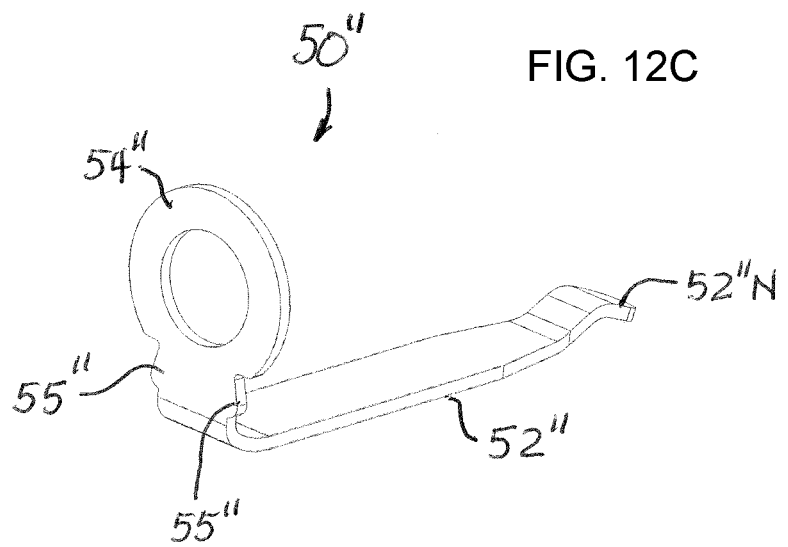

FIG. 12 is a perspective view of an example light 10 having an alternative example embodiment of a bracket 60' attached thereto, FIG. 12A is a perspective view of the alternative example bracket 60', and FIGS. 12B and 12C are perspective views of alternative example embodiments of a clip 50', 50" usable with any of the embodiments of the example light 10 described herein. Bracket 60' is similar to bracket 60 as described except that it employs a different arrangement for being retained on clip 50, specifically on clip 50'.

Bracket 60' has a body 62' defining an anvil 62'A opposing one or more clamping screws 63' wherein the tightening of screws 63' clamps an object, e.g., a helmet or hat, in bracket 60' to which a light 10 may be mounted by engaging its clip 50, 50'. Bracket body 62' has a slot 68' into which is placed a pawl 168. Pawl 168 is pivotably mounted on a transverse pivot pin 169 through bracket body 62' and is preferably biased, e.g., by a spring, to move toward the groove 67 to engage a clip 50, 50' disposed therein and to be movable away from the groove 67 so as to release the clip 50, 50'.

Because bracket 60' and clip 50' engage through pawl 168 to retain clip 50' on bracket 60', the surfaces of bracket arms 66 that are adjacent to the body 20 of light 10 need not have, but may have, grooves and/or ridges 65 that are complementary to the grooves 32 on the body 20 of light 10 as does bracket 60 above. The shapes of clip 50, 50' and groove 67' are similar to those described above so that the light 10 may be mounted to bracket 60, 60' by its clip 50, 50'.

Clip 50' of FIG. 12B is similar to clip 50 as described except that it has a pair of opposing notches or recesses 52'R that interface with the pawl 168 of bracket 60' so that light 10 may be attached to bracket 60, 60' by its clip 50, 50'. Clip 50' has an elongated arm 52' having a narrower end 52'N and an annular ring 54' to which clip arm 52' is joined by short section 55'.

Clip 50" of FIG. 12C is similar to clips 50, 50' as described except that it has a wider short section 55" joining its annular mounting ring 54" to its elongated arm 52" by which light 10 may be attached to bracket 60, 60' by its clip 50, 50', 50". Specifically short section 55" is shaped to be wider than short sections 55, 55' so that it substantially filles the space between shoulders 38S of end cap 38 that limit the rotation of clip 50, 50", 50" relative to light body 20. Because short section 55" substantially abuts shoulders 38S, clip 50" does not rotate or can rotate only slightly, relative to light body 20.

Clip 50" has an elongated arm 52" having a narrower end 52"N and may or may not have features as shown for other example embodiments of a clip 50, 5', 50". In practice, any of clips 50, 50', 50" may have either the narrower short section 54, 54' or the wider short section 54" and/or the notches 52'R illustrated with clip 50' or the small bumps on its edges as illustrated with clip 50 above. In practice, the width of short section 54, 54', 54" may be made to produce any desired range of angular rotation of clip 50, 50', 50" relative to light body 20'.

The width of groove 67 may be similar as between different brackets 60, 60' or may be different, as is also the case with the width of clip arm 52, 52', 52" of clips 50, 50', 50" depending upon, e.g., the degree of interoperability that may or may not be desired. This feature may be utilized so that certain brackets 60, 60', 60A, 60B, 60C are not utilized in certain configurations, or a wider clip arm 52, 52', 52" may be utilized so that a particular bracket 60, 60', 60A, 60B, 60C, e.g., a helmet mounting bracket, does not fit on a light 10 intended for use with, e.g., a fire helmet.

While the various clips 50, 50', 50" may have clip arms 52, 52', 52" of substantially the same width so as to receive any of the various brackets and accessories 60, 60', 60A, 60B, 60C, the clip arms 52, 52', 52" of the various clips 50, 50', 50" may be of different widths that correspond to a particular one or ones of accessories and/or brackets 60, 60', 60A, 60B, 60C having different width grooves 67, whereby one or more particular brackets 60, 60', 60A, 60B, 60C may be intended for use with one or more clips 50, 50', 50" having clip arms 52, 52', 52" of substantially similar width.

Figure 13:
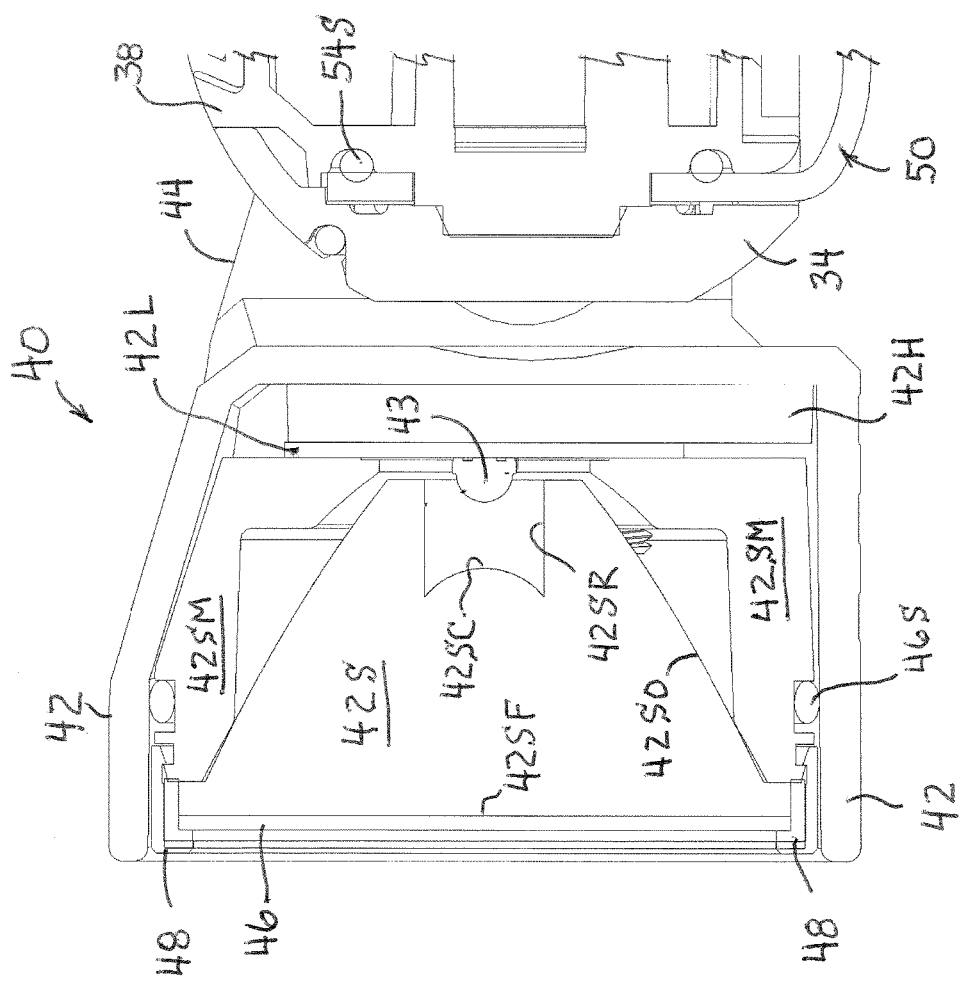
FIG. 13 is a side cross-sectional view of the head of the example light described herein including a solid optical element therein.

FIG. 13 is a side cross-sectional view of the head 40 of the example light 10 as described herein including a solid optical element 42S therein instead of a reflector 42R as above. Solid optical element 42S is preferably configured as a totally internally reflective (TIR) optical element supported within head housing 42. Optical element 42S is retained in head housing 42 by lens 46 and lens ring 48 at the forward end thereof, and an O-ring 46S, similarly to above.

At the rearward end of head housing 42 are disposed heat spreader 42H adjacent to which is LED circuit board 42L on which is mounted LED 43, similarly to above. Solid optical element 42S is of an optically clear or transparent material and generally has optical quality smooth external surfaces. A generally circular flat forward surface 42SF thereof is disposed adjacent circular lens 46 and the curved side surface 42S0, generally circular in transverse cross-section, defines a desired curvature to provide the optical beam forming characteristics desired, e.g., a parabolic, partially parabolic, hyperbolic or other shaped surface.

LED 43 is disposed adjacent the rearward end of TIR optical element 42S which is configured to capture substantially all of the light emitted by LED 43. To that end, since LED 43 typically provides close to a hemispherical light output pattern, often with greater brightness closest to its central axis, TIR optic 42S is configured with a substantially cylindrical recess 42SR in its rearward end substantially on-axis with the central axis of LED 43 and the bottom of cylindrical recess 42SR is formed as a convex surface 42 SC.

Typically, light emitted by LED 43 that impinges upon the sides of cylindrical recess 42SR is directed towards the outer surface 42S0 of TIR element 42S from whence it is reflected towards forward surface 42SF through which it passes as part of the beam of light formed by TIR optical element 42S. Further, light emitted by LED 43 that impinges upon the convex bottom of cylindrical recess 42SR is directed towards the forward surface 42SF of TIR optical element 42S through which it passes as part of the beam of light formed by TIR optical element 42S.

Thus, a desired beam of light may be produced from the light emitted by LED 43 by configuring the shapes of outer surface 42S0 and convex bottom 42SC in combination with selecting the material from which TIR element 42S is made to obtain a desired index of refraction. It is noted that solid optical element 42S may be utilized in any embodiment of light 10 in place of reflector 42R, as may be deemed desirable.

Member 42SM may be disposed in head housing 42 and configured to properly locate TIR optical element 42S therein, e.g., substantially coaxially with LED 43 and adjacent thereto. Preferably member 42SM has a rearward shape that is adjacent to LED circuit board 42L, and which may abut circuit board 42L. Member 42SM may not only provide support and positioning for TIR element 42S, but may also be of a material that is relatively thermally conductive so as to provide a heat sinking thermal path for LED 43.

In a typical example embodiment, tail cap 24, housing 30, end cap 34, forward end 38, light head housing 40, reflector 42R and member 42SM may made be of any suitable plastic or metal material, e.g., preferably a molded plastic such as a nylon, engineered nylon, polycarbonate, polyethylene, a PC/PET plastic blend, ABS plastic, with or without a reinforcing material such as a fiberglass, carbon fiber or the like, and with or without a thermally conductive filler material, or any other suitable plastic or other moldable material. Heat spreader 42H may be made of, and reflector 42R and member 42SM may alternatively be made of, aluminum, brass, copper, steel, stainless steel, thermally loaded plastic, or another suitable thermally conductive material. Conductors 30R, 202, 204, 210, 220 and pivot pins 37, are preferably metal, e.g., copper, brass, bronze, phosphor bronze, beryllium copper, aluminum, steel, stainless steel, or another suitable electrically conductive material. Lenses 26, 46, reflector 26R and TIR optical element 42S may be made of glass, polycarbonate, nylon, acrylic, PMMA, or another suitable clear, transparent or translucent plastic or other material. Clip 50 and contact spring 24S are preferably made of steel, spring steel, stainless steel, beryllium copper, or another suitable material having a spring-like character.

LED 43 is preferably a high brightness white LED, LED L1 is preferably a blue LED, and LED L2 is preferably a white LED. Light 10 preferably is powered by two CR-123 Lithium cell batteries or a type 18650 Lithium-ion battery, but alternatively could be powered by four AA alkaline batteries, or by another suitable battery or batteries. Further light 10 may be powered by one or more rechargeable batteries, with the batteries being chargeable apart from light 10 or light 10 may be provided with a pair of external charging contacts through which charging power can be provided to the one or more batteries while installed in light 10. For example, charging contacts may be located on opposing sides of housing 30, e.g., in or near to the POLY-TAC® 180 or VANTAGE® 180 panels thereon, or on tail cap 24, or at any other convenient location.

Therein, one example embodiment of a light 10 the light has an overall length of about 5 inches (about 12.7 cm), a diameter at the forward end 12 of about 1.5 inches (about 3.8 cm) and a housing 30 has transverse dimensions of about 1 inch (about 2.5 cm). In one example embodiment, light head 40 is pivotable about longitudinal axis 16 and housing 30 by about +90° relative to housing 30 irrespective of whether mounting bracket 60 is or is not mounted to clip 50. In one example embodiment, light head 40 is pivotable by about +90° relative to longitudinal axis 16 and Hall-effect sensor HS detects magnet 40M at about +85° of pivoting relative to longitudinal axis 16. In another configuration, e.g., a light 10 mounted to a helmet by a helmet mounting bracket 60, 60', the rotation of light head 40 relative to light body 30 may be limited to less than about +90° by an interference between the light head 40 and the helmet, e.g., its brim, and so might be movable when mounted to the helmet to about +10° to 20°.

A portable light 10 may comprise: a light housing 20 defining a forward end and a rearward end and a longitudinal axis therebetween, the light housing 20 including a first housing 30 and a light head 40 that is pivotable relative to the longitudinal axis and the first housing 30; one or more light sources 43, L1, L2 including an illumination light source 43 in the light head 40 and selectively energizable for directing light outwardly from the light head 40; an electrical switch 22, 208 for selectively energizing the one or more light sources 43, L1, L2 to produce light; and a detector HS of the pivoted position of the light head 40 relative to the first housing 30 for energizing and/or de-energizing the one or more light sources 43, L1, L2. The one or more light sources 43, L1, L2 may include a second light source 26, L1, L2 26, L1, L2 in the light housing 20, wherein the electrical switch 22, 208 selectively energizes the second light source 26, L1, L2 26, L1, L2, and wherein the detector HS energizes and/or de-energizes the second light source 26, L1, L2 26, L1, L2. The second light source 26, L1, L2 26, L1, L2 may further comprise: an optical element 26, 26R, 26RO configured for receiving first light produced by a first light producing element L1, L2 and second light produced by a second light producing element L1, L2, wherein the optical element 26, 26R, 26RO is configured for directing the first light and the second light in a direction substantially parallel to the longitudinal axis defined by the light housing 20. The detector HS detects the light head 40 being pivoted relative to the light housing 20 by more than a predetermined angle for selectively energizing the one or more light sources 43, L1, L2. The predetermined angle: may be in the range of about 60° to about 90°; or may be in the range of about 85° to about 90°. The detector HS may comprise: a magnet supported by one of the light head 40 and the first housing 30 and a detector HS of a magnetic field supported by the other of the light head 40 and the first housing 30, wherein the detector HS detects the magnetic field of the magnet when the light head 40 is pivoted relative to the first housing 30 by a predetermined angle. The predetermined angle: may be in the range of about 60° to about 90°; or may be in the range of about 85° to about 90°. The detector HS of a magnetic field may include a Hall-effect sensor or a reed switch. The portable light 10 may further comprise: an elongated clip 50 attached to the light housing 20 and extending along the light housing substantially in the longitudinal direction; or a hanger ring 34'R attached to the light housing 20 proximate the illumination light source 43; or an elongated clip 50 attached to the light housing 20 and extending along the light housing 20 substantially in the longitudinal direction and a hanger ring 34'R attached to the light housing 20 proximate the illumination light source 43. When the portable light 10 includes the elongated clip 50, the elongated clip 50 may be configured to be rotatable about the light housing 20; and when the portable light 10 includes the hanger ring 34'R, the hanger ring 34'R may be attached to the light housing 20 proximate the illumination light source 43 and may be configured to be stowed adjacent the light housing 20 and deployed away from the light housing 20.

A portable light 10 may comprise: a light housing 20 defining a forward and a rearward end and a longitudinal axis therebetween, the light housing 20 including a first housing 30 and a light head 40 that is pivotable relative to the longitudinal axis and the first housing 30; an illumination light source 43 in the light head 40 and selectively energizable for directing light outwardly from the forward end of the light housing 20; a second light source 26, L1, L2 selectively energizable for directing light outwardly from the rearward end of the light housing 20, wherein the second light source 26, L1, L2 may include: a first light producing element L1, L2 configured for producing a first light; an electrical switch 22, 208 for selectively energizing the illumination light source 43, or the first light producing element L1, L2, or the illumination light source 43 and the first light producing element L1, L2, to produce light; and a detector HS of the pivoted position of the light head 40 relative to the first housing 30 for energizing and/or de-energizing the first light producing element L1, L2. The detector HS detects the light head 40 being pivoted relative to the first housing 20 by more than a predetermined angle for selectively energizing and/or de-energizing the first light producing element L1, L2. The predetermined angle: may be in the range of about 60° to about 90°; or may be in the range of about 85° to about 90°. The detector HS may comprise: a magnet supported by one of the light head 40 and the first housing and a detector HS of a magnetic field supported by the other of the light head 40 and the first housing, wherein the detector HS detects the magnetic field of the magnet when the light head 40 is pivoted relative to the first housing by a predetermined angle. The predetermined angle: may be in the range of about 60° to about 90°; or may be in the range of about 85° to about 90°. The detector HS of a magnetic field may include a Hall-effect sensor or a reed switch. The second light source 26, L1, L2 may further include: a second light producing element L1, L2 configured for producing a second light; wherein the electrical switch 22, 208 may be for selectively energizing the illumination light source 43, or the first light producing element L1, L2, or the second light producing element L1, L2, or any combination of the illumination light source 43, the first light producing element L1, L2, and the second light producing element L1, L2 to produce light; and wherein the detector HS of the pivoted position of the light head 40 relative to the first housing 30 may be for energizing and/or de-energizing the first light producing element L1, L2, or the second light producing element L1, L2, or both of the first and second light producing elements L1, L2. The second light source 26, L1, L2 may further comprise: an optical element 26, 26R, 26RO configured for receiving the first light produced by the first light producing element L1, L2 and the second light produced by the second light producing element L1, L2 and for directing the first light and the second light rearwardly in a direction substantially parallel to the axis defined by the light housing 20. The optical element 26, 26R, 26RO may comprise a reflector configured for directing light outwardly from the rearward end of the light housing 20 and along an axis substantially parallel to the longitudinal axis direction; wherein the first light producing element L1, L2 is configured for directing the first light substantially parallel to the axis defined by the reflector; and wherein the second light producing element L1, L2 is configured for directing the second light substantially transversely to the axis defined by the reflector, wherein the reflector directs the light from the second light element substantially parallel to the axis defined by the reflector. The portable light 10 may further comprise an electronic circuit board 200: wherein the first light producing element L1, L2 is mounted to a surface of the electronic circuit board 200 for directing light substantially parallel to the surface of the electronic circuit board 200 and substantially parallel to the axis defined by the reflector; wherein the second light producing element L1, L2 is mounted to the surface of the electronic circuit board 200 for directing light substantially transversely to the surface of the electronic circuit board 200; wherein the reflector has a reflective surface that defines a part of a parabolic surface, the parabolic surface defining an axis of a parabola and a focal point on the axis of the parabola, the reflector being open at a base end thereof; and wherein the reflector is disposed adjacent to the electronic circuit board 200 such that the axis of the parabola is substantially parallel to the surface of the electronic circuit board 200, the first light producing element L1, L2 directs light through the opening in the base of the reflector, and the second light producing element L1, L2 is substantially at the focal point of the parabolic surface of the reflector. The portable light 10 may further comprise: a lens 26, 26G adjacent the reflector such that the first light produced by the first light producing element L1, L2 and the second light produced by the second light producing element L1, L2 passes through the lens 26, 26G; or a Fresnel lens 26G adjacent the reflector such that the first light produced by the first light producing element L1, L2 and the second light produced by the second light producing element L1, L2 passes through the Fresnel lens 26G. The optical element 26, 26R, 26RO may comprise: a reflector configured for directing light outwardly from the rearward end of the light housing 20 and along an axis substantially parallel to the longitudinal axis and a light pipe configured for directing light outwardly from the rearward end of the light housing 20 and having an axis substantially parallel to the longitudinal axis direction; wherein the first light producing element L1, L2 is configured for directing light into the light pipe; and wherein the second light producing element L1, L2 is configured for directing light substantially transversely to the axis defined by the reflector, wherein the reflector directs the light from the second light element substantially parallel to the axis defined by the reflector. The portable light 10 may further comprise an electronic circuit board 200: wherein the first light producing element L1, L2 is mounted to a surface of the electronic circuit board 200 for directing light into the light pipe; wherein the second light producing element L1, L2 is mounted to the surface of the electronic circuit board 200 for directing light substantially transversely to the surface of the electronic circuit board 200; wherein the reflector has a reflective surface that defines a part of a parabolic surface, the parabolic surface defining an axis of a parabola and a focal point on the axis of the parabola; and wherein the reflector is disposed adjacent to the electronic circuit board 200 such that the axis of the parabola is substantially parallel to the surface of the electronic circuit board 200, and the second light producing element L1, L2 is substantially at the focal point of the parabolic surface of the reflector. The portable light 10 may further comprise: a lens 26, 26G adjacent the reflector such that light produced by the first light producing element L1, L2 and the second light produced by the second light producing element L1, L2 passes through the lens 26, 26G; or a Fresnel lens 26G adjacent the reflector such that the first light produced by the first light producing element L1, L2 and the second light produced by the second light producing element L1, L2 passes through the Fresnel lens 26G. The optical element 26, 26R, 26RO may comprise an internally reflective solid optic configured for directing light received at respective first and second input surfaces thereof outwardly from an exit surface thereof near the rearward end of the light housing 20 and along an axis substantially parallel to the longitudinal axis direction; wherein the first light producing element L1, L2 is configured for directing the first light into the first input surface of the internally reflective solid optic; and wherein the second light producing element L1, L2 is configured for directing the second light into the second input surface of the internally reflective solid optic. The portable light 10 may further comprise an electronic circuit board 200: wherein the first light producing element L1, L2 is mounted to a surface of the electronic circuit board 200 for directing the first light into the first input surface of the internally reflective solid optic; and wherein the second light producing element L1, L2 is mounted to the surface of the electronic circuit board 200 for directing the second light into the second input surface of the internally reflective solid optic. The exit surface of the internally reflective solid optic may define a substantially flat surface or defines a curved surface or defines a Fresnel lens 26G. The portable light 10 may further comprise an elongated clip 50 extending adjacent to and along the first housing 30 and substantially parallel to the longitudinal axis, and a pushbutton actuator 22 for actuating the electrical switch 22, 208 when pressed in a radial direction, the pushbutton actuator 22 being located on an exterior surface of the first housing 30 substantially diametrically opposite to the elongated clip 50. The portable light 10 may further comprise: an elongated clip 50 attached to the light housing 20 and extending along the light housing 20 in the longitudinal direction; or a hanger ring 34'R attached to the light housing; or an elongated clip 50 attached to the light housing 20 and extending along the light housing 20 substantially in the longitudinal direction and a hanger ring 34'R attached to the light housing 20. When the portable light 10 includes the elongated clip 50, the elongated clip 50 may be configured to be rotatable about the light housing 20; and when the portable light 10 includes the hanger ring 34'R, the hanger ring 34'R may be configured to be stowed adjacent the light housing 20 and deployed away from the light housing 20.

A portable light source may comprise: a first light producing element L1, L2 configured for selectively producing a first light; a second light producing element L1, L2 configured for selectively producing a second light; and an optical element 26, 26R, 26RO defining an optical axis and configured for receiving the first light produced by the first light producing element L1, L2 and the second light produced by the second light producing element L1, L2 and for directing the first light and the second light in a direction substantially parallel to the optical axis defined by the optical element 26, 26R, 26RO. The optical element 26, 26R, 26RO may comprise a reflector configured for directing light outwardly along an axis substantially parallel to the optical axis direction; wherein the first light producing element L1, L2 is configured for directing the first light substantially parallel to the axis defined by the reflector; and wherein the second light producing element L1, L2 is configured for directing the second light substantially transversely to the axis defined by the reflector, wherein the reflector directs the second light from the second light element substantially parallel to the axis defined by the reflector. The portable light source 10 may further comprise an electronic circuit board 200: wherein the first light producing element L1, L2 is mounted to a surface of the electronic circuit board 200 for directing the first light substantially parallel to the surface of the electronic circuit board 200 and substantially parallel to the axis defined by the reflector; wherein the second light producing element L1, L2 is mounted to the surface of the electronic circuit board 200 for directing the second light substantially transversely to the surface of the electronic circuit board 200; wherein the reflector has a reflective surface that defines a part of a parabolic surface, the parabolic surface defining an axis of a parabola and a focal point on the axis of the parabola, the reflector being open at a base end thereof; and wherein the reflector is disposed adjacent to the electronic circuit board 200 such that the axis of the parabola is substantially parallel to the surface of the electronic circuit board 200, the first light producing element L1, L2 directs the first light through the opening in the base of the reflector, and the second light producing element L1, L2 is substantially at the focal point of the parabolic surface of the reflector. The portable light source 10 may further comprise: a lens 26, 26G adjacent the reflector such that the first light produced by the first light producing element L1, L2 and the second light produced by the second light producing element L1, L2 passes through the lens 26, 26G; or a Fresnel lens 26G adjacent the reflector such that the first light produced by the first light producing element L1, L2 and the second light produced by the second light producing element L1, L2 passes through the Fresnel lens 26G. The optical element 26, 26R, 26RO may comprise: a reflector configured for directing light outwardly along an axis substantially parallel to the optical axis direction and a light pipe configured for directing light outwardly along an axis substantially parallel to the optical axis direction; wherein the first light producing element L1, L2 is configured for directing the first light into the light pipe; and wherein the second light producing element L1, L2 is configured for directing the second light substantially transversely to the axis defined by the reflector, wherein the reflector directs the second light from the second light element substantially parallel to the axis defined by the reflector. The portable light source 10 may further comprise an electronic circuit board 200: wherein the first light producing element L1, L2 is mounted to a surface of the electronic circuit board 200 for directing the first light into the light pipe; wherein the second light producing element L1, L2 is mounted to the surface of the electronic circuit board 200 for directing the second light substantially transversely to the surface of the electronic circuit board 200; wherein the reflector has a reflective surface that defines a part of a parabolic surface, the parabolic surface defining an axis of a parabola and a focal point on the axis of the parabola; and wherein the reflector is disposed adjacent to the electronic circuit board 200 such that the axis of the parabola is substantially parallel to the surface of the electronic circuit board 200, and the second light producing element L1, L2 is substantially at the focal point of the parabolic surface of the reflector. The portable light source 10 may further comprise: a lens 26, 26G adjacent the reflector such that the first light produced by the first light producing element L1, L2 and the second light produced by the second light producing element L1, L2 passes through the lens 26, 26G; or a Fresnel lens 26G adjacent the reflector such that the first light produced by the first light producing element L1, L2 and the second light produced by the second light producing element L1, L2 passes through the Fresnel lens 26G. The optical element 26, 26R, 26RO may comprise an internally reflective solid optic configured for directing light received at respective first and second input surfaces thereof outwardly from an exit surface thereof and along an axis substantially parallel to the optical axis; wherein the first light producing element L1, L2 is configured for directing the first light into the first input surface of the internally reflective solid optic; and wherein the second light producing element L1, L2 is configured for directing the second light into the second input surface of the internally reflective solid optic. The portable light source 10 may further comprise an electronic circuit board 200: wherein the first light producing element L1, L2 is mounted to a surface of the electronic circuit board 200 for directing the first light into the first input surface of the internally reflective solid optic; and wherein the second light producing element L1, L2 is mounted to the surface of the electronic circuit board 200 for directing the second light into the second input surface of the internally reflective solid optic. The exit surface of the internally reflective solid optic may define a substantially flat surface or defines a curved surface or defines a Fresnel lens 26G. The portable light source 10 may further comprise: a light housing 20 supporting the first and second light producing elements and the optical element; and may include: an elongated clip 50 attached to the light housing 20 and extending along the light housing 20; or a hanger ring 34′R attached to the light housing 20; or an elongated clip 50 attached to the light housing 20 and extending along the light housing 20 and a hanger ring 334′R attached to the light housing 20. When the portable light source 10 includes the elongated clip 50, the elongated clip 50 may be configured to be rotatable about the light housing; and when the portable light source 10 includes the hanger ring 34′R, the hanger ring 34′R is configured to be stowed adjacent the light housing and deployed away from light housing 20.

A portable light 10 may comprise: a light housing 20 defining a forward and a rearward end and a longitudinal axis therebetween; an illumination light source 43 in the light housing 20 and selectively energizable for directing light outwardly from the light housing 20; an electrical switch 22, 208 for selectively energizing the illumination light source 43 to produce light; an elongated clip 50 extending adjacent to and along the light housing 20 and substantially parallel to the longitudinal axis, wherein the elongated clip 50 is rotatable about the light housing 20 and the longitudinal axis over a predetermined radial angle relative to a center position; an accessory 60, 60′, 60A, 60B, 60C configured to be attached to the elongated clip 50 adjacent the light housing 20, wherein the accessory 60, 60′, 60A, 60B, 60C may be configured to be retained on the elongated clip 50 adjacent the light housing 20, whereby the elongated clip 50 and the accessory are configured for together being rotated substantially about the longitudinal axis of the light housing 20. The elongated clip 50 may have a relatively broader part and a relatively narrower distal end, and wherein the relatively broader part of the elongated clip 50 removably engages the accessory. The accessory 60, 60′, 60A, 60B, 60C may include a mounting bracket, a mounting bracket including an anvil and a set screw, a spring biased pawl, a magnet, a hanger, a hanger having a gated opening, or a combination thereof. The portable light 10 may further comprise: a pushbutton actuator 22 for actuating the electrical switch 22, 208 when pressed in a radial direction, the pushbutton actuator 22 being located on an exterior surface of the light housing 20 substantially diametrically opposite to the center position of the elongated clip 50. The light housing 20 may include a first housing 30 and a light head 40 that is pivotable relative to the longitudinal axis and the first housing 30; and wherein the elongated clip 50 is supported by and is rotatable about the first housing 30. The elongated clip 50 may be rotatably supported at an end of the first housing 30. The first housing 30 may have a post at an end of the first housing 30 and wherein the elongated clip 50 has a ring at one end thereof that is rotatable on the post, and further including a cap 34 attached to the post for pivotably retaining the ring of the elongated clip 50 supported at the end of the first housing 30. The elongated clip 50 may be rotatably supported at an end of the light housing 20. The light housing 20 may have a post at an end thereof and wherein the elongated clip 50 has a ring at one end thereof that is rotatable on the post, and further including a cap 34 attached to the post for pivotably retaining the ring of the elongated clip 50 supported at the end of the light housing 20. The portable light 10 may further comprise: a second light source 26, L1, L2 selectively energizable for directing light outwardly from a rearward end of the light housing 20; wherein the electrical switch 22, 208 selectively energizes the illumination light source 43, or the second light source 26, L1, L2, or both the illumination light source 43 and the second light source 26, L1, L2 to produce light. The portable light 10 may further comprise: a hanger ring 34′R attached to the light housing 20; or a hanger ring 34′R attached to the light housing 20 and configured to be stowed adjacent the light housing 20 and deployed away from the light housing 20. The portable light 10 may further comprise: a second light source 26, L1, L2 selectively energizable for directing light outwardly from the rearward end of the light housing 20; wherein the electrical switch 22, 208 selectively energizes the illumination light source 43, or the second light source 26, L1, L2, or both the illumination light source 43 and the second light source 26, L1, L2 to produce light.

A portable light may comprise: a light housing 20 defining a forward end and a rearward end and a longitudinal axis therebetween; an illumination light source 43 selectively energizable for directing light outwardly from the forward end of the light housing 20; a second light source 26, L1, L2 selectively energizable for directing light outwardly from the rearward end of the light housing 20, the second light source 26, L1, L2 including: a first light producing element L1, L2 configured for selectively producing a first light; a second light producing element L1, L2 configured for selectively producing a second light; and an optical element 26, 26R, 26RO configured for receiving the first light produced by the first light producing element L1, L2 and the second light produced by the second light producing element L1, L2 and for directing the first light and the second light rearwardly in a direction substantially parallel to the longitudinal axis defined by the light housing 20; and an electrical switch 22, 208 for selectively energizing the illumination light source 43, or the first light producing element L1, L2, or the second light producing element L1, L2, or any combination of the illumination light source 43, the first light producing element L1, L2 and second light producing element L1, L2 to produce light. The optical element 26, 26R, 26RO may comprise a reflector configured for directing light outwardly from the rearward end of the light housing 20 and along an axis substantially parallel to the longitudinal axis direction; wherein the first light producing element L1, L2 is configured for directing light substantially parallel to the axis defined by the reflector; and wherein the second light producing element L1, L2 is configured for directing light substantially transversely to the axis defined by the reflector, wherein the reflector directs the light from the second light element substantially parallel to the axis defined by the reflector. The portable light 10 may further comprise an electronic circuit board 200: wherein the first light producing element L1, L2 is mounted to a surface of the electronic circuit board 200 for directing light substantially parallel to the surface of the electronic circuit board 200 and substantially parallel to the axis defined by the reflector; wherein the second light producing element L1, L2 is mounted to the surface of the electronic circuit board 200 for directing light substantially transversely to the surface of the electronic circuit board 200; wherein the reflector has a reflective surface that defines a part of a parabolic surface, the parabolic surface defining an axis of a parabola and a focal point on the axis of the parabola, the reflector being open at a base end thereof; and wherein the reflector is disposed adjacent to the electronic circuit board 200 such that the axis of the parabola is substantially parallel to the surface of the electronic circuit board 200, the first light producing element L1, L2 directs light through the opening in the base of the reflector, and the second light producing element L1, L2 is substantially at the focal point of the parabolic surface of the reflector. The portable light may further comprise: a lens 26, 26G adjacent the reflector such that light produced by the first light producing element L1, L2 and light produced by the second light producing element L1, L2 passes through the lens 26, 26G; or a Fresnel lens 26G adjacent the reflector such that light produced by the first light producing element L1, L2 and light produced by the second light producing element L1, L2 passes through the Fresnel lens 26G. The optical element 26, 26R, 26RO may comprise: a reflector configured for directing light outwardly from the rearward end of the light housing 20 and along an axis substantially parallel to the longitudinal axis direction and a light pipe configured for directing light outwardly from the rearward end of the light housing 20 and having an axis substantially parallel to the longitudinal axis direction; the first light producing element L1, L2 may be configured for directing light into the light pipe; and the second light producing element L1, L2 may be configured for directing light substantially transversely to the axis defined by the reflector, wherein the reflector directs the light from the second light element substantially parallel to the axis defined by the reflector. The portable light 10 may further comprise an electronic circuit board 200: wherein the first light producing element L1, L2 is mounted to a surface of the electronic circuit board 200 for directing light into the light pipe; wherein the second light producing element L1, L2 is mounted to the surface of the electronic circuit board 200 for directing light substantially transversely to the surface of the electronic circuit board 200; wherein the reflector has a reflective surface that defines a part of a parabolic surface, the parabolic surface defining an axis of a parabola and a focal point on the axis of the parabola; and wherein the reflector is disposed adjacent to the electronic circuit board 200 such that the axis of the parabola is substantially parallel to the surface of the electronic circuit board 200, and the second light producing element L1, L2 is substantially at the focal point of the parabolic surface of the reflector. The portable light 10 may further comprise: a lens 26, 26G adjacent the reflector such that light produced by the first light producing element L1, L2 and light produced by the second light producing element L1, L2 passes through the lens 26, 26G; or a Fresnel lens 26G adjacent the reflector such that light produced by the first light producing element L1, L2 and light produced by the second light producing element L1, L2 passes through the Fresnel lens 26G. The optical element 26, 26R, 26RO may comprise an internally reflective solid optic configured for directing light received at respective first and second input surfaces thereof outwardly from an exit surface thereof near the rearward end of the light housing 20 and along an axis substantially parallel to the longitudinal axis direction; the first light producing element L1, L2 may be configured for directing the first light into the first input surface of the internally reflective solid optic; and the second light producing element L1, L2 may be configured for directing the second light into the second input surface of the internally reflective solid optic. The portable light 10 may further comprise an electronic circuit board 200: wherein the first light producing element L1, L2 is mounted to a surface of the electronic circuit board 200 for directing the first light into the first input surface of the internally reflective solid optic; and the second light producing element L1, L2 may mounted to the surface of the electronic circuit board 200 for directing the second light into the second input surface of the internally reflective solid optic. The exit surface of the internally reflective solid optic may define a substantially flat surface or defines a curved surface or defines a Fresnel lens 26G. The light housing 20 may include a light head 40 that is pivotably mounted to the light housing 20, and wherein the first light source is supported by the light head 40. The portable light 10 wherein pivoting the light head 40 relative to the light housing 20 by more than a predetermined angle selectively energizes and/or de-energizes the first light producing element L1, L2, the second light producing element L1, L2, or both of the first and second light producing elements L1, L2. The predetermined angle: may be in the range of about 60° to about 90°; or may be in the range of about 85° to about 90°. The portable light 10 may further comprise: a magnet supported by one of the light head 40 and the light housing 20 and a detector HS of a magnetic field supported by the other of the light head 40 and the light housing 20, wherein the detector HS detects the magnetic field of the magnet when the light head 40 is pivoted relative to the light housing 20 by a predetermined angle. The predetermined angle: may be in the range of about 60° to about 90°; or may be in the range of about 85° to about 90°. The detector HS of a magnetic field may include a Hall-effect sensor or a reed switch. The light housing 20 may further comprise: an elongated clip 50 attached to an end of the light housing 20 and extending along the light housing 20 substantially in the longitudinal direction, or an elongated clip 50 attached to an end of the light housing 20 and extending along the light housing 20 substantially in the longitudinal direction, wherein the elongated clip 50 is configured for being rotated substantially about the longitudinal axis. The portable light 10 may further comprise: an accessory 60, 60', 60A, 60B, 60C configured to be attached to the elongated clip 50. The elongated clip 50 may have a relatively broader part and a relatively narrower distal end, and wherein the relatively broader part of the elongated clip 50 removably engages the accessory. The accessory 60, 60', 60A, 60B, 60C may include a mounting bracket, a mounting bracket including an anvil and a set screw, a spring biased pawl, a magnet, a hanger, a hanger having a gated opening, or a combination thereof. The accessory 60, 60', 60A, 60B, 60C may include a spring biased pawl configured for engaging a notch of the elongated clip 50; or the accessory 60, 60', 60A, 60B, 60C may have one or more ridges and/or grooves thereon that are complementary to and configured to engage ridges and/or grooves of the light housing 20, whereby the accessory 60, 60', 60A, 60B, 60C is configured for being retained on the elongated clip 50. The portable light 10 may further comprise an elongated clip 50 extending adjacent to and along the light housing 20 and substantially parallel to the longitudinal axis, and a pushbutton actuator 22 for actuating the electrical switch 22, 208 when pressed in a radial direction, the pushbutton actuator 22 being located on an exterior surface of the light housing 20 substantially diametrically opposite to the elongated clip 50. The portable light 10 may further comprise: a hanger ring 34'R attached to the light housing 20 proximate the illumination light source 43; or a hanger ring 34'R attached to the light housing 20 proximate the illumination light source 43 and configured to be stowed adjacent the light housing 20 and deployed away from the light housing 20. The illumination light source may include: a totally internally reflective optical element 42S; or a totally internally reflective optical element 42S having a substantially flat forward face and a substantially cylindrical recess adjacent a light emitting diode.

A portable light may comprise: a light housing 20 defining a forward end and a rearward end and a longitudinal axis therebetween, the light housing 20 including a first housing 30 and a light head 40 that is pivotable relative to the longitudinal axis and the first housing 30; an elongated clip 50 extending adjacent to and along the first housing 30 and substantially parallel to the longitudinal axis, wherein the elongated clip 50 is rotatable about the first housing 30 and the longitudinal axis over a predetermined radial angle relative to a center position; an illumination light source 43 in the light head 40 and selectively energizable for directing light outwardly from the forward end of the light housing 20; a second light source 26, L1, L2 selectively energizable for directing light outwardly from the rearward end of the light housing 20; an electrical switch 22, 208 for selectively energizing the illumination light source 43, or the second light source 26, L1, L2, or both the illumination light source 43 and the second light source 26, L1, L2 to produce light; and a pushbutton acctuator 22 for actuating the electrical switch 22, 208 when pressed in a radial direction, the pushbutton acctuator 22 being located on an exterior surface of the first housing 30 substantially diametrically opposite to the center position of the elongated clip 50. The second light source 26, L1, L2 may include: a first light producing element L1, L2 configured for selectively producing a first light; a second light producing element L1, L2 configured for selectively producing a second light; and an optical element 26, 26R, 26RO configured for receiving the first light produced by the first light producing element L1, L2 and the second light produced by the second light producing element L1, L2 and for directing the first light and the second light rearwardly in a direction substantially parallel to the axis defined by the light housing 20. The portable light 10 wherein pivoting the light head 40 relative to the light housing 20 by more than a predetermined angle selectively energizes and/or de-energizes the first light producing element L1, L2, the second light producing element L1, L2, or both of the first and second light producing elements L1, L2. The portable light 10 wherein the predetermined angle: is in the range of about 60° to about 90°; or is in the range of about 85° to about 90°. The portable light 10 may further comprise: a magnet supported by one of the light head 40 and the first housing 30 and a detector HS of a magnetic field supported by the other of the light head 40 and the first housing 30, wherein the detector HS detects the magnetic field of the magnet when the light head 40 is pivoted relative to the first housing 30 by a predetermined angle. The predetermined angle: may be in the range of about 60° to about 90°; or may be in the range of about 85° to about 90°. The detector HS of a magnetic field may include a Hall-effect sensor or a reed switch. The optical element 26, 26R, 26RO may comprise a reflector configured for directing light outwardly from the rearward end of the light housing 20 and along an axis substantially parallel to the longitudinal axis direction; wherein the first light producing element L1, L2 is configured for directing light substantially parallel to the axis defined by the reflector; and wherein the second light producing element L1, L2 is configured for directing light substantially transversely to the axis defined by the reflector, wherein the reflector directs the light from the second light element substantially parallel to the axis defined by the reflector. The portable light 10 may further comprise an electronic circuit board 200: wherein the first light producing element L1, L2 is mounted to a surface of the electronic circuit board 200 for directing light substantially parallel to the surface of the electronic circuit board 200 and substantially parallel to the axis defined by the reflector; wherein the second light producing element L1, L2 is mounted to the surface of the electronic circuit board 200 for directing light substantially transversely to the surface of the electronic circuit board 200; wherein the reflector has a reflective surface that defines a part of a parabolic surface, the parabolic surface defining an axis of a parabola and a focal point on the axis of the parabola, the reflector being open at a base end thereof; and wherein the reflector is disposed adjacent to the electronic circuit board 200 such that the axis of the parabola is substantially parallel to the surface of the electronic circuit board 200, the first light producing element L1, L2 directs light through the opening in the base of the reflector, and the second light producing element L1, L2 is substantially at the focal point of the parabolic surface of the reflector. The portable light 10 may further comprise: a lens 26, 26G adjacent the reflector such that light produced by the first light producing element L1, L2 and light produced by the second light producing element L1, L2 passes through the lens 26, 26G; or a Fresnel lens 26G adjacent the reflector such that light produced by the first light producing element L1, L2 and light produced by the second light producing element L1, L2 passes through the Fresnel lens 26G. The optical element 26, 26R, 26RO may comprise: a reflector configured for directing light outwardly from the rearward end of the light housing 20 and along an axis substantially parallel to the longitudinal axis direction and a light pipe configured for directing light outwardly from the rearward end of the light housing 20 and having an axis substantially parallel to the longitudinal axis direction; wherein the first light producing element L1, L2 is configured for directing light into the light pipe; and wherein the second light producing element L1, L2 is configured for directing light substantially transversely to the axis defined by the reflector, wherein the reflector directs the light from the second light element substantially parallel to the axis defined by the reflector. The portable light 10 may further comprise an electronic circuit board 200: wherein the first light producing element L1, L2 is mounted to a surface of the electronic circuit board 200 for directing light into the light pipe; wherein the second light producing element L1, L2 is mounted to the surface of the electronic circuit board 200 for directing light substantially transversely to the surface of the electronic circuit board 200; wherein the reflector has a reflective surface that defines a part of a parabolic surface, the parabolic surface defining an axis of a parabola and a focal point on the axis of the parabola; and wherein the reflector is disposed adjacent to the electronic circuit board 200 such that the axis of the parabola is substantially parallel to the surface of the electronic circuit board 200, and the second light producing element L1, L2 is substantially at the focal point of the parabolic surface of the reflector. The portable light 10 may further comprise: a lens 26, 26G adjacent the reflector such that light produced by the first light producing element L1, L2 and light produced by the second light producing element L1, L2 passes through the lens 26, 26G; or a Fresnel lens 26G adjacent the reflector such that light produced by the first light producing element L1, L2 and light produced by the second light producing element L1, L2 passes through the Fresnel lens 26G. The optical element 26, 26R, 26RO may comprise an internally reflective solid optic configured for directing light received at respective first and second input surfaces thereof outwardly from an exit surface thereof near the rearward end of the light housing 20 and along an axis substantially parallel to the longitudinal axis direction; wherein the first light producing element L1, L2 is configured for directing the first light into the first input surface of the internally reflective solid optic; and wherein the second light producing element L1, L2 is configured for directing the second light into the second input surface of the internally reflective solid optic. The portable light 10 may further comprise an electronic circuit board 200: wherein the first light producing element L1, L2 is mounted to a surface of the electronic circuit board 200 for directing the first light into the first input surface of the internally reflective solid optic; and wherein the second light producing element L1, L2 is mounted to the surface of the electronic circuit board 200 for directing the second light into the second input surface of the internally reflective solid optic. The exit surface of the internally reflective solid optic may define a substantially flat surface or defines a curved surface or defines a Fresnel lens 26G. The portable light 10 may further comprise: an accessory configured to be attached to the elongated clip 50, whereby the elongated clip 50 and the accessory are configured for together being rotated substantially about the longitudinal axis. The elongated clip 50 may have a relatively broader part and a relatively narrower distal end, and wherein the relatively broader part of the elongated clip 50 removably engages the accessory 60, 60', 60A, 60B, 60C. The accessory 60, 60', 60A, 60B, 60C may include a mounting bracket, a mounting bracket including an anvil and a set screw, s spring biased pawl, a magnet, a hanger, a hanger having a gated opening, or a combination thereof. The accessory 60, 60', 60A, 60B, 60C may include a spring biased pawl configured for engaging a notch of the elongated clip; or the accessory 60, 60', 60A, 60B, 60C may have one or more ridges and/or grooves thereon that are complementary to and configured to engage ridges and/or grooves of the light housing, whereby the accessory is configured for being retained on the elongated clip. The portable light 10 may further comprise a pushbutton actuator 22 for actuating the electrical switch 22, 208 when pressed in a radial direction, the pushbutton actuator 22 being located on an exterior surface of the first housing 30 substantially diametrically opposite to the elongated clip 50. The portable light 10 may further comprise: a hanger ring 34'R attached to the light housing 20 proximate the illumination light source 43; or a hanger ring 34'R attached to the light housing 20 proximate the illumination light source 43 and configured to be stowed adjacent the light housing 20 and deployed away from the light housing 20. The illumination light source 43 may include: a totally internally reflective optical element 43S; or a totally internally reflective optical element 43S having a substantially flat forward face and a substantially cylindrical recess adjacent a light emitting diode.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "rearward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

A fastener as used herein may include any fastener or other fastening device that may be suitable for the described use, including threaded fasteners, e.g., bolts, screws and driven fasteners, as well as pins, rivets, nails, spikes, barbed fasteners, clip 50s, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

While various operations, steps and/or elements of a process or method or operation, e.g., an assembly operation, may be described in an order or sequence, the operations, steps and/or elements do not need to be performed in that order or sequence, or in any particular order or sequence, unless expressly stated to require a particular order or sequence.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could include power sources including, but not limited to, fuel cells, super capacitors, solar cells, and the like. Any of the foregoing may be intended for a single use or for being rechargeable or for both.

Various embodiments of a battery may have one or more battery cells, e.g., one, two, three, four, or five or more battery cells, as may be deemed suitable for any particular device. A battery may employ various types and kinds of battery chemistry types, e.g., a carbon-zinc, alkaline, lead acid, nickel-cadmium (Ni—Cd), nickel-metal-hydride (NiMH), Lithium (Lithium-Ion) or lithium-ion (Li-Ion) battery type, of a suitable number of cells and cell capacity for providing a desired operating time and/or lifetime for a particular device, and may be intended for a single use or for being rechargeable or for both. Examples may include a five cell Ni—Cd battery typically producing about 6 volts, a five cell NiMH battery typically producing about 6 volts, a Li-Ion battery typically producing about 6 volts, or a two-cell Li-Ion battery typically producing about 6 volts, or a four cell alkaline battery providing about 6 volts, it being noted that the voltages produced thereby will be higher near to full charge and will be lower in discharge, particularly when providing higher current and when reaching a low level of charge, e.g., becoming discharged.

The aforementioned example batteries may be in the form of standard size cells, e.g., AA or AAA or CR-123 sizes, or may packaged into a single package for having a particular size and shape and/or contact configuration, and/or for convenience. While the light housing 20 illustrated is configured for a particular example battery, e.g., a single CR-123 cell or two AA or CR-123 cells, or a rechargeable 18650 battery, its diameter and length can be configured to accommodate one or more of the example batteries, and can be extended to accommodate two or more batteries in an end-to-end configuration or widened to accommodate two or more batteries in a side-by-side configuration, or a combination thereof.

As used herein, the terms "connected" and "coupled" as well as variations thereof are not intended to be exact synonyms, but to encompass some similar things and some different things. The term "connected" may be used generally to refer to elements that have a direct electrical and/or physical contact to each other, whereas the term "coupled" may be used generally to refer to elements that have an indirect electrical and/or physical contact with each other, e.g., via one or more intermediate elements, so as to cooperate and/or interact with each other, and may include elements in direct contact as well.

While the present invention has been described in terms of the foregoing example embodiments, variations within the scope and spirit of the present invention as defined by the claims following will be apparent to those skilled in the art. For example, the LEDs L1, L2 providing a safety beacon and a flood beam may be blue and white, respectively, as described, or may be of any desired color, e.g., red for night vision, IR for not revealing position other than to intended observers, and the like.

Switching on and off of LEDs L1 and L2 in light head 40 is preferably controlled by a magnet 40M in light head 40 positioned to be detected by Hall-effect detector HS within light housing 30, e.g., disposed on circuit board 200 therein, when the light head 40 is pivoted upward (away from the side of housing 30 where clip 50 is disposed) by an angle sufficient to place Hall-effect detector HS sufficiently in the magnetic field of magnet 40M. However, the magnet could be disposed in housing 30 and the detector could be disposed in light head 40. The magnet 40M or the detector HS could be supported by an arm 44 of light head housing 42 where a smaller pivot activation angle is desired. Moreover, the magnetic field of the magnet could be detected by any suitable detector of a magnetic field, e.g., a reed switch and the like.

Further, any one or both of LEDs 43, L1, L2, may produce light of any desired color, or may be a packaged LED that includes plural LEDs of different colors and/or brightness so as to provide a user selectable color or colors and/or user selectable brightness levels. Further, the optical element 26R employed with any of the light sources having two (or more) light producing elements may include one or more reflectors, mirrors, solid optics, or any other suitable optical elements, or a combination thereof, and may have a flat, substantially flat, curved, parabolic, hyperbolic, or other suitable shape, or a combination thereof.

Further, either LED L1 or L2 or both may be employed in light 10, and different versions thereof may employ LEDs L1 and L2 of different levels of brightness and/or different colors. For example, lights 10 for use by firefighters typically have a blue rearwardly facing light source, e.g., LED L1 or L2, which may or may not be separately controllable from the forwardly facing light source 43, and may or may not employ a second rearwardly facing light source. A firefighter light 10 typically also includes a rearwardly facing white light source, e.g., LED L1 or L2, that is activated by Hall detector HS as described. Another version may employ only a white rearwardly facing light source, e.g., LED L1 or L2, which preferably is energized and de-energized by Hall detector HS as described, in addition to forwardly facing light source LED 43.

Light 10 preferably includes an electronic control circuit for selecting an operating mode, e.g., off, momentarily on, continuously on, blinking, flashing, strobing, dimmed, undimmed and the like. Selecting of different modes may be accomplished by pressing and releasing actuator 22 one or more times according to a predetermined timing and/or sequence of actuations.

Such control may include a mode for temporarily disabling the rearwardly facing light source of LED L1 and/or L2, and for re-enabling the rearwardly facing light source, as a user may desire. In one example light 10, each of disabling and re-enabling of the rearwardly facing light source is effected by depressing actuator 22 for at least about two seconds.

It is noted that any of the example reflective optical elements described may be interchanged with any of the example solid optical elements and that any of the example solid optical elements described may interchanged with any example reflective optical element, and all such example elements may be utilized in any embodiment of light 10, as may be deemed desirable. Similarly any of the example clips and example brackets and alternative embodiment thereof described may be utilized in any embodiment of light 10, as may be deemed desirable.

In addition, mounting bracket 60, 60' could have its base 64 and extending arms 66 that define groove 67 as a piece that is rotatable relative to clamp member 62 thereof so as to provide additional freedom in directing the light produced by light head 40. In another example embodiment, bracket 60, 60' may be permanently attached to light housing 20, either by attaching to a clip 50, 50', 50" or otherwise being mounted to light housing 20. A clip 50 may have smooth edges, e.g., without notches or projections. Clip 50 may have any width and/or length that is suitable and/or convenient in relation to a particular intended use.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

A hanger or hook similar to hanger and hook 68, with or without a gate 68G biased to close the opening therein, may be provided on cap 24, either fixed thereto or connected thereto by a ring or swivel connector.

Each of the U.S. Provisional Applications, U.S. patent applications, and/or U.S. patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light comprising:
   a light housing defining a forward end and a rearward end and a longitudinal axis therebetween, said light housing including a first housing and a light head that is pivotable relative to the longitudinal axis and said first housing;
   an illumination light source in said light head that is selectively energizable for directing light outwardly from said light head;
   a second light source in said first housing that is selectively energizable for directing light outwardly from said first housing in a direction different from that of said illumination light source;
   an electrical switch for selectively energizing said illumination light source and/or said second light source to produce light; and
   a detector of the pivoted position of said light head relative to said first housing configured for energizing and/or de-energizing said second light source when said light head is pivoted to be proximate to said first housing, whereby the proximity of said light head and said first housing is detected by said detector.

2. The portable light of claim 1 wherein said second light source further comprises:
   an optical element configured for receiving first light produced by a first light producing element and second light produced by a second light producing element, wherein said optical element is configured for directing the first light and the second light in a direction substantially parallel to the longitudinal axis defined by said light housing.

3. The portable light of claim 1 wherein said detector detects said light head being pivoted relative to said first housing by more than a predetermined angle for selectively energizing said second light source.

4. The portable light of claim 3 wherein the predetermined angle:
   is in the range of about 60° to about 90'; or
   is in the range of about 85° to about 90°.

5. The portable light of claim 1 wherein said detector comprises: a magnet supported by one of said light head and said first housing and a detector of a magnetic field supported by the other of said light head and said first housing, wherein said detector detects the magnetic field of said magnet when said light head is pivoted relative to said first housing by a predetermined angle.

6. The portable light of claim 5 wherein the predetermined angle:
   is in the range of about 60° to about 90°; or
   is in the range of about 85° to about 90°.

7. The portable light of claim 5 wherein said detector of a magnetic field includes a Hall-effect sensor or a reed switch.

8. The portable light of claim 1 further comprising:
   an elongated clip attached to said light housing and extending along said light housing substantially in the longitudinal direction; or
   a hanger ring attached to said light housing proximate said illumination light source; or
   an elongated clip attached to said light housing and extending along said light housing substantially in the longitudinal direction and a hanger ring attached to said light housing proximate said illumination light source.

9. The portable light of claim 8 wherein:
   when said portable light includes said elongated clip, said elongated clip is configured to be rotatable about said light housing; and
   when said portable light includes said hanger ring, said hanger ring is attached to said light housing proximate said illumination light source and is configured to be stowed adjacent said light housing and deployed away from said light housing.

10. A portable light comprising:
   a light housing defining a forward and a rearward end and a longitudinal axis therebetween, said light housing including a first housing and a light head that is pivotable relative to the longitudinal axis and said first housing;
   an illumination light source in said pivotable light head and selectively energizable for directing light outwardly from said pivotable light head at a forward end of said light housing;

a second light source selectively energizable for directing light outwardly from a rearward end of said light housing, wherein said second light source includes at least a first light producing element configured for producing a first light;

an electrical switch for selectively energizing said illumination light source, or said first light producing element, or said illumination light source and said first light producing element, to produce light; and a detector of the pivoted position of said pivotable light head relative to said first housing for energizing and/or de-energizing said first light producing element when said light head is pivoted to be proximate to said first housing, whereby the proximity of said light head and said first housing is detected by said detector.

11. The portable light of claim 10 wherein said detector detects said light head being pivoted relative to said first housing by more than a predetermined angle for selectively energizing and/or de-energizing the one or more of said first light producing element.

12. The portable light of claim 11 wherein the predetermined angle:
is in the range of about 60° to about 90'; or
is in the range of about 85° to about 90°.

13. The portable light of claim 10 wherein said detector comprises: a magnet supported by one of said light head and said first housing and a detector of a magnetic field supported by the other of said light head and said first housing, wherein said detector detects the magnetic field of said magnet when said light head is pivoted relative to said first housing by a predetermined angle.

14. The portable light of claim 13 wherein the predetermined angle:
is in the range of about 60° to about 90°; or
is in the range of about 85° to about 90°.

15. The portable light of claim 12 wherein said detector of a magnetic field includes a Hall-effect sensor or a reed switch.

16. The portable light of claim 10 wherein said second light source further includes:
a second light producing element configured for producing a second light;
wherein said electrical switch is for selectively energizing said illumination light source, or said first light producing element, or said second light producing element, or any combination of said illumination light source, said first light producing element, and said second light producing element to produce light; and
wherein said detector of the pivoted position of said light head relative to said first housing is for energizing and/or de-energizing said first light producing element, or said second light producing element, or both of said first and second light producing elements.

17. The portable light of claim 16 wherein said second light source further comprises:
an optical element configured for receiving the first light produced by said first light producing element and the second light produced by said second light producing element and for directing the first light and the second light rearwardly in a direction substantially parallel to the axis defined by said light housing.

18. The portable light of claim 17:
wherein said optical element comprises a reflector configured for directing light outwardly from the rearward end of said light housing and along an axis substantially parallel to the longitudinal axis direction;
wherein said first light producing element is configured for directing the first light substantially parallel to the axis defined by said reflector; and
wherein said second light producing element is configured for directing the second light substantially transversely to the axis defined by said reflector, wherein said reflector directs the light from said second light element substantially parallel to the axis defined by said reflector.

19. The portable light of claim 18 further comprising an electronic circuit board:
wherein said first light producing element is mounted to a surface of said electronic circuit board for directing light substantially parallel to the surface of said electronic circuit board and substantially parallel to the axis defined by said reflector;
wherein said second light producing element is mounted to the surface of said electronic circuit board for directing light substantially transversely to the surface of said electronic circuit board;
wherein said reflector has a reflective surface that defines a part of a parabolic surface, the parabolic surface defining an axis of a parabola and a focal point on the axis of the parabola, said reflector being open at a base end thereof; and
wherein said reflector is disposed adjacent to said electronic circuit board such that the axis of the parabola is substantially parallel to the surface of said electronic circuit board, said first light producing element directs light through the opening in the base of said reflector, and said second light producing element is substantially at the focal point of the parabolic surface of said reflector.

20. The portable light of claim 18 further comprising:
a lens adjacent said reflector such that the first light produced by said first light producing element and the second light produced by said second light producing element passes through said lens; or
a Fresnel lens adjacent said reflector such that the first light produced by said first light producing element and the second light produced by said second light producing element passes through said Fresnel lens.

21. The portable light of claim 17:
wherein said optical element comprises: a reflector configured for directing light outwardly from the rearward end of said light housing and along an axis substantially parallel to the longitudinal axis direction and a light pipe configured for directing light outwardly from the rearward end of said light housing and having an axis substantially parallel to the longitudinal axis;
wherein said first light producing element is configured for directing light into said light pipe; and
wherein said second light producing element is configured for directing light substantially transversely to the axis defined by said reflector, wherein said reflector directs the light from said second light element substantially parallel to the axis defined by said reflector.

22. The portable light of claim 21 further comprising an electronic circuit board:
wherein said first light producing element is mounted to a surface of said electronic circuit board for directing light into said light pipe;
wherein said second light producing element is mounted to the surface of said electronic circuit board for directing light substantially transversely to the surface of said electronic circuit board;

wherein said reflector has a reflective surface that defines a part of a parabolic surface, the parabolic surface defining an axis of a parabola and a focal point on the axis of the parabola; and wherein said reflector is disposed adjacent to said electronic circuit board such that the axis of the parabola is substantially parallel to the surface of said electronic circuit board, and said second light producing element is substantially at the focal point of the parabolic surface of said reflector.

23. The portable light of claim 21 further comprising:

a lens adjacent said reflector such that the first light produced by said first light producing element and the second light produced by said second light producing element passes through said lens; or a Fresnel lens adjacent said reflector such that the first light produced by said first light producing element and the second light produced by said second light producing element passes through said Fresnel lens.

24. The portable light of claim 17:

wherein said optical element comprises an internally reflective solid optic configured for directing light received at respective first and second input surfaces thereof outwardly from an exit surface thereof near the rearward end of said light housing and along an axis substantially parallel to the longitudinal axis direction;

wherein said first light producing element is configured for directing the first light into the first input surface of said internally reflective solid optic; and wherein said second light producing element is configured for directing the second light into the second input surface of said internally reflective solid optic.

25. The portable light of claim 24 further comprising an electronic circuit board:

wherein said first light producing element is mounted to a surface of said electronic circuit board for directing the first light into the first input surface of said internally reflective solid optic; and wherein said second light producing element is mounted to the surface of said electronic circuit board for directing the second light into the second input surface of said internally reflective solid optic.

26. The portable light of claim 24 wherein the exit surface of said internally reflective solid optic defines a substantially flat surface or defines a curved surface or defines a Fresnel lens.

27. The portable light of claim 10 further comprising an elongated clip extending adjacent to and along said first housing and substantially parallel to the longitudinal axis, and a pushbutton actuator for actuating said electrical switch when pressed in a radial direction, said pushbutton actuator being located on an exterior surface of said first housing substantially diametrically opposite to said elongated clip.

28. The portable light of claim 10 further comprising:

an elongated clip attached to said light housing and extending along said light housing substantially in the longitudinal direction; or a hanger ring attached to said light housing; or an elongated clip attached to said light housing and extending along said light housing substantially in the longitudinal direction and a hanger ring attached to said light housing.

29. The portable light of claim 28 wherein:

when said portable light includes said elongated clip, said elongated clip is configured to be rotatable about said light housing; and when said portable light includes said hanger ring, said hanger ring is configured to be stowed adjacent said light housing and deployed away from said light housing.

* * * * *